United States Patent
Colson et al.

(10) Patent No.: US 10,391,719 B2
(45) Date of Patent: Aug. 27, 2019

(54) PROCESS AND SYSTEM FOR MANUFACTURING A ROLLER BLIND

(71) Applicant: Hunter Douglas Inc., Pearl River, NY (US)

(72) Inventors: Wendell B. Colson, Weston, MA (US); Paul G. Swiszcz, Niwot, CO (US); David P. Hartman, Ashland, MA (US); Michael Robert Stanczyk, Westminster, CO (US)

(73) Assignee: Hunter Douglas Inc., Pearl River, NY (US)

( * ) Notice: Subject to any disclaimer, the term of this patent is extended or adjusted under 35 U.S.C. 154(b) by 283 days.

(21) Appl. No.: 15/239,303

(22) Filed: Aug. 17, 2016

(65) Prior Publication Data
US 2016/0354972 A1    Dec. 8, 2016

Related U.S. Application Data

(63) Continuation of application No. 13/641,481, filed as application No. PCT/US2011/032624 on Apr. 15, 2011, now Pat. No. 9,458,663.
(Continued)

(51) Int. Cl.
*E06B 9/24*    (2006.01)
*E06B 9/34*    (2006.01)
(Continued)

(52) U.S. Cl.
CPC ............ *B29C 66/437* (2013.01); *B29C 53/58* (2013.01); *B29C 65/4815* (2013.01);
(Continued)

(58) Field of Classification Search
CPC ..... E06B 9/34; E06B 9/40; E06B 9/42; E06B 2009/2627; B29C 66/437; B29C 53/562;
(Continued)

(56) References Cited

U.S. PATENT DOCUMENTS

| 496,204 A | 4/1893 | Perry |
|---|---|---|
| 1,962,868 A | 6/1934 | Gregg |

(Continued)

FOREIGN PATENT DOCUMENTS

| CN | 1110483 A | 10/1995 |
|---|---|---|
| CN | 1549884 A | 11/2004 |

(Continued)

OTHER PUBLICATIONS

International Preliminary Report on Patentability; dated Feb. 18, 2014 issued with Written Opinion dated Mar. 29, 2012 for International Application No. PCT/US2011/032624, 17 pages.
(Continued)

*Primary Examiner* — Carson Gross

(57) ABSTRACT

A process and system for manufacturing roller blinds is provided which includes structure for performing plural steps including a first step of helically winding slat fabric about a drum, thereby forming a slat product. A second step includes moving the slat product from the drum to a platform. A third step includes winding the slat product about a roller tube to form a roller blind. A fourth step includes moving the blind from the platform to a heat treating device.

19 Claims, 64 Drawing Sheets

Related U.S. Application Data

(60) Provisional application No. 61/325,169, filed on Apr. 16, 2010.

(51) Int. Cl.

| | | |
|---|---|---|
| *E06B 9/40* | (2006.01) | |
| *E06B 9/42* | (2006.01) | |
| *B29C 53/32* | (2006.01) | |
| *B29C 53/58* | (2006.01) | |
| *B29C 53/60* | (2006.01) | |
| *B29C 53/62* | (2006.01) | |
| *B29C 53/66* | (2006.01) | |
| *B29C 65/00* | (2006.01) | |
| *B29C 65/02* | (2006.01) | |
| *B29C 65/48* | (2006.01) | |
| *E06B 9/262* | (2006.01) | |
| *E06B 9/264* | (2006.01) | |
| *E06B 9/266* | (2006.01) | |
| *E06B 9/386* | (2006.01) | |
| *E06B 9/388* | (2006.01) | |

(52) U.S. Cl.
CPC ............ *B29C 66/723* (2013.01); *E06B 9/264* (2013.01); *E06B 9/266* (2013.01); *E06B 9/34* (2013.01); *E06B 9/386* (2013.01); *E06B 9/388* (2013.01); *E06B 9/40* (2013.01); *E06B 9/42* (2013.01); *B29C 53/32* (2013.01); *B29C 53/60* (2013.01); *B29C 53/62* (2013.01); *B29C 53/66* (2013.01); *B29C 53/665* (2013.01); *B29C 65/02* (2013.01); *B29C 65/48* (2013.01); *E06B 2009/2429* (2013.01); *E06B 2009/2627* (2013.01); *Y10T 29/49861* (2015.01)

(58) Field of Classification Search
CPC ....... B29C 53/564; B29C 53/58; B29C 53/60; B29C 53/62; B29C 53/64; B29C 53/66; B29C 53/665
USPC .................................. 156/185, 187, 193, 195
See application file for complete search history.

(56) References Cited

U.S. PATENT DOCUMENTS

| | | | |
|---|---|---|---|
| 2,012,887 A | 8/1935 | Major | |
| 2,024,090 A | 12/1935 | Cadmus | |
| 2,042,002 A | 5/1936 | Hovey | |
| 2,200,605 A | 5/1940 | Pierce | |
| 2,231,778 A | 2/1941 | Swanson | |
| 2,267,867 A | 12/1941 | Kienle | |
| 2,267,869 A | 12/1941 | Loehr | |
| 2,620,869 A | 12/1952 | Friedman | |
| 2,874,612 A | 2/1959 | Ferris et al. | |
| 3,467,037 A | 9/1969 | Frydryk | |
| 3,990,201 A | 11/1976 | Falbel | |
| 4,002,159 A | 1/1977 | Angilletta | |
| 4,039,019 A | 8/1977 | Hopper | |
| 4,066,062 A | 1/1978 | Houston | |
| 4,078,323 A | 3/1978 | Baumgarten | |
| 4,194,550 A | 3/1980 | Hopper | |
| 4,220,189 A | 9/1980 | Marquez | |
| 4,247,599 A | 1/1981 | Hopper | |
| 4,279,240 A | 7/1981 | Artusy | |
| 4,301,787 A | 11/1981 | Rice | |
| 4,338,996 A | 7/1982 | Frank | |
| 4,359,079 A | 11/1982 | Bledsoe | |
| 4,382,436 A | 5/1983 | Hager | |
| 4,452,656 A * | 6/1984 | Benson | B07B 1/4618 |
| | | | 156/174 |
| 4,458,739 A | 7/1984 | Murray | |
| 4,512,836 A * | 4/1985 | Tucci | B29C 53/587 |
| | | | 156/174 |
| 4,532,917 A | 8/1985 | Holdridge | |
| 4,535,828 A | 8/1985 | Brockhaus | |
| 4,550,758 A | 11/1985 | Johnson et al. | |
| 4,579,107 A | 4/1986 | Deakin | |
| 4,638,844 A | 1/1987 | Hayashiguchi | |
| 4,649,980 A | 3/1987 | Kunz | |
| 4,658,806 A | 4/1987 | Boozer | |
| 4,692,744 A | 9/1987 | Hickman | |
| 4,722,382 A | 2/1988 | Vecchiarelli | |
| 4,732,201 A | 3/1988 | Dillitzer | |
| 4,736,785 A | 4/1988 | Seuster | |
| 4,763,890 A | 8/1988 | Zimmerman | |
| 4,800,946 A | 1/1989 | Rosenoy | |
| 5,123,473 A | 6/1992 | Henkenjohann | |
| 5,129,440 A | 7/1992 | Colson | |
| 5,217,000 A | 6/1993 | Pierce-Bjorklund | |
| 5,223,313 A | 6/1993 | Holzer et al. | |
| 5,320,154 A | 6/1994 | Colson et al. | |
| 5,325,579 A | 7/1994 | Baier | |
| D352,856 S | 11/1994 | Ford | |
| 5,390,720 A | 2/1995 | Colson et al. | |
| 5,419,385 A | 5/1995 | Vogel et al. | |
| 5,467,266 A | 11/1995 | Jacobs et al. | |
| 5,503,210 A | 4/1996 | Colson et al. | |
| 5,547,006 A | 8/1996 | Auger | |
| 5,566,738 A | 10/1996 | Yadidya | |
| 5,600,974 A | 2/1997 | Schnegg et al. | |
| 5,603,368 A | 2/1997 | Colson et al. | |
| 5,638,881 A | 6/1997 | Ruggles et al. | |
| 5,649,583 A | 7/1997 | Hsu | |
| 5,712,332 A | 1/1998 | Kaieda et al. | |
| 5,787,951 A | 8/1998 | Tonomura et al. | |
| 5,876,545 A | 3/1999 | Swiszcz et al. | |
| 5,897,731 A | 4/1999 | Colson et al. | |
| 5,909,763 A | 6/1999 | Link et al. | |
| 5,974,763 A | 11/1999 | Colson et al. | |
| 6,006,812 A | 12/1999 | Corey | |
| 6,024,819 A | 2/2000 | Corey | |
| 6,052,966 A | 4/2000 | Colson et al. | |
| 6,057,029 A | 5/2000 | Demestre et al. | |
| 6,076,588 A | 6/2000 | Swiszcz et al. | |
| 6,094,290 A | 7/2000 | Crawford et al. | |
| 6,103,336 A | 8/2000 | Swiszcz | |
| D439,785 S | 4/2001 | Throne | |
| D440,102 S | 4/2001 | Colson et al. | |
| D444,658 S | 7/2001 | Swiszcz et al. | |
| 6,257,302 B1 | 7/2001 | Bednarczyk et al. | |
| D446,416 S | 8/2001 | Throne | |
| 6,302,982 B1 | 10/2001 | Corey et al. | |
| 6,345,486 B1 | 2/2002 | Colson et al. | |
| 6,354,353 B1 | 3/2002 | Green et al. | |
| 6,374,896 B1 | 4/2002 | Moller | |
| D459,933 S | 7/2002 | Goodman | |
| 6,416,842 B1 | 7/2002 | Swiszcz et al. | |
| 6,461,464 B1 | 10/2002 | Swiszcz | |
| 6,470,950 B2 | 10/2002 | Shimizu | |
| 6,484,390 B1 | 11/2002 | Gouldsonnley et al. | |
| 6,589,613 B1 | 7/2003 | Kunert | |
| 6,613,404 B2 | 9/2003 | Johnson | |
| 6,688,369 B2 | 2/2004 | Colson et al. | |
| 6,745,811 B1 | 6/2004 | Nien | |
| 6,758,211 B1 | 7/2004 | Schmidt | |
| D496,204 S | 9/2004 | Tuzman | |
| 6,792,994 B2 | 9/2004 | Lin | |
| D498,105 S | 11/2004 | Tyner | |
| 6,860,079 B2 | 3/2005 | Schwarz | |
| D503,578 S | 4/2005 | Boehm | |
| 6,904,948 B2 | 6/2005 | Auger et al. | |
| 6,913,058 B1 * | 7/2005 | Takagi | B29C 53/58 |
| | | | 156/117 |
| 6,981,509 B2 | 1/2006 | Sharapov | |
| 6,982,020 B2 | 1/2006 | Swiszcz et al. | |
| 7,058,292 B2 | 6/2006 | Hirano | |
| 7,063,122 B2 | 6/2006 | Colson et al. | |
| 7,100,666 B2 | 9/2006 | Colson et al. | |
| 7,111,659 B2 | 9/2006 | Harper et al. | |
| 7,191,816 B2 | 3/2007 | Colson et al. | |
| 7,409,980 B1 | 8/2008 | Heissenberg | |
| 7,417,397 B2 | 8/2008 | Berman et al. | |

(56) References Cited

U.S. PATENT DOCUMENTS

| | | |
|---|---|---|
| 7,418,313 B2 | 8/2008 | Devis et al. |
| 7,500,505 B2 | 3/2009 | Smith et al. |
| 7,513,292 B2 | 4/2009 | Auger et al. |
| 7,549,455 B2 | 6/2009 | Harper et al. |
| 7,588,068 B2 | 9/2009 | Colson et al. |
| 7,637,301 B2 | 12/2009 | Forst Randle |
| 7,708,047 B2 | 5/2010 | Auger |
| D622,964 S | 9/2010 | Colson |
| D632,493 S | 2/2011 | Colson et al. |
| D636,204 S | 4/2011 | Elinson et al. |
| D640,472 S | 6/2011 | Colson et al. |
| 7,971,624 B2 | 7/2011 | Harper et al. |
| 7,975,747 B2 | 7/2011 | Liang |
| 8,020,602 B2 | 9/2011 | Smith et al. |
| D646,516 S | 10/2011 | Ehrsam |
| 8,082,916 B2 | 12/2011 | Colson |
| D657,176 S | 4/2012 | Stern |
| 8,171,640 B2 | 5/2012 | Colson et al. |
| D668,090 S | 10/2012 | Colson et al. |
| D671,349 S | 11/2012 | Judkins |
| 8,405,901 B2 | 3/2013 | Boote |
| D685,210 S | 7/2013 | Josephson et al. |
| D686,433 S | 7/2013 | Marocco |
| 8,496,768 B2 | 7/2013 | Holt et al. |
| D691,397 S | 10/2013 | Colson et al. |
| D692,684 S | 11/2013 | Colson et al. |
| D693,600 S | 11/2013 | Jelic et al. |
| 8,587,242 B2 | 11/2013 | Bermanl et al. |
| 8,639,387 B2 | 1/2014 | Byberg et al. |
| 8,757,239 B2 | 6/2014 | Colson et al. |
| 8,763,673 B2 | 7/2014 | Jelic et al. |
| 8,820,384 B2 | 9/2014 | Boillot |
| 8,827,347 B2 | 9/2014 | Snider |
| 8,951,372 B2 | 2/2015 | Van Nutt et al. |
| D734,061 S | 7/2015 | Colson et al. |
| 9,080,377 B2 | 7/2015 | Holt et al. |
| 9,081,171 B2 | 7/2015 | Dean et al. |
| 9,097,842 B2 | 8/2015 | Van Nutt et al. |
| 9,109,812 B2 | 8/2015 | Colson |
| 9,130,097 B2 | 9/2015 | Taheri et al. |
| 9,249,618 B2 | 2/2016 | Sevcik et al. |
| 9,256,085 B2 | 2/2016 | McCarthy et al. |
| 9,376,860 B2 | 6/2016 | Josephson et al. |
| 9,382,754 B2 | 7/2016 | Malkan |
| D764,836 S | 8/2016 | Rupel |
| 9,458,663 B2 | 10/2016 | Colson et al. |
| 9,540,874 B2 | 1/2017 | Colson et al. |
| 2001/0037849 A1* | 11/2001 | Corey .................. B29C 66/437 156/73.4 |
| 2002/0088559 A1 | 1/2002 | Green et al. |
| 2003/0000171 A1 | 1/2003 | Schwarz |
| 2003/0098133 A1 | 5/2003 | Palmer |
| 2004/0065416 A1* | 4/2004 | Auger .................. E06B 9/26 160/84.05 |
| 2004/0144498 A1 | 7/2004 | Hudoba et al. |
| 2004/0163773 A1 | 8/2004 | Murray |
| 2005/0205217 A1 | 9/2005 | Harper et al. |
| 2006/0000558 A1 | 1/2006 | Fennell |
| 2006/0179991 A1 | 8/2006 | Nieng et al. |
| 2006/0191646 A1 | 8/2006 | Harper et al. |
| 2006/0207730 A1 | 9/2006 | Berman et al. |
| 2006/0247377 A1 | 11/2006 | Riegel et al. |
| 2007/0039699 A1 | 2/2007 | Colson et al. |
| 2007/0051456 A1 | 3/2007 | Judkins |
| 2007/0074826 A1 | 4/2007 | Jelic et al. |
| 2007/0088104 A1 | 4/2007 | Hung |
| 2008/0014446 A1 | 1/2008 | Donea et al. |
| 2008/0066277 A1 | 3/2008 | Colson et al. |
| 2008/0127598 A1 | 6/2008 | Kallstrom |
| 2008/0264572 A1 | 10/2008 | Forst Randle |
| 2008/0303686 A1 | 12/2008 | Mosbrucker |
| 2009/0090072 A1 | 4/2009 | To |
| 2009/0205789 A1 | 8/2009 | Watkins et al. |
| 2009/0321024 A1 | 12/2009 | Harper et al. |
| 2010/0126675 A1 | 5/2010 | Jelic et al. |
| 2010/0154783 A1 | 6/2010 | Coloson |
| 2010/0186903 A1 | 7/2010 | Liang et al. |
| 2010/0218841 A1* | 9/2010 | Chang .................. D03D 1/007 139/384 A |
| 2010/0266801 A1 | 10/2010 | Jahoda et al. |
| 2010/0276088 A1 | 11/2010 | Jelic et al. |
| 2010/0276089 A1 | 11/2010 | Jelic et al. |
| 2010/0288446 A1 | 11/2010 | Foley et al. |
| 2011/0088324 A1 | 4/2011 | Wessel |
| 2011/0088852 A1 | 4/2011 | Hu et al. |
| 2011/0094689 A1 | 4/2011 | Dwarka |
| 2011/0133940 A1 | 6/2011 | Margalit |
| 2011/0146922 A1 | 6/2011 | Colson et al. |
| 2011/0170170 A1 | 7/2011 | Boote |
| 2011/0220303 A1 | 9/2011 | Colson |
| 2012/0038841 A1 | 2/2012 | Taheri et al. |
| 2012/0118514 A1 | 5/2012 | Hughes |
| 2012/0222722 A1 | 9/2012 | Baruchi et al. |
| 2012/0241104 A1 | 9/2012 | Huffer et al. |
| 2012/0318475 A1 | 12/2012 | Glover |
| 2013/0038093 A1 | 2/2013 | Snider |
| 2013/0061846 A1 | 3/2013 | Colson |
| 2013/0098565 A1 | 4/2013 | Colson et al. |
| 2013/0105094 A1 | 5/2013 | Colson et al. |
| 2013/0128336 A1 | 5/2013 | Dean et al. |
| 2013/0180676 A1 | 7/2013 | Berman et al. |
| 2013/0228290 A1 | 9/2013 | Rupel et al. |
| 2013/0240158 A1 | 9/2013 | Chenn |
| 2014/0034251 A1 | 2/2014 | Colson |
| 2014/0053989 A1 | 2/2014 | Colson et al. |
| 2014/0168779 A1 | 6/2014 | Malkan |
| 2014/0284004 A1 | 9/2014 | Sevcik et al. |
| 2014/0366469 A1 | 12/2014 | Hodgson et al. |
| 2015/0041072 A1 | 2/2015 | Hsu et al. |
| 2015/0096695 A1 | 4/2015 | Baker et al. |
| 2015/0129140 A1 | 5/2015 | Dean et al. |
| 2015/0184450 A1 | 7/2015 | Rupel |
| 2015/0184459 A1 | 7/2015 | Wang et al. |
| 2015/0191959 A1 | 7/2015 | Schmohl et al. |
| 2015/0322714 A1 | 11/2015 | Rupel |

FOREIGN PATENT DOCUMENTS

| | | |
|---|---|---|
| CN | 1918356 | 6/2005 |
| CN | 2703855 Y | 6/2005 |
| CN | 201194726 Y | 2/2009 |
| CN | 101984889 A | 3/2011 |
| CN | 102007262 A | 4/2011 |
| DE | 70451 | 8/1893 |
| DE | 2709207 A1 | 9/1978 |
| DE | 3912528 A1 | 10/1990 |
| EP | 0511956 A1 | 3/1991 |
| EP | 0818601 A1 | 1/1998 |
| EP | 2113626 A2 | 11/2009 |
| GB | 1494842 A | 12/1977 |
| JP | 8-511591 A | 12/1996 |
| JP | 3832007 B2 | 10/2006 |
| TW | 244361 B | 4/1995 |
| TW | 245658 B | 4/1995 |
| TW | 310303 B | 7/1997 |
| TW | I224650 A | 12/2004 |
| WO | 1997/04207 A1 | 2/1997 |
| WO | 0206619 A1 | 1/2002 |
| WO | 02/41740 A1 | 5/2002 |
| WO | 03/008751 A1 | 1/2003 |
| WO | 2005/062875 A2 | 7/2005 |
| WO | 2005/098190 A1 | 10/2005 |
| WO | 2009/103045 A2 | 8/2009 |
| WO | 2010/059581 A3 | 5/2010 |
| WO | 2011/130593 A2 | 10/2011 |
| WO | 2012/142519 A1 | 10/2012 |
| WO | 2012/142522 A1 | 10/2012 |

OTHER PUBLICATIONS

International Search Report dated Mar. 29, 2012; International Application No. PCT/US2011/032624 filed Apr. 15, 2011, 3 pages.

(56) References Cited

OTHER PUBLICATIONS

Examination Report for AU2017201802, dated Apr. 23, 2018, 7 pgs.

* cited by examiner

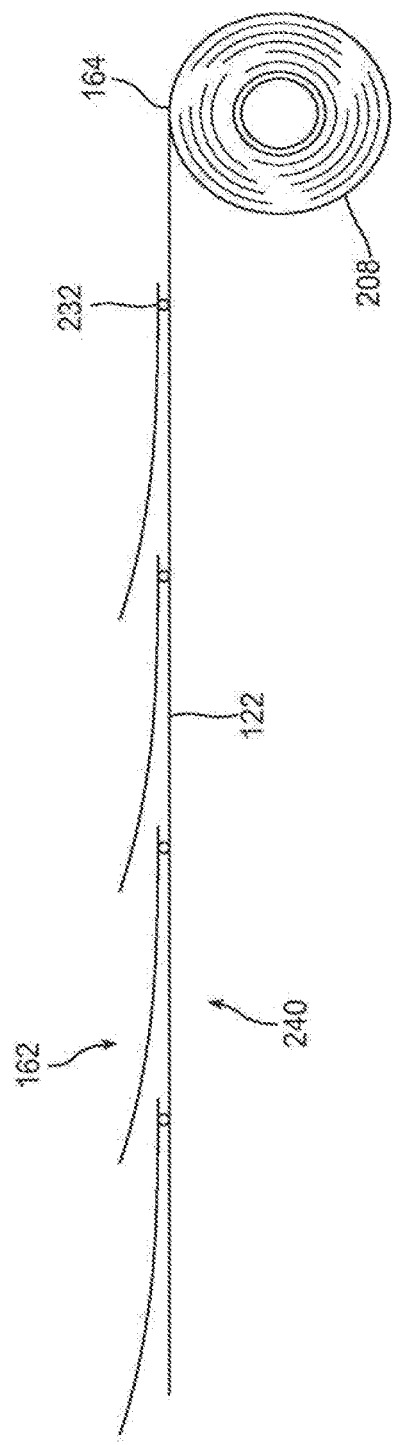
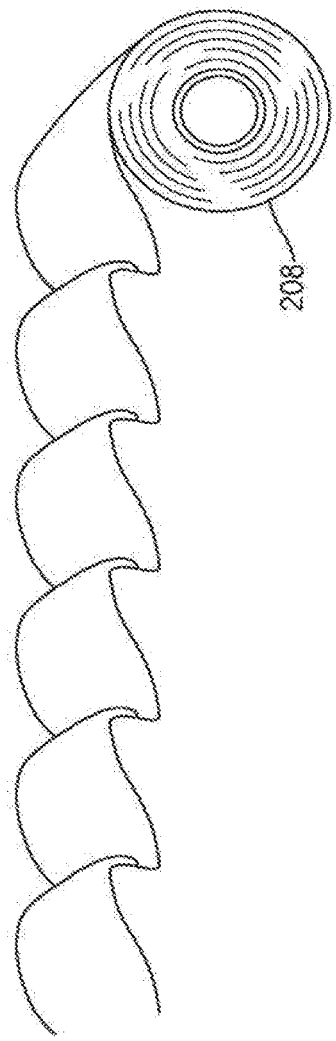
FIG. 34A
FIG. 34B

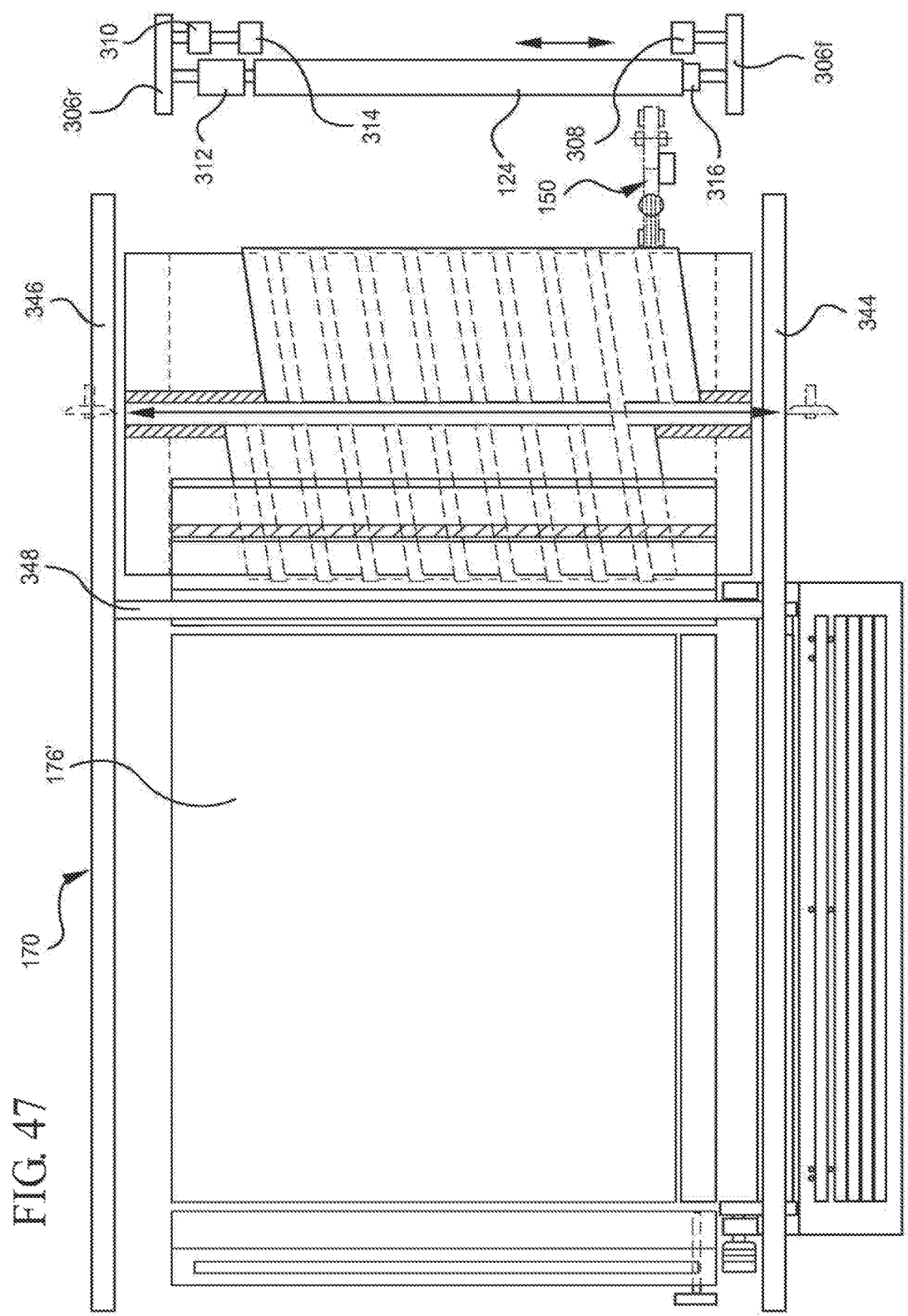

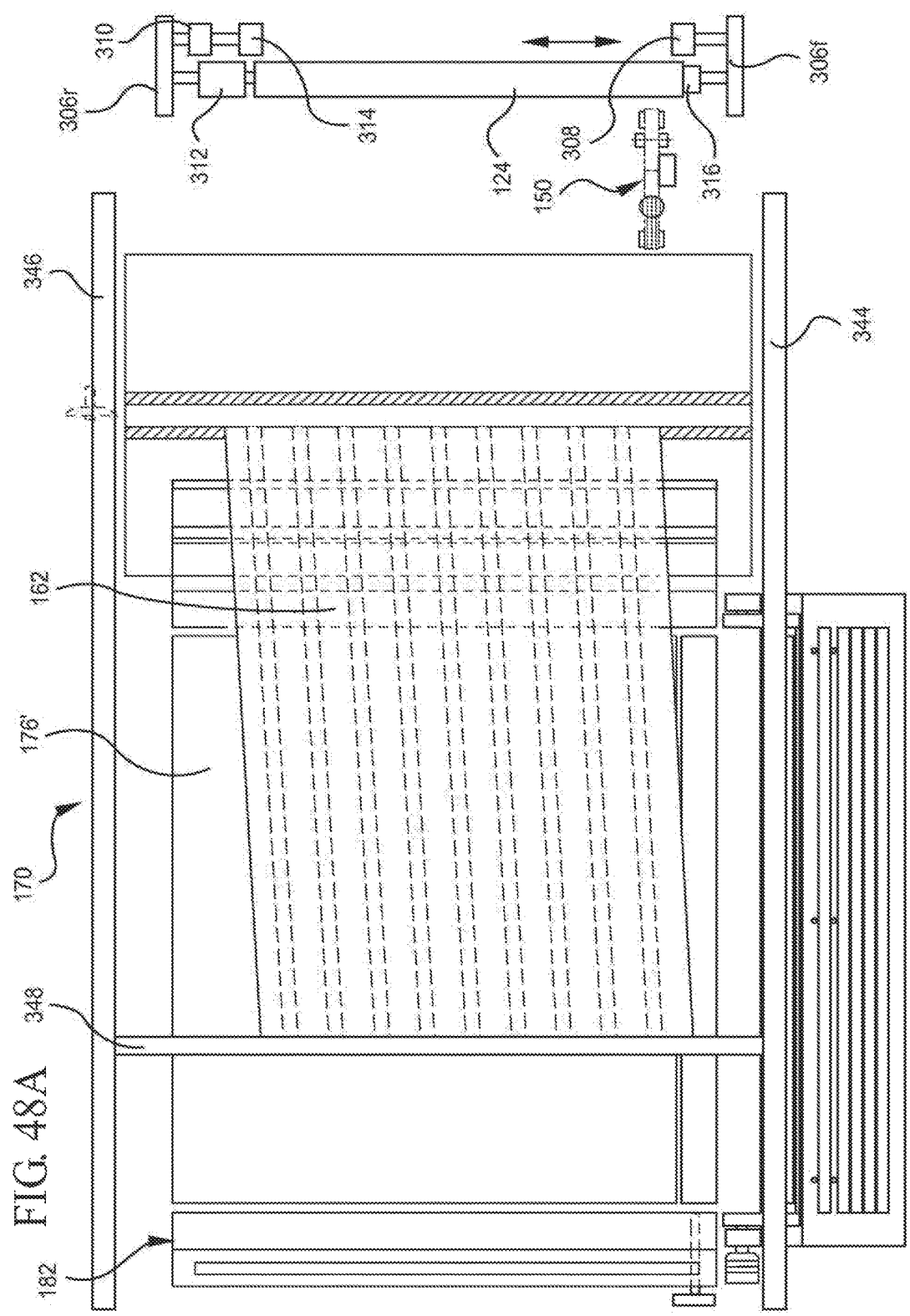

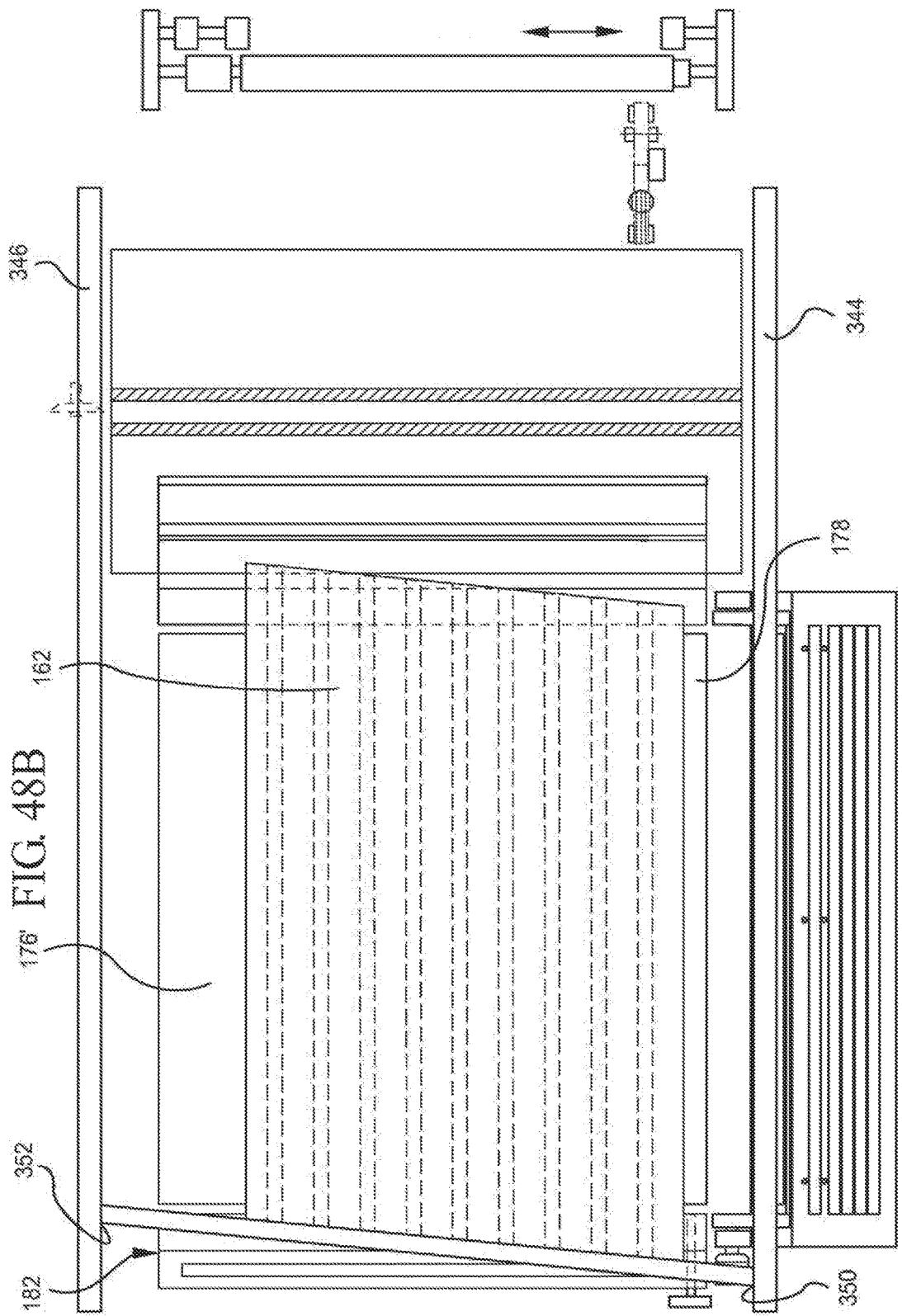

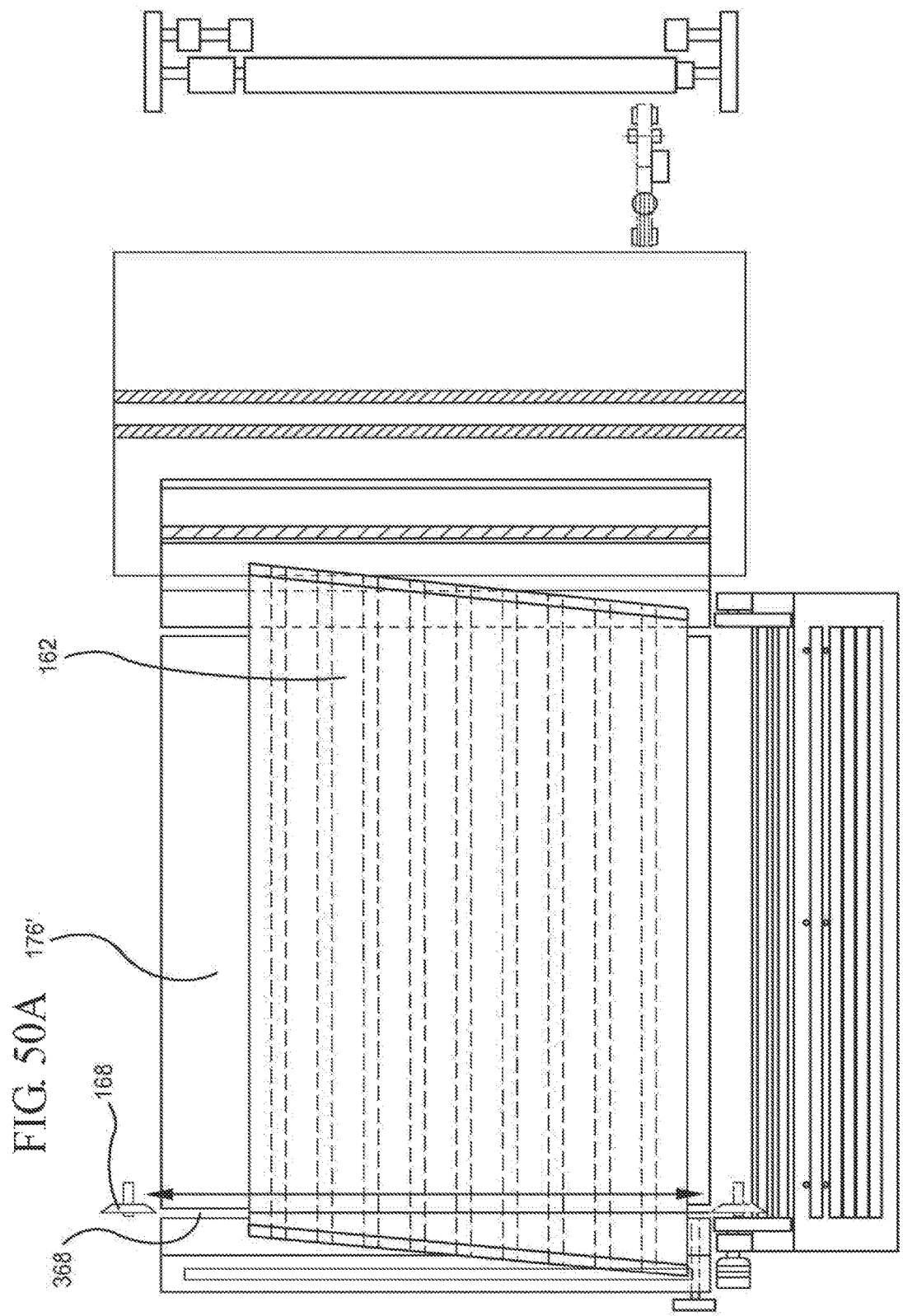

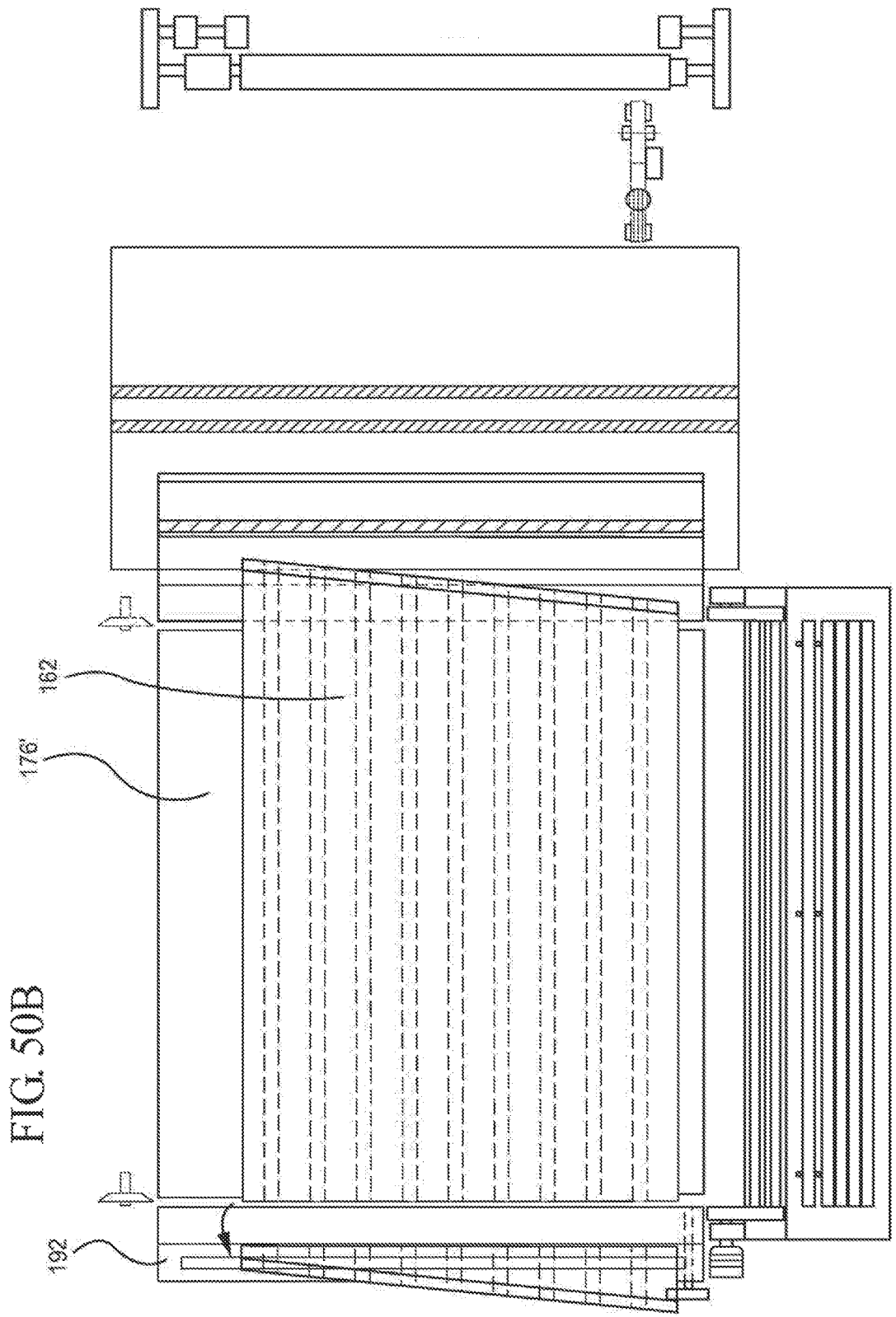

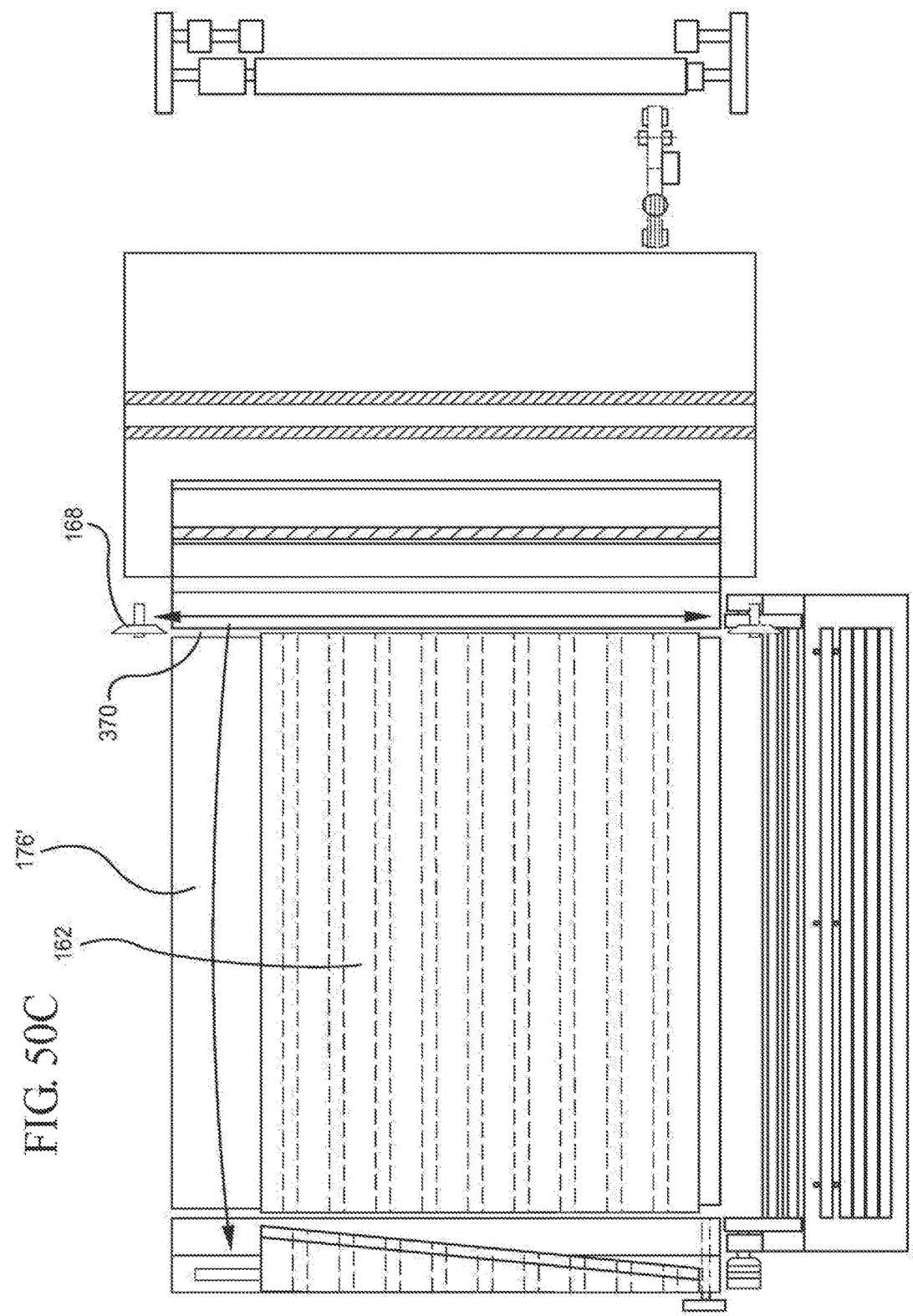

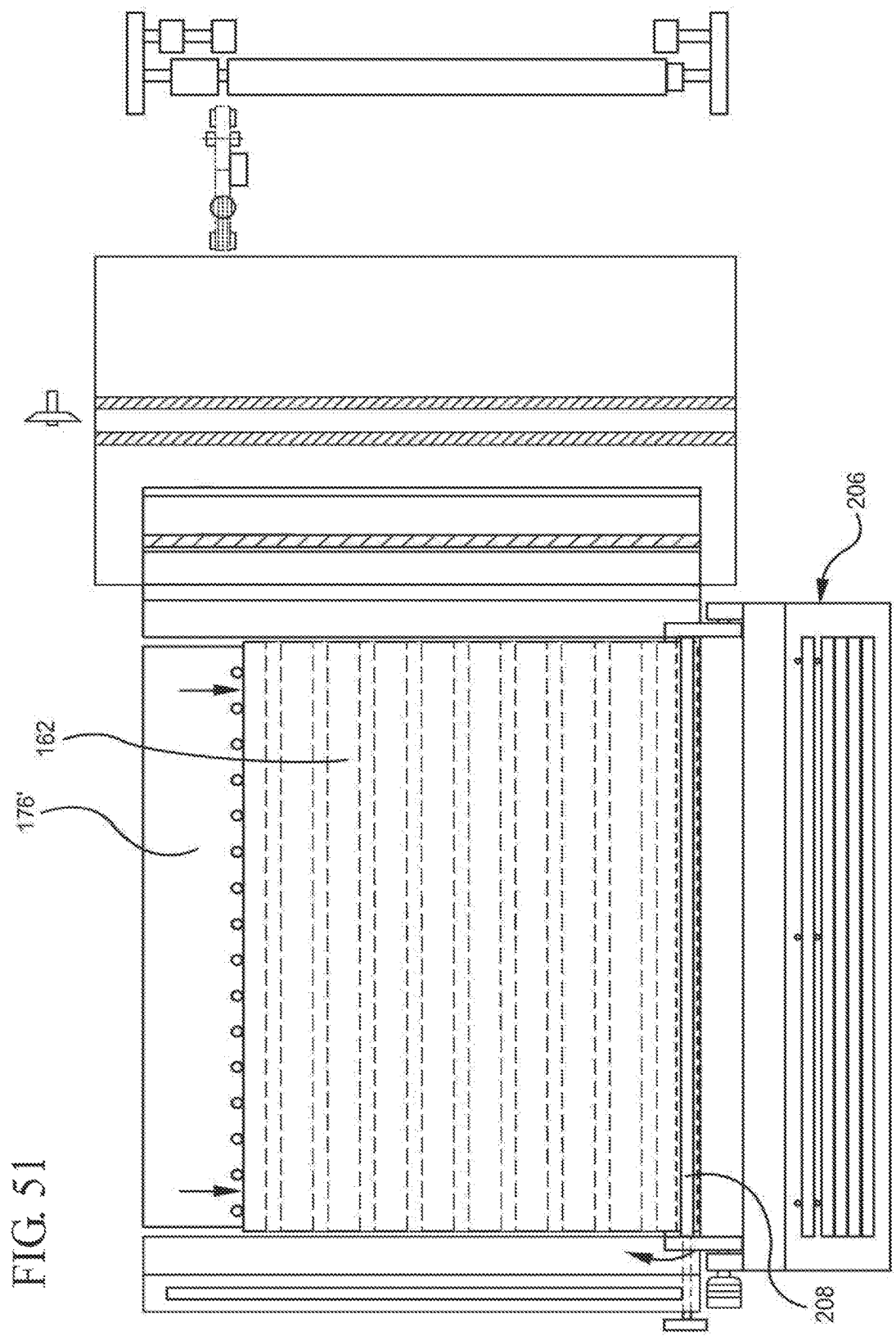

PROCESS AND SYSTEM FOR MANUFACTURING A ROLLER BLIND

CROSS REFERENCE TO RELATED APPLICATIONS

The present application is a continuation of co-pending U.S. patent application Ser. No. 13/641,481 filed Jan. 9, 2013, which application is the Section 371 of PCT International patent application No. PCT/US2011/032624 filed Apr. 15, 2011, which claims the benefit under 35 U.S.C. § 119(e) to U.S. provisional patent application No. 61/325,169 filed Apr. 16, 2010, which are all hereby incorporated by reference into the present application in their entireties.

BACKGROUND OF THE INVENTION

1. Field of the Invention

The present invention relates to a roller blind for architectural openings, such as doors and windows. More specifically, the present invention relates to a process and system for manufacturing roller blinds with slats for providing directional shading.

2. Description of the Related Art

Various systems are known for controlling the amount of light that may pass through an architectural opening, such as a door or a window. Such systems are frequently used as aesthetic and/or functional door or window coverings.

As discussed in International Patent Application PCT/US2009/064682, filed Nov. 17, 2009, titled "Slatted Roller Blind," which claimed priority to U.S. Provisional Patent Application No. 61/199,551, filed Nov. 18, 2008, are both incorporated herein by reference in their entirety, one such system is a roller shade or blind, and another such system is a slatted blind system, which allows for the directional shading of light. International Patent Application PCT/US2009/064682 discusses the shortcomings of such known options and suggests a novel slatted roller blind, which is discussed in greater detail, below. In view thereof, there is a need for a process and system for efficiently manufacturing such slatted roller blinds.

SUMMARY OF THE EMBODIMENTS

A process and system for manufacturing roller blinds is disclosed which includes structure for performing plural steps comprising a first step of helically winding slat fabric about a drum, thereby forming a slat product. A second step includes moving the slat product from the drum to a platform. A third step includes winding the slat product about a roller tube to form a roller blind. A fourth step includes moving the blind from the platform to a heat treating device.

Other aspects of the embodiments of the invention will become apparent from the drawings and respective descriptions that follow.

BRIEF DESCRIPTION OF THE DRAWINGS

It is to be understood that the following drawings depict details of only typical embodiments of the invention and are not therefore to be considered to be limiting of its scope, and in particular:

FIG. 34A is an alternative blind which can be manufactured by the disclosed process, shown before heat treating;

FIG. 34B is an additional view of the blind in 34A, shown after heat treating;

FIGS. 46-47 illustrate the process of cutting slats wrapped about the drum in the embodiment of FIG. 38;

FIGS. 48A and 48B illustrate removing screen/slat product from the drum in the embodiment of FIG. 38;

FIGS. 50A-50C illustrate removing metallic bars from the leading and trailing edges of the screen/slat product while on the platform in the embodiment of FIG. 38;

FIG. 51 illustrates rolling the screen/slat product onto a tube in the embodiment of FIG. 38;

DETAILED DESCRIPTION OF THE DISCLOSED EMBODIMENTS

The following is a brief discussion of the slatted roller blind manufactured according to the disclosed process. The benefits of the disclosed slatted roller bind are discussed in depth in International Patent Application PCT/US2009/064682.

Figure 1:
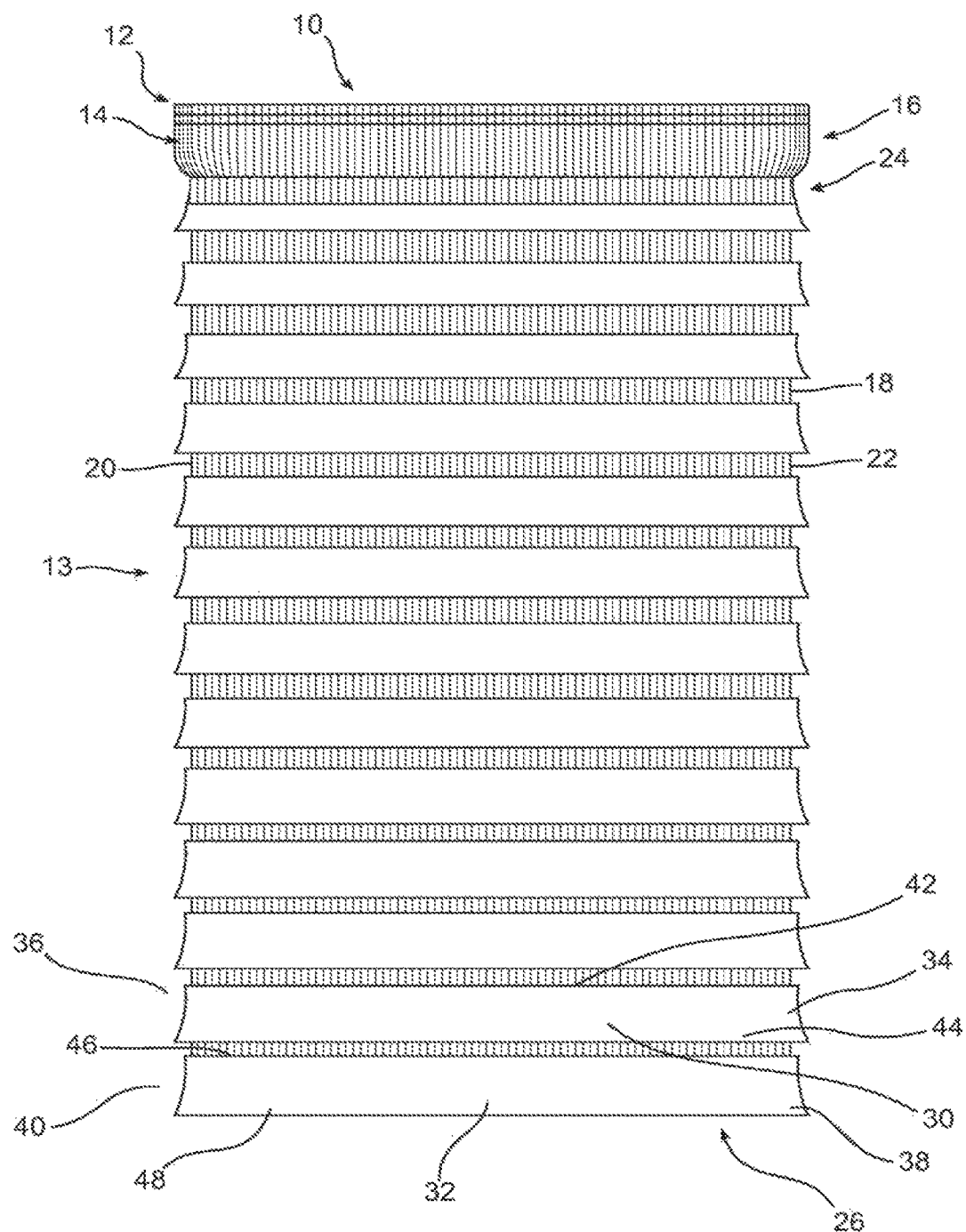
FIG. 1 illustrates the sun facing side of a disclosed slatted roller blind.

Turning to FIG. 1, the slatted roller blind 10 includes a roller 12. The axial length of the roller 12, defined between opposing side edges 14, 16 of the roller 12, spans the width of the blind 10. The roller 12 is designed to support the blind 10 without additional ladder cords. The illustrated roller 12 is typically about twenty inches long.

The slatted roller blind includes a screen 18. The width of the screen, defined by opposing side edges 20, 22, is substantially the same as the axial length of the roller 12. The height of the screen 18, which is the height of the blind 10, is defined by opposing top and bottom screen edges 24, 26. The top edge 24 is connected directly to the roller 12 and the bottom edge 26 is distanced therefrom. The screen height can be a typically available height for off-the-shelf roller blinds or can be a tailored height as specified for upscale window or door treatments.

The blind 10 includes plural widthwise extending slats or louvers 13, which provide the blind with directional shading. The plural slats 13 include, e.g., first and second height-wise spaced slats 30, 32. Each of the slats has substantially the same length, defined by opposing side edges 34, 36 in the first slat 30, and opposing side edges 38, 40 in the second slat 32. Furthermore, the length of the slats is substantially the same as the axial length of the roller 12.

Each of the slats 30, 32 also has substantially the same circumferential width, defined by opposing top and bottom 42, 44 edges in the first slat 30, and opposing top and bottom edges 46, 48 in the second slat 32. The circumferential width of each slat 30, 32 is proportional to Pi, which is effectively about a third of the circumference of the outer diameter of the roller 12.

Figure 2:
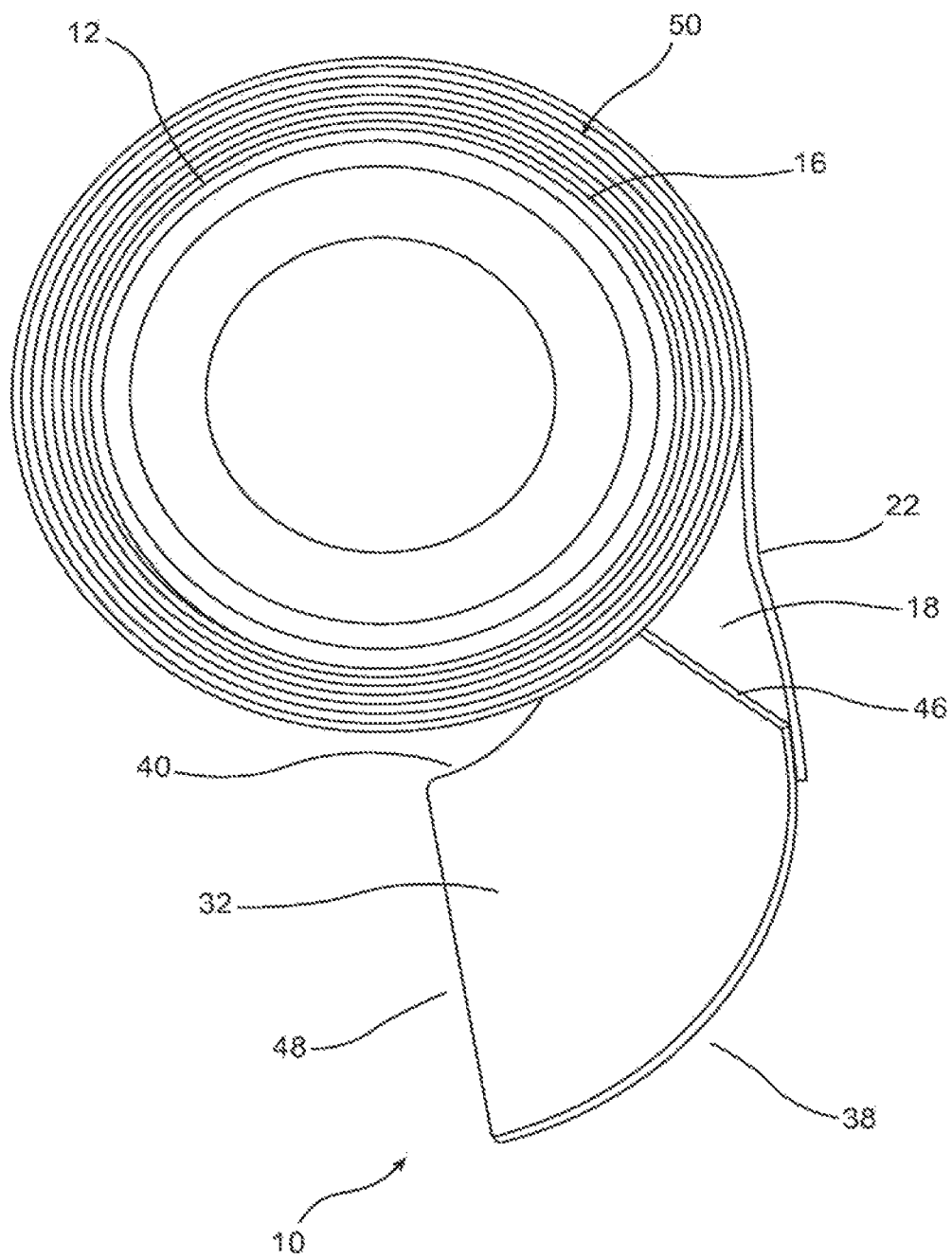
FIG. 2 illustrates a side view of the blind illustrated in FIG. 1.
Figure 3:
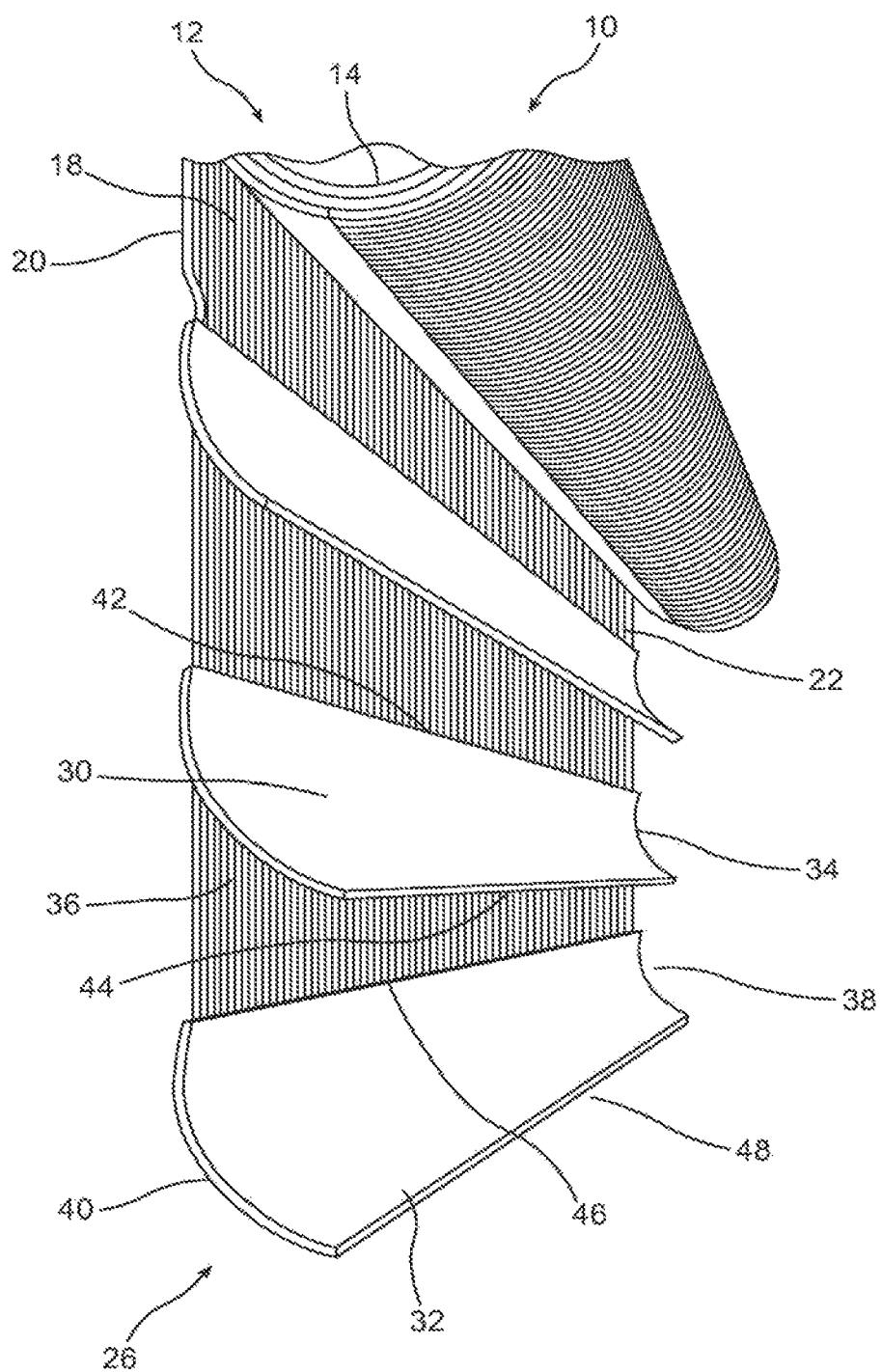
FIG. 3 illustrates a perspective view of the blind illustrated in FIG. 1.

FIGS. 2 and 3 illustrate the edge curvature of the slats 13. As illustrated in FIG. 2, when retracted, the blind 10, with the screen 18 and slats 13 wound about the roller 12, forms a spiral curve 50 (see also, the illustration of the blind as item 216, FIG. 30). The curvature of each slat edge is defined by the segment of the spiral curve 50 on which the respective slat is positioned when the blind is retracted. As such, the curvature in the set of slats 13 changes progressively between each adjacent slat 30, 32. For example, slats nearer to the top of the blind 10 have a mean, or average radius which is less than that for slats nearer to the bottom of the blind.

The slatted roller blind, due to its compact retracted configuration, can be fabricated in relatively wide units and rather easily subdivided with a hand or electric saw. For example, the blind can be fabricated in sixteen-foot widths, which is about two and a half times the typical blind width. Statistically, such a width provides a reasonable yield when cutting for custom sized shades of the normal size range between three and eight feet wide.

Figure 4:
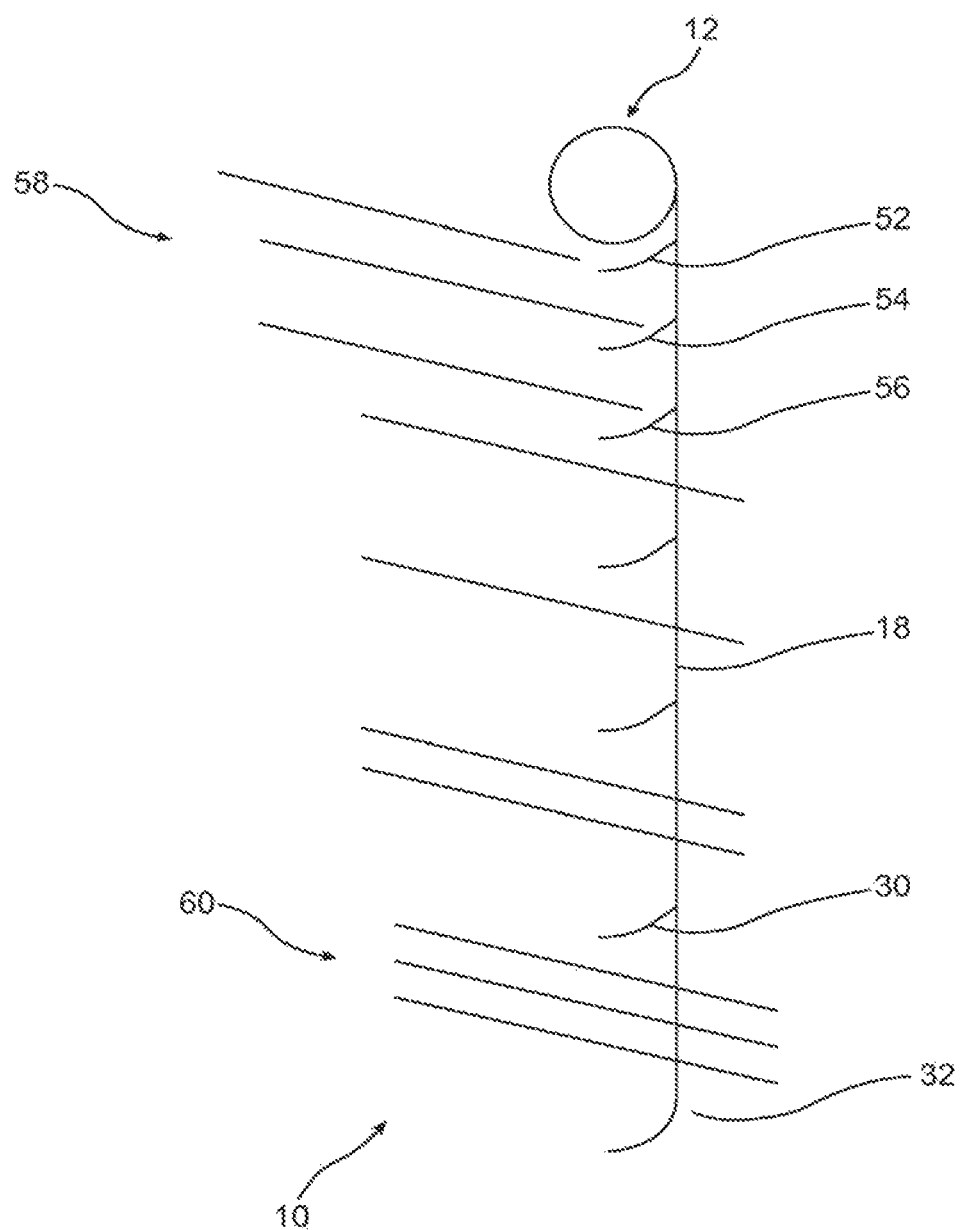
FIG. 4 illustrates a disclosed slatted roller blind in which the slats are height-wise progressively spaced.

In the embodiment illustrated in FIG. 4, a progressive height-wise spacing can also be provided between slats, as illustrated in exaggerated form in the figure. Here, the blind 10 is installed such that the rear surface of the slats is against the screen while the front surface of the slats projects towards the direct incident light.

As illustrated, height-wise spacing between adjacent slats progressively increases, starting at the top slat and continuing to the bottom slat. For example, turning to the top three slats 52, 54, 56, the distance between the second and third slats 54, 56 is greater than the distance between the first and second slats 52, 54. The actual spacing gradient between each slat could increase by, for example, ten-thousandths to fifteen-thousandths of an inch.

In the figure, direct incident light is illustrated in as sets of essentially parallel lines 58, 60. Due to the progressive height-wise spacing, direct light is blocked from passing through the top pair of slats 52, 54. However, some direct light is capable of passing through, for example, the bottom pair of slats (the aforementioned first and second slats) 30, 32.

The progressive height-wise spacing provides more view and less shade through the bottom slats 30, 32 as compared with the top slats 52, 54. As a result, sunlight is allowed to enter and brighten a space while being blocked from the eyes of persons standing in the space. Other height-wise spacing options include the reversed spacing progression, a constant spacing between slats, a progression defined by non-linear gradient, such as a parabolic gradient, or a non-uniform gradient.

Materials used for the slatted roller blind 10 include, for the roller 12 illustrated in FIG. 1, an aluminum tube typically having an outer diameter of approximately two inches and a wall thickness of approximately a sixteenth of an inch. Other tube materials and sizes could be utilized, including, e.g., a one inch outer diameter tube.

Figure 5:
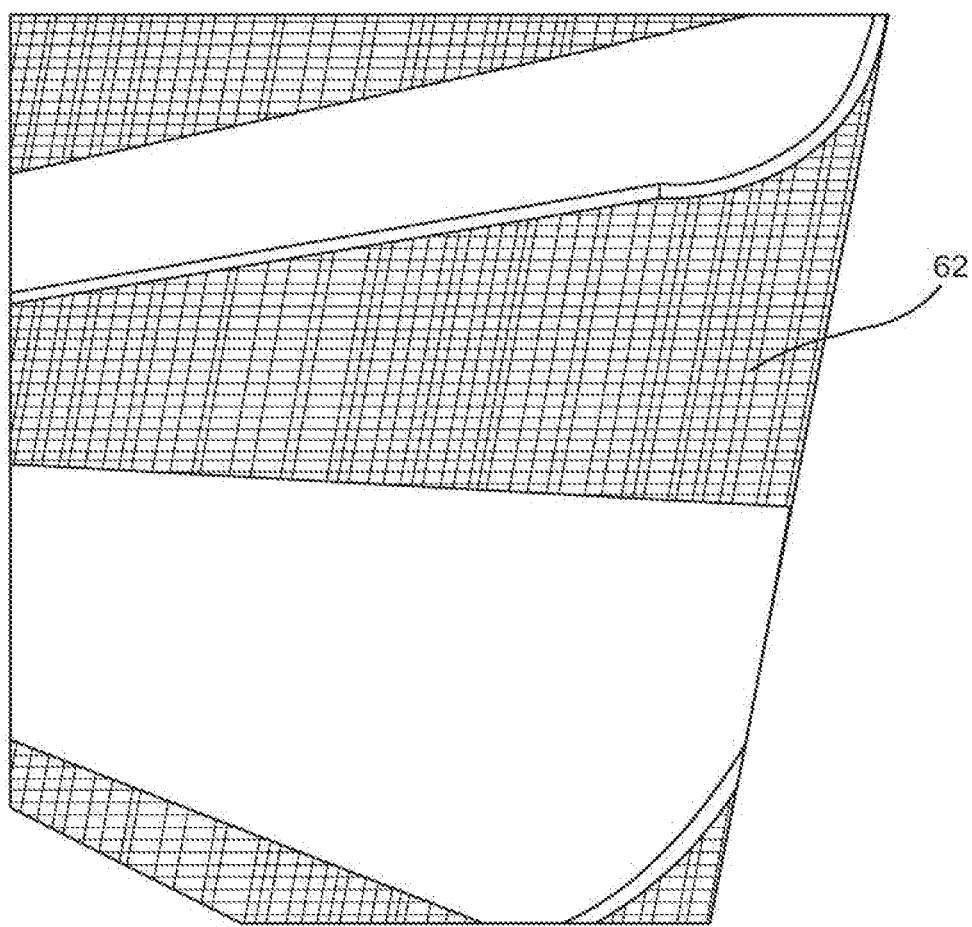
FIG. 5 represents a magnified view of the disclosed slatted roller blind illustrated in FIG. 1, illustrating a fabric used for the screen.

For the screen 18, in an indoor setting, a woven or knit, semi-sheer or sheer fabric could be used. The indoor fabric illustrated in FIG. 5 includes an aesthetic design print or pattern 62, providing the appearance of sets of lines which extend lengthwise along the screen and are grouped widthwise along the screen.

For external purposes, instead of a woven fabric, a rollable screen suitable for outdoor exposure can be utilized. Screen materials may include metal, such as, but not limited to, aluminum, or plastic, vinyl, fiberglass, and the like. A typical window screen, for example, can be fabricated from an aluminum mesh or core-and-sheath, such as vinyl-coated fiberglass yarns, or polyethylene coated polypropylene yarns, which are heat-fused after weaving to fix the yarns at their crossing points. A screen in the form of a wire mesh material may be oriented at a forty-five degree angle or some other angle which offsets the mesh from a typical window or door screen orientation, so as to avoid a visual moire pattern.

The slats 30, 32 are manufactured from a non-woven blackout, i.e., opaque, fabric, such as a non-woven fabric laminated to an opacifying film. Other materials include thermoplastic, such as PVC, PET (polyester) or polycarbonate, e.g., seven to fifteen mils thick PVC, PET, or PC film, which is thermo-formable at between (170) and (250) degrees F. Another example is a one mil of white PET (opacifying film) laminated to a non-woven, fifty to eighty grams-per-square-meter fabric, made of thermo-formable polyester fiber, which easily accepts glue and coloring as desired.

The slats 30, 32 can be attached to the screen 18 by applying an adhesive to the rear surface of the slat (i.e., facing the screen 18) at the respective slat top edges 44, 48. One appropriate adhesive is a co-polyester adhesive hot-melt, applied under pressure.

Having discussed the blind 10 fabricated by the inventive process, attention will now be directed to the process and system for manufacturing the same.

Figure 6:
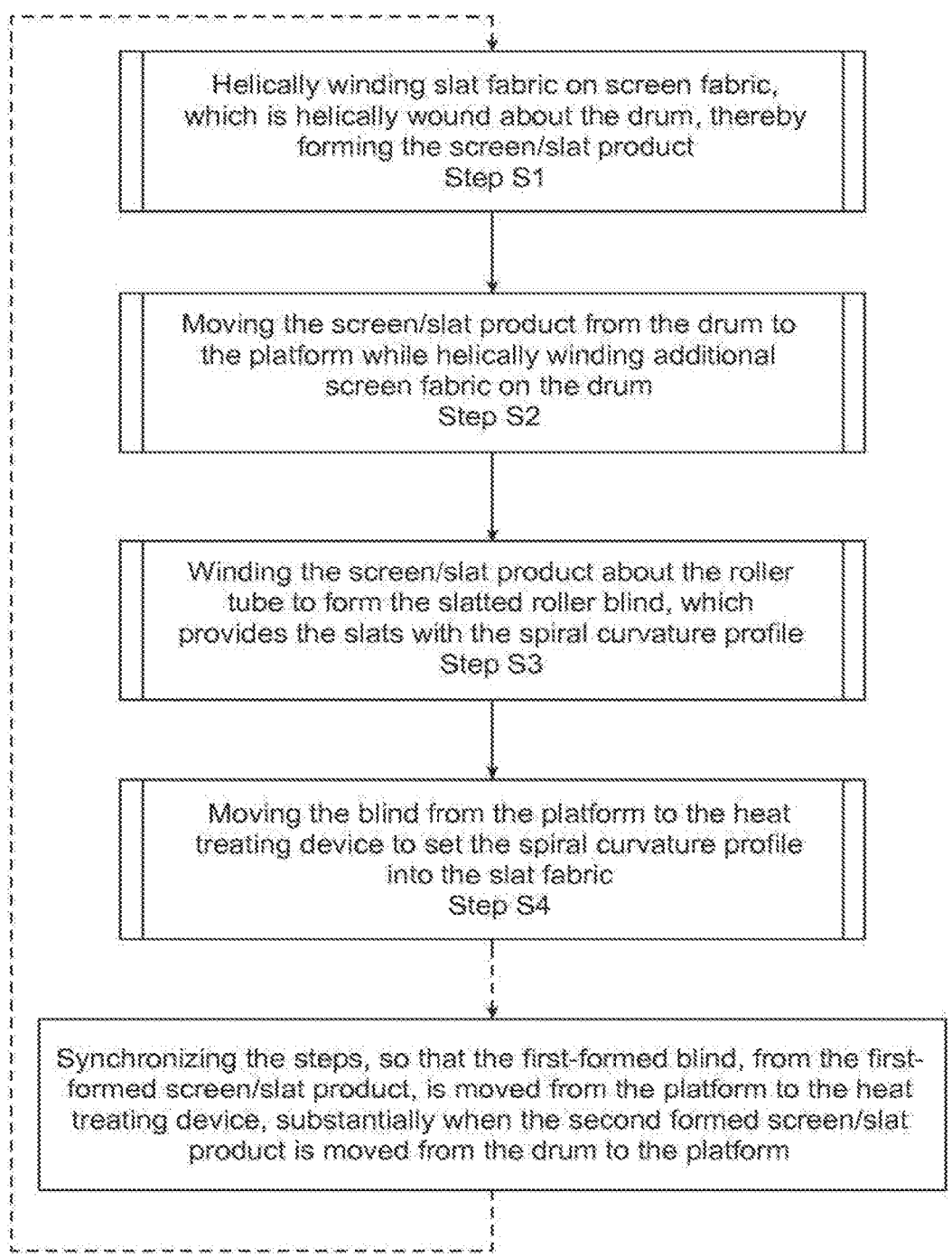
FIG. 6 is a flowchart of the process of manufacturing the slatted roller blind of FIGS. 1-5.

As illustrated in FIG. 6, the process and system for manufacturing slatted roller blinds includes structure for performing a first step, Step S1, of helically winding slat fabric on screen fabric, which is helically wound about a drum shell, and forming a screen/slat product. A second step, Step S2, includes moving the screen/slat product from the drum shell to a platform while helically winding additional screen fabric on the drum shell.

The process next returns to Step S1 and winds additional slat fabric about the additional screen fabric. Simultaneously, the process continues to a third step, Step S3, of winding the screen/slat product about a roller tube, to form a slatted roller blind, which provides the slats with a spiral curvature profile. A fourth step, Step S4, includes moving the blind from the platform to a heat treating device.

The steps are synchronized, so that a first-formed blind from a first-formed screen/slat product is moved from the platform to the heat treating device, substantially when a second-formed screen/slat product is moved from the drum to the platform. Accordingly, an ongoing cycle of manufacturing blinds is provided by the disclosed process.

Turning now to FIGS. 7-12, a further discussion will now be provided of a system 100 which is capable of performing Step S1 of helically winding slat fabric on screen fabric, which is helically wound about a drum shell, and forming a screen/slat product.

Figure 7:
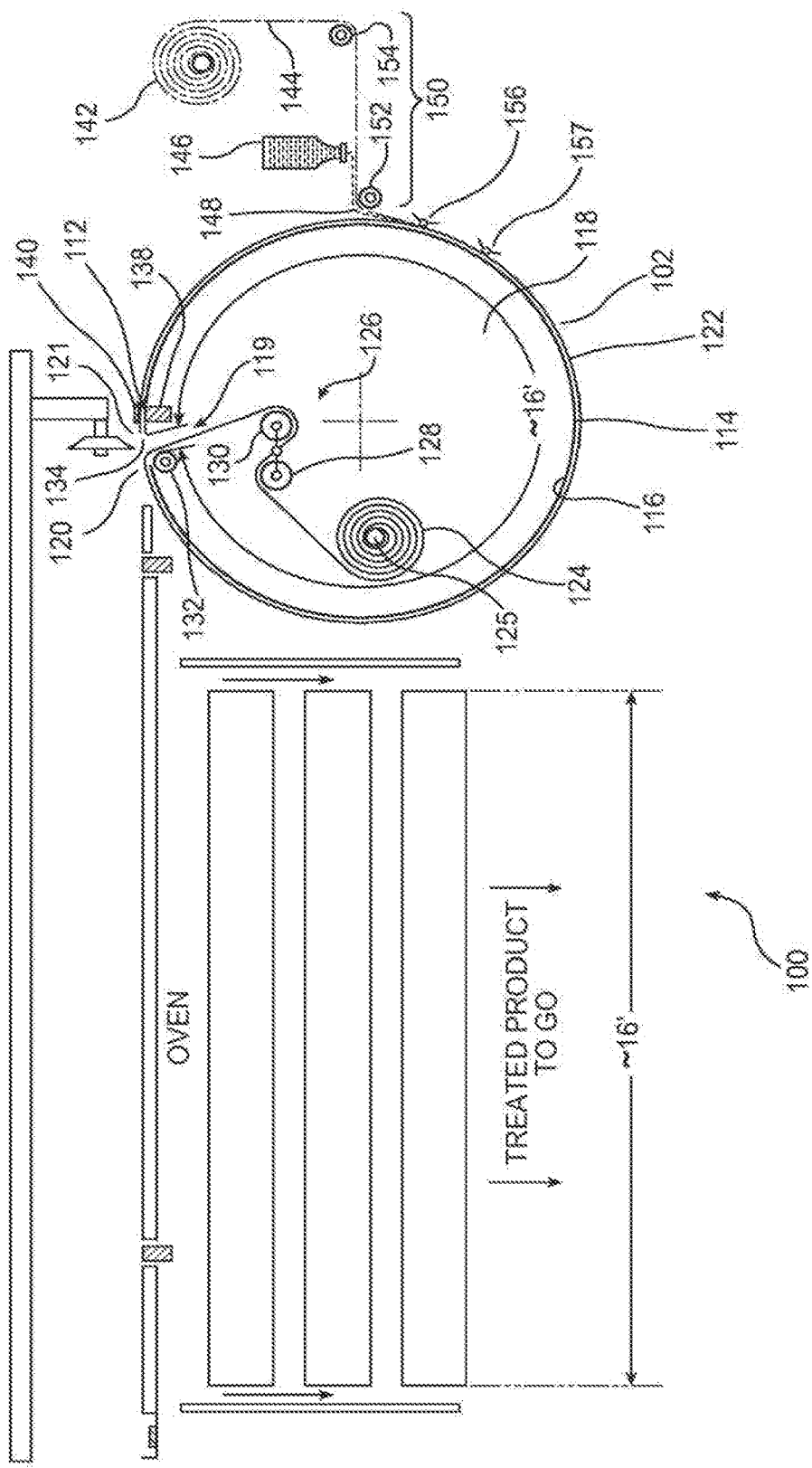
FIG. 7 represents a front elevational view of the disclosed system while performing a first step of the inventive process.
Figure 8:
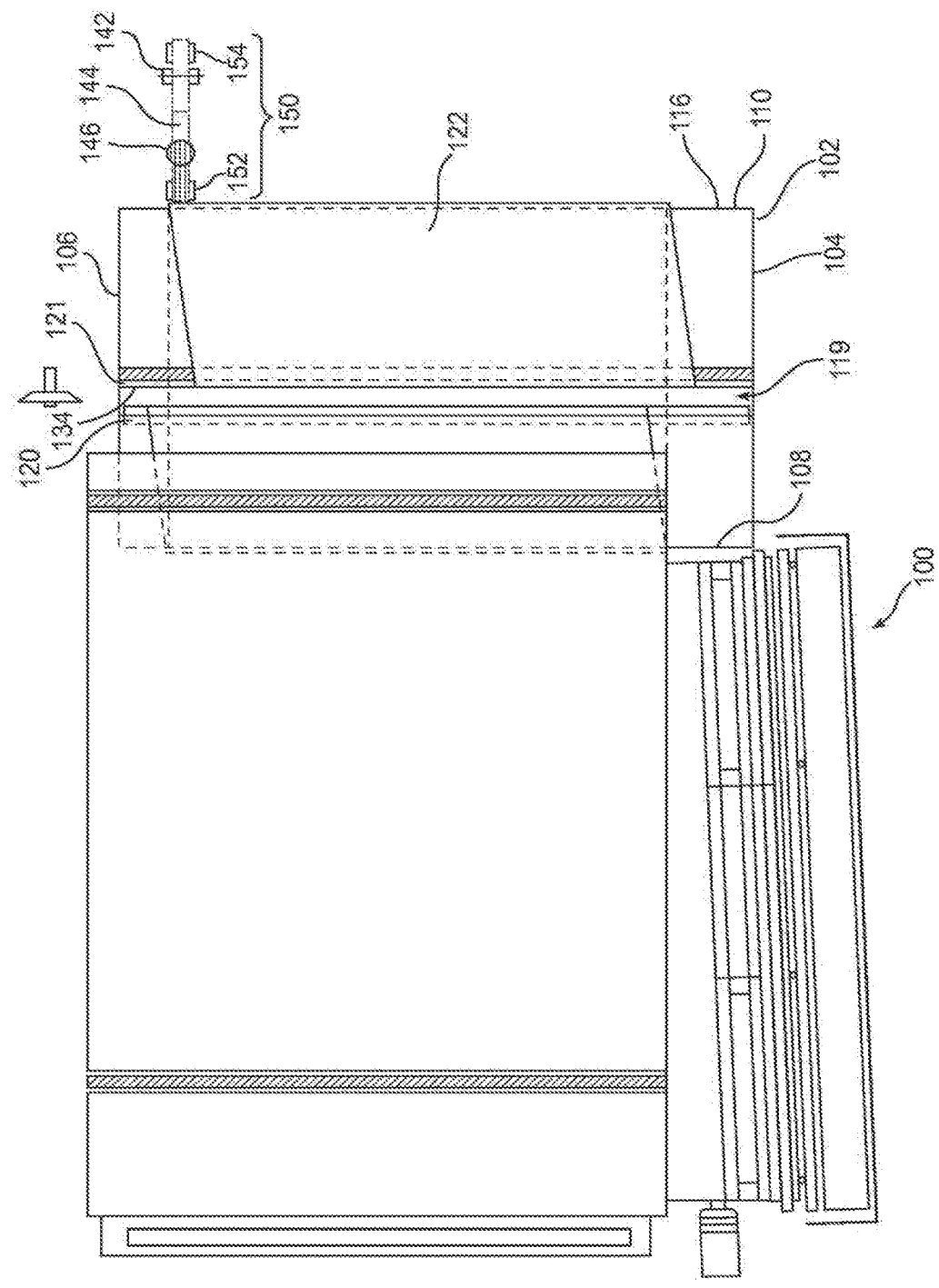
FIG. 8 represents a top elevational view of the disclosed system while performing a first step of the inventive process.

As illustrated in FIGS. 7 and 8, the components of the system 100 which accomplish Step S1 include a master drum 102, which is capable of rotating about its center axis by suitable automated machinery. For orientation purposes, considering polar coordinates, the drum has axial front and rear ends 104, 106 as well as radial left and right sides 108, 110, and top and bottom ends 112, 114. Clockwise and counterclockwise orientations are those consistent with the front elevational views.

The drum 102 has an external shell 116 and an internal cavity 118. The drum shell 116 has an axial opening 119 which extends the axial length of the drum 102. The axial opening 119 is in the top end 112 of the drum shell 116 when the drum 102 is in its initial position. The axial opening 119 has circumferentially spaced, left 120 and right 121, axially extending sides. Through the axial opening 119, screen fabric 122 is capable of being drawn and wound, counter-clockwise, about the drum shell 116, as discussed below.

The drum shell 116 has a circumferential span that defines the maximum blind width. As indicated, above, one suitable fabrication width, which can be subdivided into plural blinds 10, is substantially, but not limited to, sixteen feet. The axial length of the drum 102 is discussed below.

Several components are disposed within the drum cavity 118. All of these components revolve about the drum center axis with the automated rotation of the drum 102. A discussion of these components is now provided.

A screen fabric supply roll 124, which provides the screen fabric 122, is provided within the drum cavity 118. An axial length of the screen fabric supply roll 124 defines the maximum height-wise span of the fabricated blind 10, illustrated in FIG. 1. Accordingly, the drum 102 has an axial length which is greater than the axial length of the screen fabric supply roll 124. This enables the drum shell 116 to support the entire height-wise span of the screen fabric 122 during the fabrication process.

The screen fabric supply roll 124 is supported on a mechanized roller 125. The roller 125 is capable of being driven to feed additional screen fabric or being rotationally locked to prevent the feeding of additional fabric. The roller 125 is, e.g., belt driven.

In the drum cavity 118, the screen fabric is wound through a web tension control dancer 126, which is illustrated as a typical dual roll 128, 130 dancer system. The screen fabric is further wound against a guide roller 132, located on the left side 120 of the axial opening 119. The guide roller 132 guides the screen fabric out of the axial opening 119 of the drum shell 116.

Once drawn from the axial opening 119, and wrapped counterclockwise about the drum shell 116, the screen fabric 122 terminates at a leading edge 134, at the right side 121 of the axial opening 119 of the drum shell 116. Wrapping the fabric 122 counterclockwise about the drum shell 116 draws the screen fabric 122 against the left side 120 of the axial opening 119. Accordingly, with the fabric leading edge 134 terminating at the right side 121 of the axial opening 119, the screen fabric 122 does not extend circumferentially over the axial opening 119.

Another component of the drum 102, though not within the cavity 118, is a drum magnet 138. The drum magnet 138, as well as other magnets utilized in this process, discussed below, may be electromagnets or permanent magnets. The drum magnet 138 is essentially flush with the drum shell 116, at the right side 121 of the axial opening 119, under the leading edge of the fabric 134. Structure providing a stationary support for the drum magnet 138 is disposed within the drum cavity 118 and not illustrated here.

A metallic bar 140 locks the leading edge of the screen fabric 134 against the drum magnet 138. Locking the screen supply roll 124, and positioning the metallic bar 140 against the magnet 138, keeps the screen fabric 122 taut throughout Step S1. The metallic bar 140 has a length which is at least the same as the axial length of the screen supply roll 124 so as to grip the full leading edge 134 of the screen fabric 122.

Other components for performing Step S1 include a slat fabric supply roll 142. The slat fabric supply roll 142 provides slat fabric 144 for distribution against the screen fabric 122. An adhesive dispenser 146 provides adhesive 148, enabling the slat fabric 144 to stick to the screen fabric 122.

Structure 150 is provided for distributing slat fabric 144 against the screen fabric 122. The slat distributing structure 150 also supports the slat fabric supply roll 142 and the adhesive dispenser 146. The slat distributing structure 150 includes one or more guide rollers 152, 154 for guiding the slat fabric 144 from the slat fabric supply roll 142 to the adhesive dispenser 146 and onto the screen fabric 122.

Slat fabric 144 is guided through the slat distributing structure 150 so that adhesive 148 is applied only along one edge of on the rear surface of the slat fabric 144 (i.e., the surface facing the screen fabric 122). This edge corresponds to, e.g., the top edge 42, 46 of the slats 30, 32 in the finished blind 10, illustrated in FIGS. 1 through 4.

Additionally, a roll of release paper (not illustrated) is supported by the slat distributing structure 150. The release paper is wound about the screen fabric 122, simultaneously with the slat fabric 144 such that a top edge of the release paper is aligned adjacent with, but does not cover, the glue line at the top edge of the rear surface of the slat fabric 144. The release paper extends past the bottom edge of the rear surface of, e.g., slat 30, and covers substantially the full front surface of the previously wound slat 32 (see FIGS. 3 and 4).

Alternatively, the release paper could be wide enough to cover the entire surface of the screen fabric 122. In such case, a base layer of release paper could be either rolled between the screen fabric 122 and the drum 102 or over the screen fabric 122 after the completed application of the slat fabric 144. Such a length of release paper could be obtained from a roll of such material from within the drum 102 and wound about the drum 102 along with the winding of the screen fabric 122.

The release paper prevents the adhesive from bleeding through the screen fabric 122 and bonding to an adjacent slat when the blind is in a wound configuration during the heat treating process, discussed below. The bleeding is largely a result of the flow characteristics of the adhesive as the temperature is raised during the heat treating process. If the selected adhesive does not flow or bond from the heat treating temperatures, then this application of release paper may be unnecessary.

The slat distributing structure 150 includes a pair of nips 156, 157, which can be a small piece of sheet-metal, plastic or other rigid material. The nips 156, 157 are disposed in line, but downstream of the guide rollers 152, 154. Nip 156 serves to position the slat fabric 144 against the screen fabric 122 and nip 157 firmly presses the adhesive 148 into the screen fabric 122. This process creates a bond between the slat fabric 144 and the screen fabric 122.

The slat distributing structure 150 is positioned against the right side 110 of the drum 102. The structure 150 remains at the right side 110 of the drum 102 throughout the manufacturing process. Furthermore, the slat distributing structure 150 is initially disposed at the axial rear 106 of the drum 102. The structure 150 is capable of translating between the rear 106 and front 104 ends of the drum during the manufacturing process.

Figure 9:
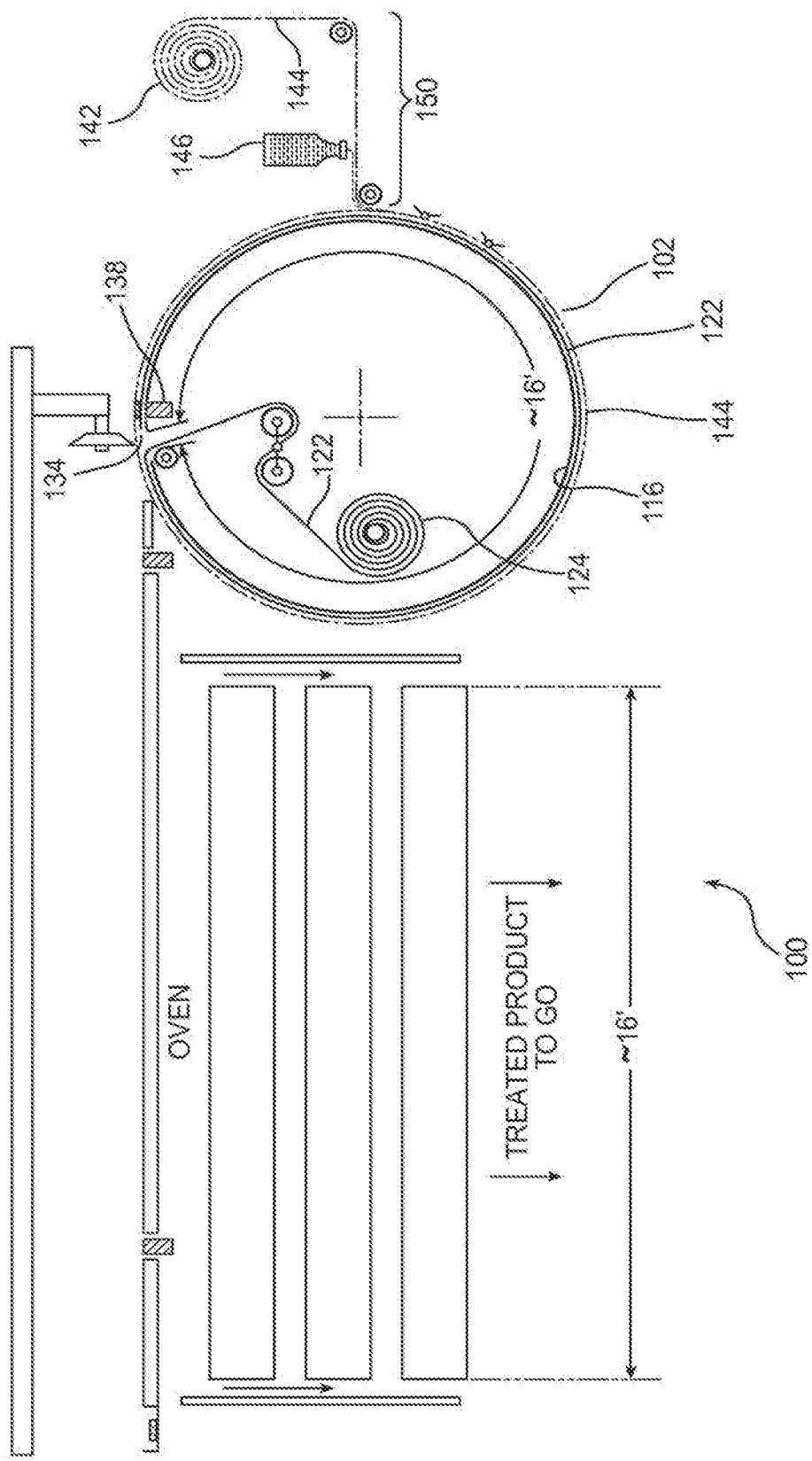
FIG. 9 represents a front elevational view of the disclosed system while performing a first step of the inventive process.
Figure 10:
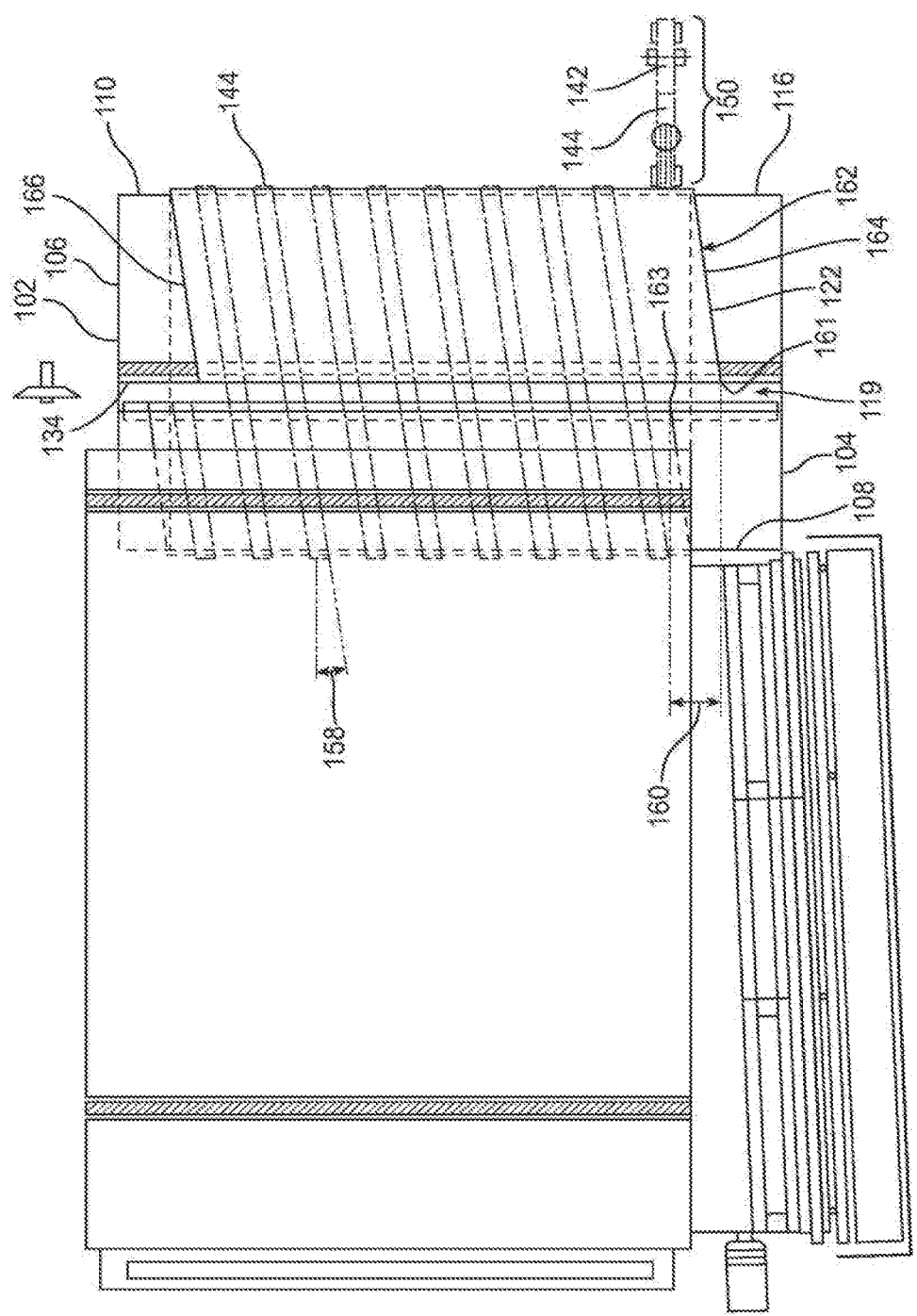
FIG. 10 represents a top elevational view of the disclosed system while performing a first step of the inventive process.

As illustrated in FIGS. 9 and 10, when applying the slat fabric 144 to the screen fabric 122, the drum 102 spins in a clockwise direction. During this operation, the slat distributing structure 150 automatically travels towards the axial front end 104 of the drum 102. The slat fabric 144 is drawn from the slat fabric supply roll 142 and adhered to the screen fabric 122.

The rate of axial advancement of the slat distributing structure 150, against the drum shell 116, is based on the height-wise separation of adjacent slats on the finished blind 10, illustrated in FIG. 1 (and exaggerated in FIG. 10). For example, if the spacing between the top edges of adjacent slats is a constant, e.g., two inches, then the rate of axial advancement of the slat distributing structure 150 is two inches per revolution of the drum 102.

Alternatively, if a height-wise progressive scheme of spacing is utilized, as illustrated in FIG. 4, then the rate of axial advancement of the slat distributing structure 150 changes as deemed necessary. The change in the rate of axial advancement of the slat distributing structure 150 is readily automated by computer-based controls.

For example, when manufacturing the blind of FIG. 4, the height-wise spacing changes incrementally between the slats. That is, the spacing becomes greater as the slats are positioned further from the top of the blind 10. The change is apparent when examining the spacing between slats 30, 32, at the bottom of the blind 10, as compared with slats 52, 54, at the top of the blind 10. The rate of axial advancement of the slat distributing structure 150 is controlled to provide for this height-wise spacing scheme.

Axially progression of the slat distributing structure 150 while spinning the drum 102 leads to helically depositing the slat fabric 144 on the screen fabric 122. Relative to the radial axis of the drum 102, the slat fabric 144 is deposited at an angle, reference number 158, illustrated in FIG. 10.

In order to correct for the angular positioning of the slats on the screen fabric 122, the fabric 122 is helically wound on the drum shell 116. The helical winding is measurable as, e.g., an axial spacing 160 between a front corner 161 of the fabric leading edge 134 and a front corner 163 of the fabric as positioned at the left side 120 of the drum opening 119.

The axial spacing 160 is substantially the same as the height-wise spacing between adjacent slats in the blind. The implementation of the axial spacing 160 positions the slats substantially parallel with top and bottom edges 164, 166 of the combined screen fabric 122 and slat fabric product (hereinafter the screen/slat product 162).

Helically winding so as to obtain progressive spacing results in the changing of the angular positioning 158 of the slat fabric 144 along the axis of the drum 102. For example, in FIG. 4, the height-wise spacing between slats 30, 32 is greater at the bottom of the blind 10 than with slat 52, 54 at the top of the blind. Accordingly, the angular positioning 158 is greater at the bottom of the blind as compared with the top of the blind. However, as the screen fabric 122 is a unitary piece, the angular positioning 158 of the screen fabric 122 about the drum 102, so as to obtain the axial offset 160, is constant. Accordingly, the helical winding of the screen fabric 102 is applied so as to match the angular positioning 158 of the slat fabric 128 at the axial from end of the drum 102, at the axial rear end of the drum, or an average therebetween, as may be desired.

It is to be noted that the screen fabric 122 at the left side 120 of the opening 119 experiences no axial displacement. That is, relative to the drum 102, fabric front corner 163 is axially in line with the axial front of the slat material on the roller 124. This is because this portion of the screen fabric 122 is positioned before the helical winding of the screen fabric 122 about the drum shell 116. On the other hand, screen fabric 122 at the leading edge 134, e.g., at front edge 161, experiences a maximum amount of axial displacement. This is because this portion of the screen fabric 122 represents the last portion of the screen fabric 122 wound during the helical winding process.

The process of winding the slats 144 about the screen fabric 122 sandwiches the metallic bar 140 between these two materials, at the leading edge 134 of the screen fabric 122. Furthermore, as illustrated in FIG. 10, the winding process wraps the slat fabric 144 continuously about the drum shell 116, e.g., circumferentially across the axial opening 119 in the drum shell 116.

Figure 11:
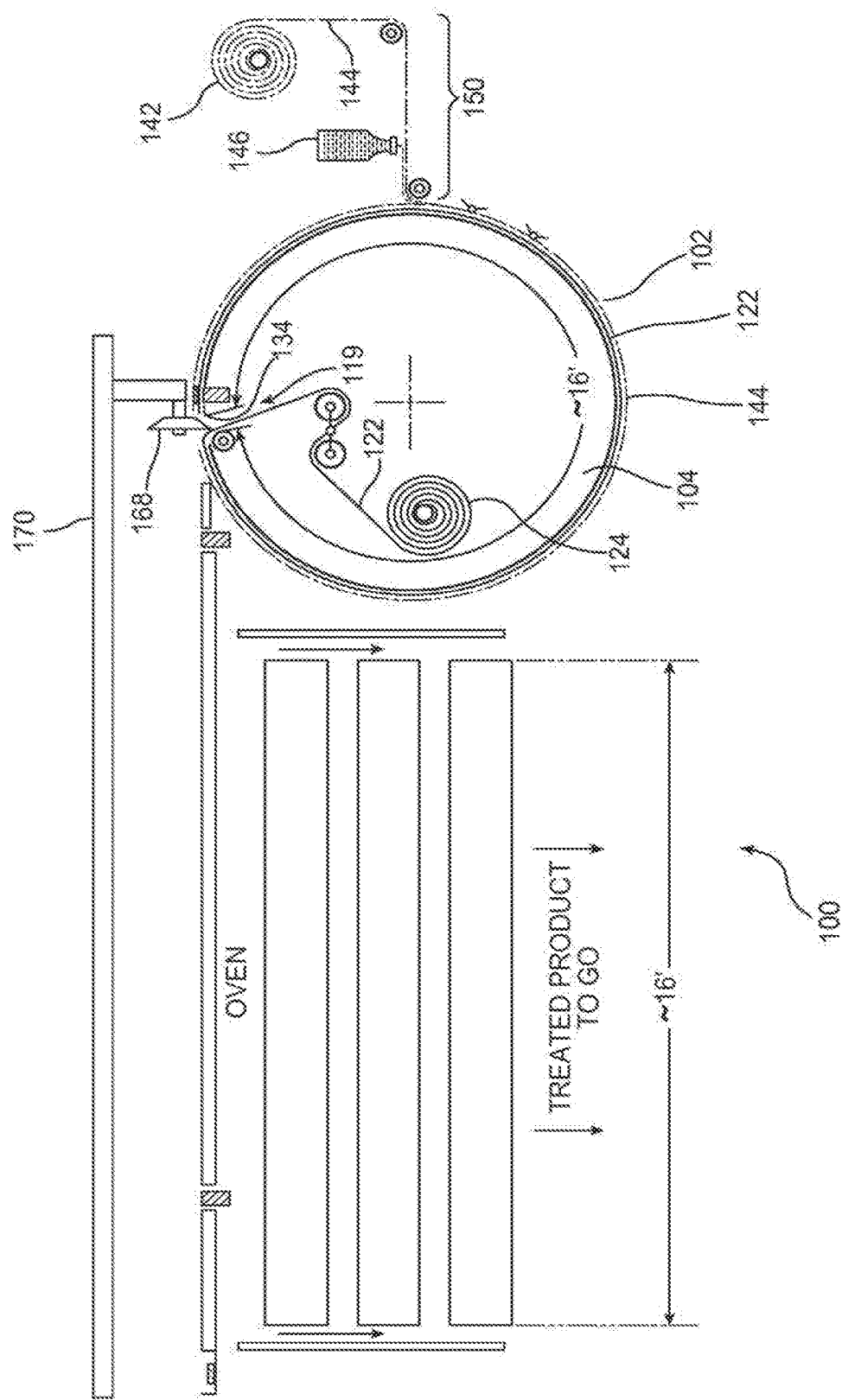
FIG. 11 represents a front elevational view of the disclosed system while performing a first step of the inventive process.
Figure 12:
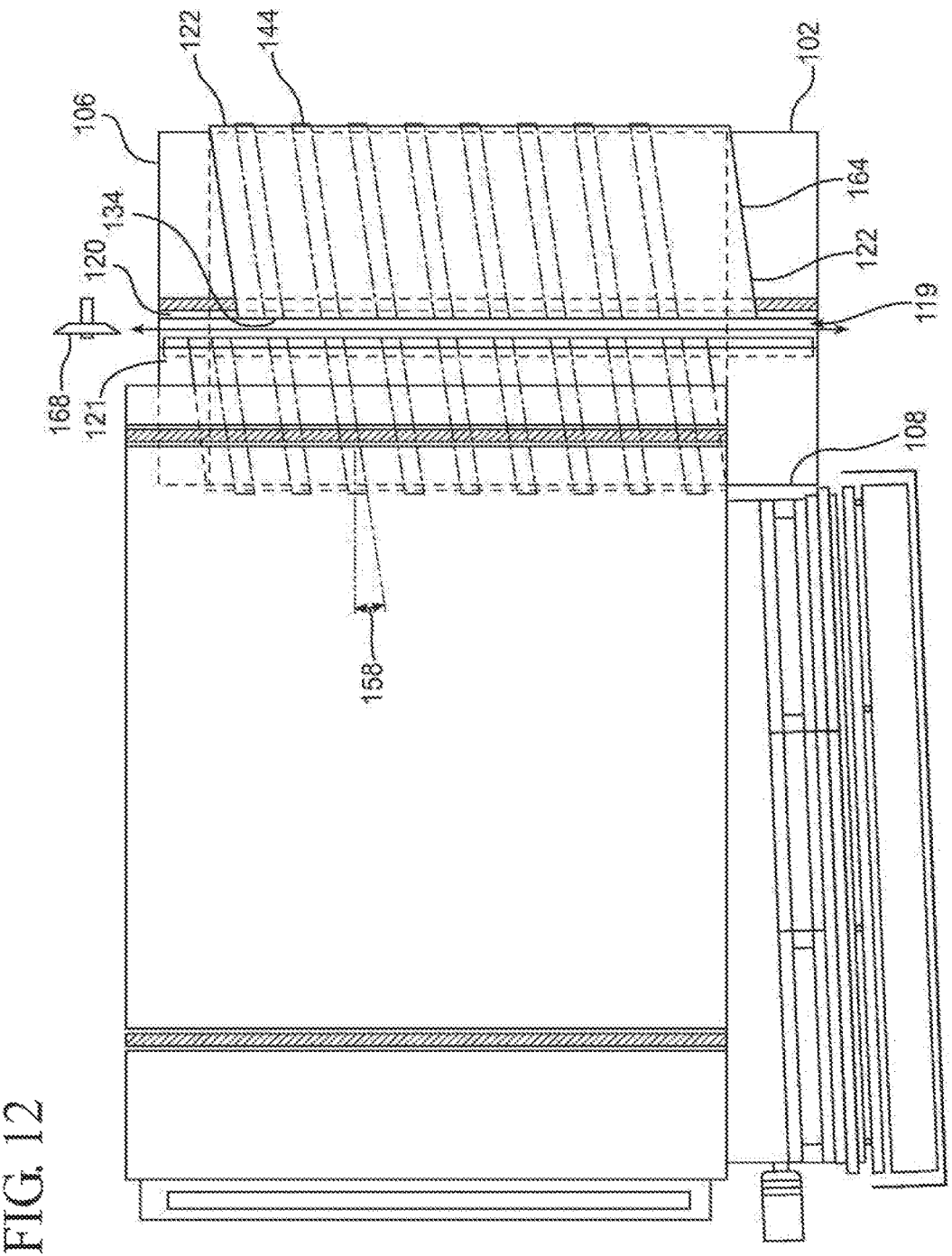
FIG. 12 represents a top elevational view of the disclosed system while performing a first step of the inventive process.

As illustrated in FIGS. 11 and 12, a cutter 168, such as a rotary knife, is supported on a gantry system 170. Once the slat fabric 144 is distributed, the drum 102 is brought to the initial position, i.e., with the axial opening 119 in the top location. At this point, the cutter 168 travels axially along the drum 102, between opposing rear and front ends 106, 104 of the drum.

During the travel of the cutter 168, it passes between the right and left sides 120, 121 of the axial opening 119. In doing so, the cutter 168 divides the slat fabric 122 (and release paper) but not the screen fabric 122. This is because, as indicated, the screen fabric 122 does not circumferentially extend over the axial opening 119. Accordingly, the screen fabric 122 remains attached to the screen supply roll 124.

Figure 13:
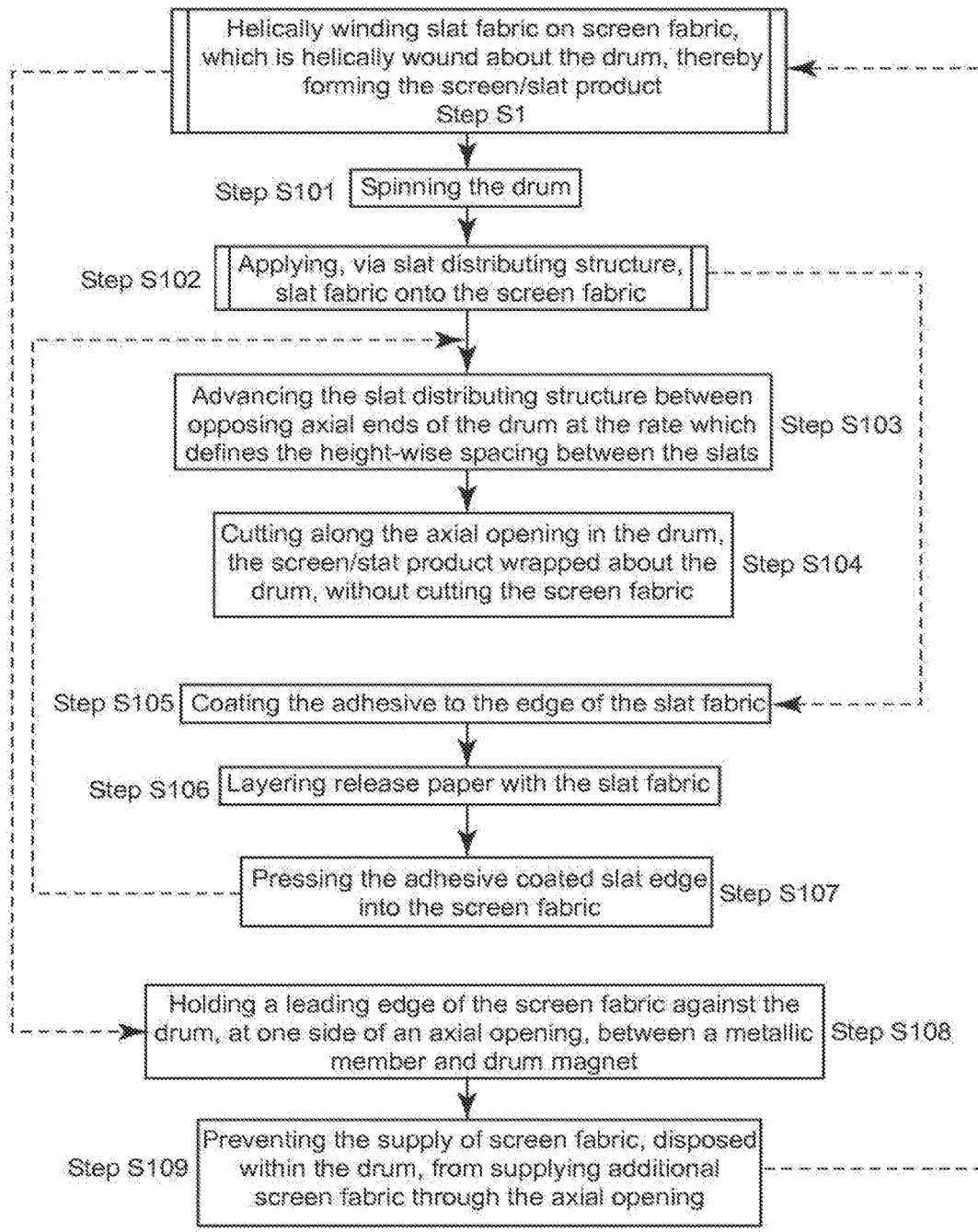
FIG. 13 is a flowchart providing further detail of the flowchart of FIG. 6.

Turning to FIG. 13, a flowchart is now provided to further illustrate the process of Step S1, of helically winding slat fabric 122 on screen fabric 144, which is helically wound about the drum 102, thereby forming the screen/slat product 162. As illustrated in the figure, Step S1 simultaneously performs the following steps: Step S101 of spinning the drum 102; Step S102 of applying, via slat distributing structure 150, slat fabric 144 onto the screen fabric 122; and Step S103 of advancing the slat distributing structure 150 between opposing axial ends 106, 104 of the drum 102 at the rate which defines the height-wise spacing between the slats. Step S1 further includes Step S104 of cutting, along the axial opening 119 in the drum 102, the screen/slat product 162 wrapped about the drum 102, without cutting the screen fabric 122.

While applying the slat fabric 144 to the screen fabric 122, other steps are performed, substantially simultaneously, by the slat distributing structure 150. Such steps include Step S105 of coating the adhesive to the edge of the slat fabric 144 and Step S106 of layering release paper with the slat fabric 144. Such steps also include Step S107 of pressing the adhesive coated slat edge into the screen fabric 122.

Additional steps are performed to assure the screen fabric 122 is properly secured to the drum shell 116 during Step S1. These steps include Step S108 of holding the leading edge 134 of the screen fabric 122 against the drum 102, at one side 121 of the axial opening 119, between the metallic member 140 and the drum magnet 138. The steps further include Step S109 of preventing the supply of screen fabric 124, disposed within the drum 102, from supplying additional screen fabric through the axial opening 119. As a result of Steps S108 and S109, the screen fabric 122 is taut on the drum 102 when helically winding the slat fabric 144 on the screen fabric 122.

Turning now to FIGS. 14 to 23, a further discussion will be provided of Step S2 of moving the screen/slat product from the drum shell to the platform while helically winding additional screen fabric on the drum shell.

Figure 14:
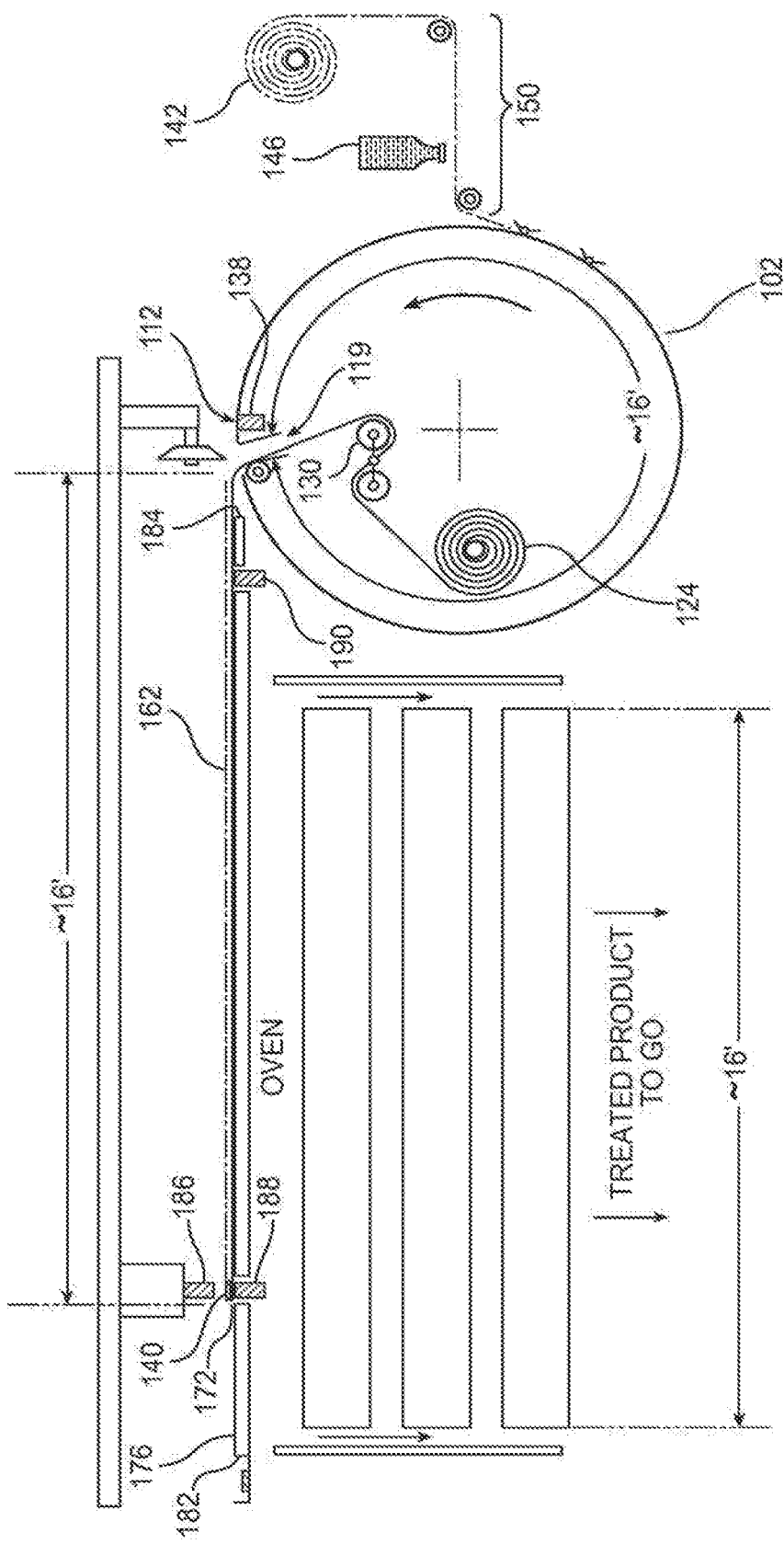
FIG. 14 represents a front elevational view of the disclosed system while performing a second step of the inventive process.
Figure 15:
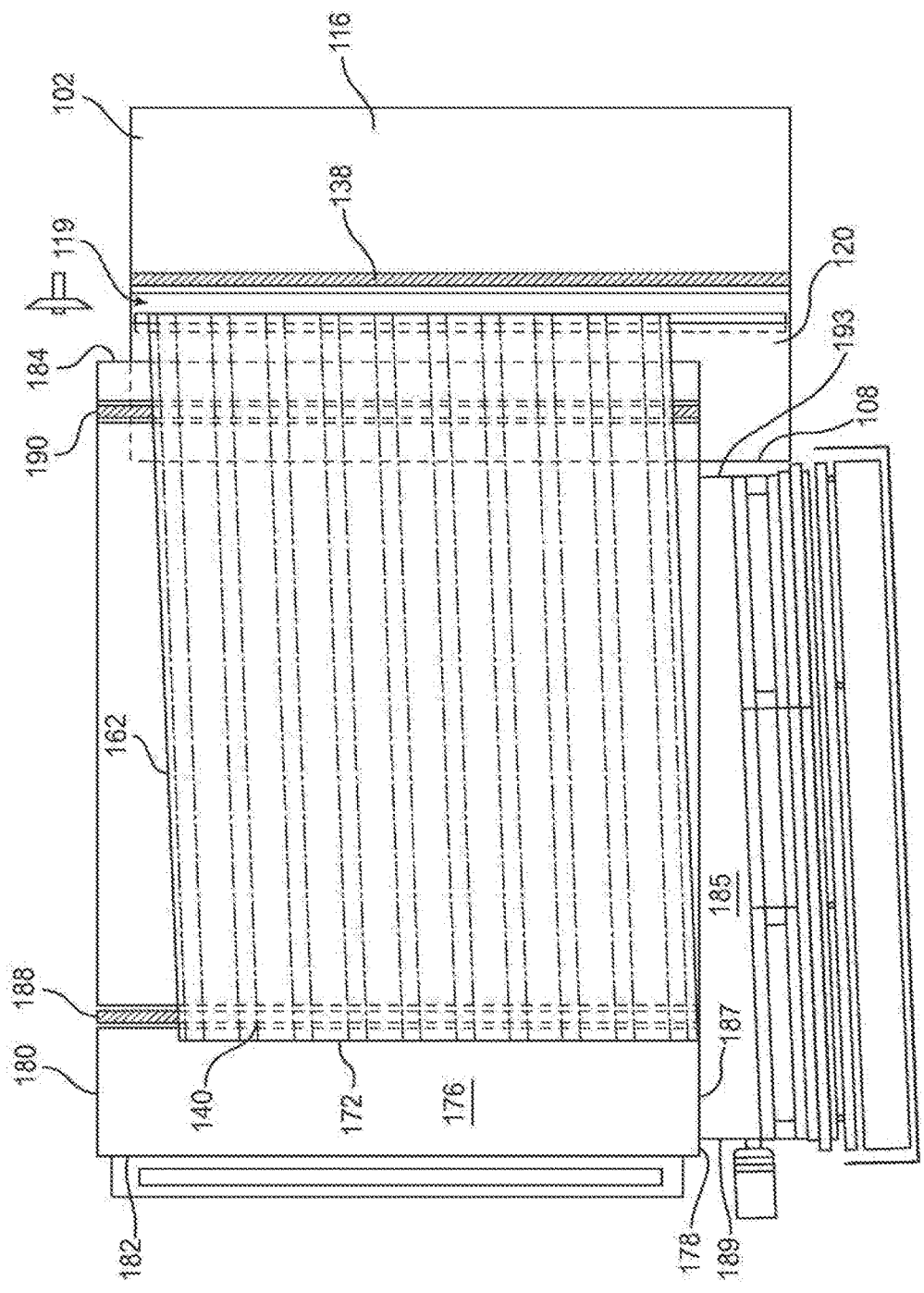
FIG. 15 represents a top elevational view of the disclosed system while performing a second step of the inventive process.

As illustrated in FIGS. 14 and 15, components required for Step S2 include a platform, such as a platform 176', which takes the form of a large rectangular table. Consistent with the above noted orientation, the platform 176 has opposing front and rear ends 178, 180 and opposing left and right ends 182, 184. Extending from the front end 178 of the platform 176 is a substantially rectangular platform extension 185. It is noted that the rectangular platform 185 is illustrated as being trapezoidal. This is only because of an exaggerated angle 221 (FIG. 23) at which a magazine of rollers 206 is illustrated as being positioned relative to the platform 176. The angle 221 and rollers 206 are discussed in greater detail, below.

The platform extension 185 has a rear edge 187 which faces the front edge 178 of the platform 176. The platform 185 has left and right edges 189, 191, which are spaced so that the platform 185 can seat a roller tube 208 (FIG. 23) on which the product 162 will be rolled, discussed in greater detail, below. The platform 185 is not illustrated in the side views and the front edge 193 of the platform is illustrated in, e.g., FIG. 28. The purpose for and other characteristics of the platform 185 are discussed below.

The span between the rear 180 of the platform 176 and the front edge 193 of the platform extension 185 is at least as large as the axial length of the drum 102 so as to provide a receiving platform for the screen/slat product 162 during processing. The right end 184 of platform 176 is adjacent to, but does not touch or extend past, and is height-wise level with, the left side 120 of the axial opening 119 in the drum shell 116. The height-wise level relationship between the top of the drum and the platform 176 enables smooth unwinding of the screen/slat product 162 from the drum onto the platform 176.

Another component of Step S2 is a gantry magnet 186 which is capable of gripping the leading edge 172 of the screen/slat product 162, via the sandwiched metallic bar 140. The gantry magnet 186 is also capable of moving the screen/slat product 162 towards the left end 182 of the platform 176. If the drum magnet 138 is a permanent magnet, then a mechanical kick-off device (not illustrated) would be utilized to release the grip between the drum magnet 138 and the metallic bar 140 at the leading edge 172 of the screen/slat product 162. The same would apply if the other magnets, discussed herein, are permanent magnets. Mechanical kick-off devices may be advantageously employed even with electromagnets to overcome residual magnetic fields.

During Step S2, the screen supply roll 124 is rotationally locked. While the gantry magnet 186 moves the screen/slat product 162, the drum 102 automatically rotates counterclockwise by one revolution, so that the axial opening 119 starts and finishes at the top 112 of the drum 102.

From the perspective of the top 112 of the drum 102, this winding motion is tangentially towards the platform 176. This motion assists in unwinding the screen/slat product 162 from the drum 102 and onto the platform 176.

The timing of the drum revolution substantially matches the speed at which the gantry magnet 186 moves the leading edge 172 of the screen/slat product 162. This enables the unwinding of the screen/slat product 162 from the drum shell 116 without pulling against the locked screen supply roll 124.

The platform 176 includes left and right magnets 188, 190, which have the same magnetic characteristics as, and are parallel with, the drum magnet 138. The left magnet 188 is spaced from the drum 102 by a distance which is substantially the same as the circumferential dimension of the drum 102. The right magnet 190 is positioned close to the right end 184 of the platform 176 for reasons discussed below.

Once the gantry magnet has unwound the screen/slat product 162 from the drum shell 116, the leading edge 172 of the screen/slat product 162 is aligned with the left platform magnet 188. That is, with the metallic bar 140, the gantry magnet transfers the leading edge 172 of the screen/slat product 162 to the left platform magnet 188. This locks the leading edge 172 of the screen/slat product against the platform 176.

Figure 16:
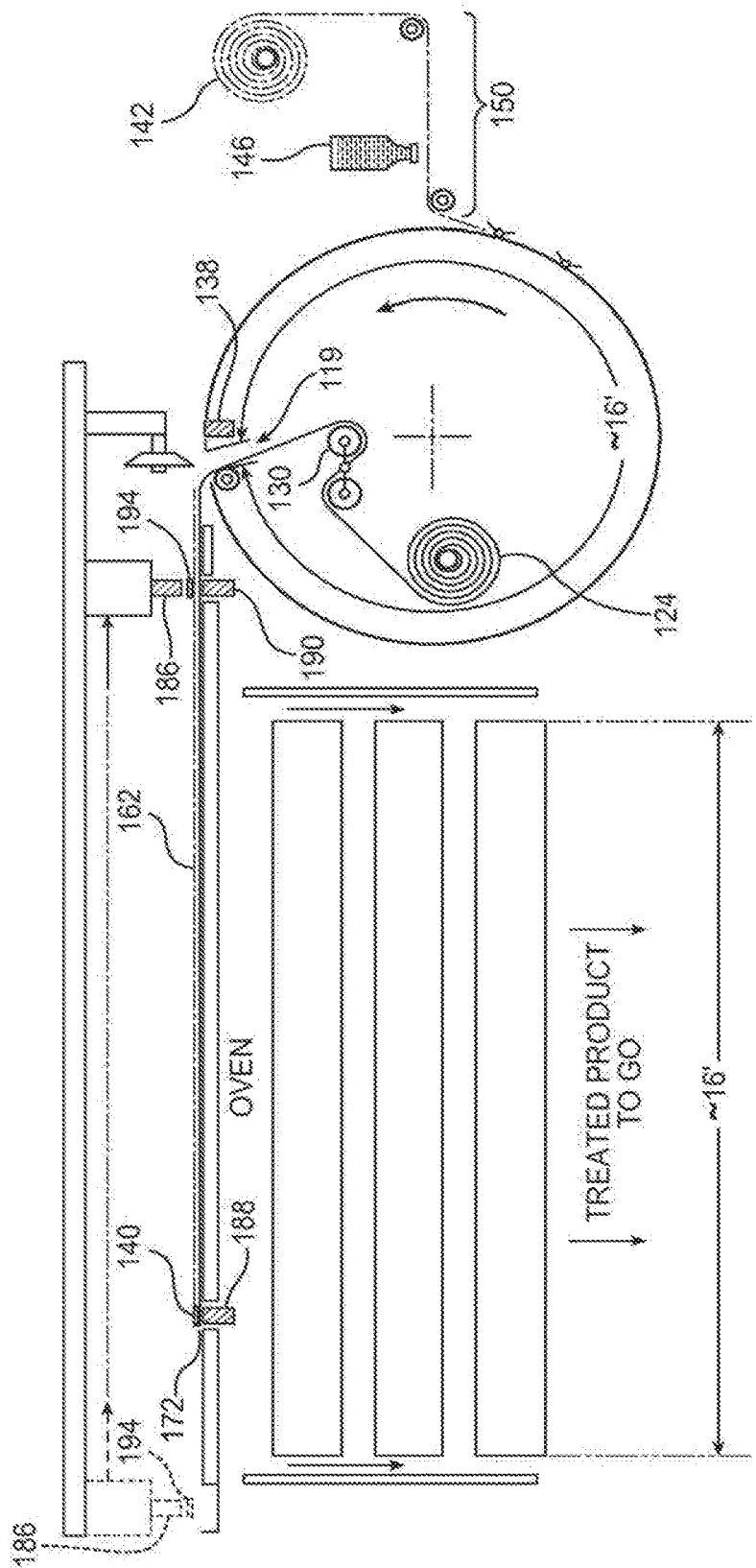
FIG. 16 represents a front elevational view of the disclosed system while performing a second step of the inventive process.
Figure 17:
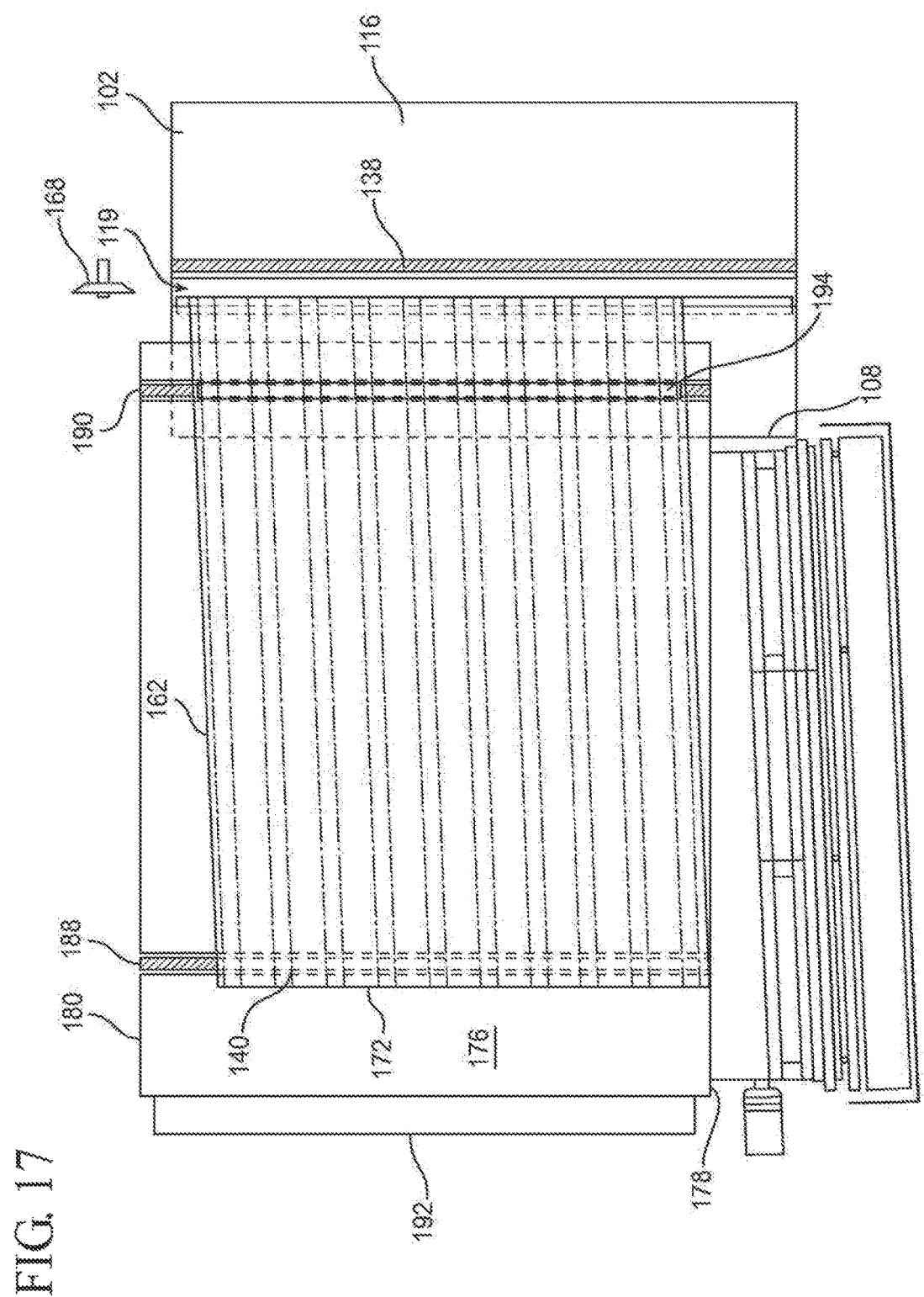
FIG. 17 represents a top elevational view of the disclosed system while performing a second step of the inventive process.

As illustrated in FIGS. 16 and 17, a bar tray 192 is located on the far left end of the platform 176. The bar tray 192 contains a second metallic bar 194, having the same characteristics as the first metallic bar 140. After the leading edge 172 of the screen/slat product 162 is locked against the left platform magnet 188, the gantry magnet 186 obtains the second metallic bar 194 from the bar tray 192. The second metallic bar 194 is deposited at the right platform magnet 190, locking the screen/slat product 162 at that location.

Figure 18:
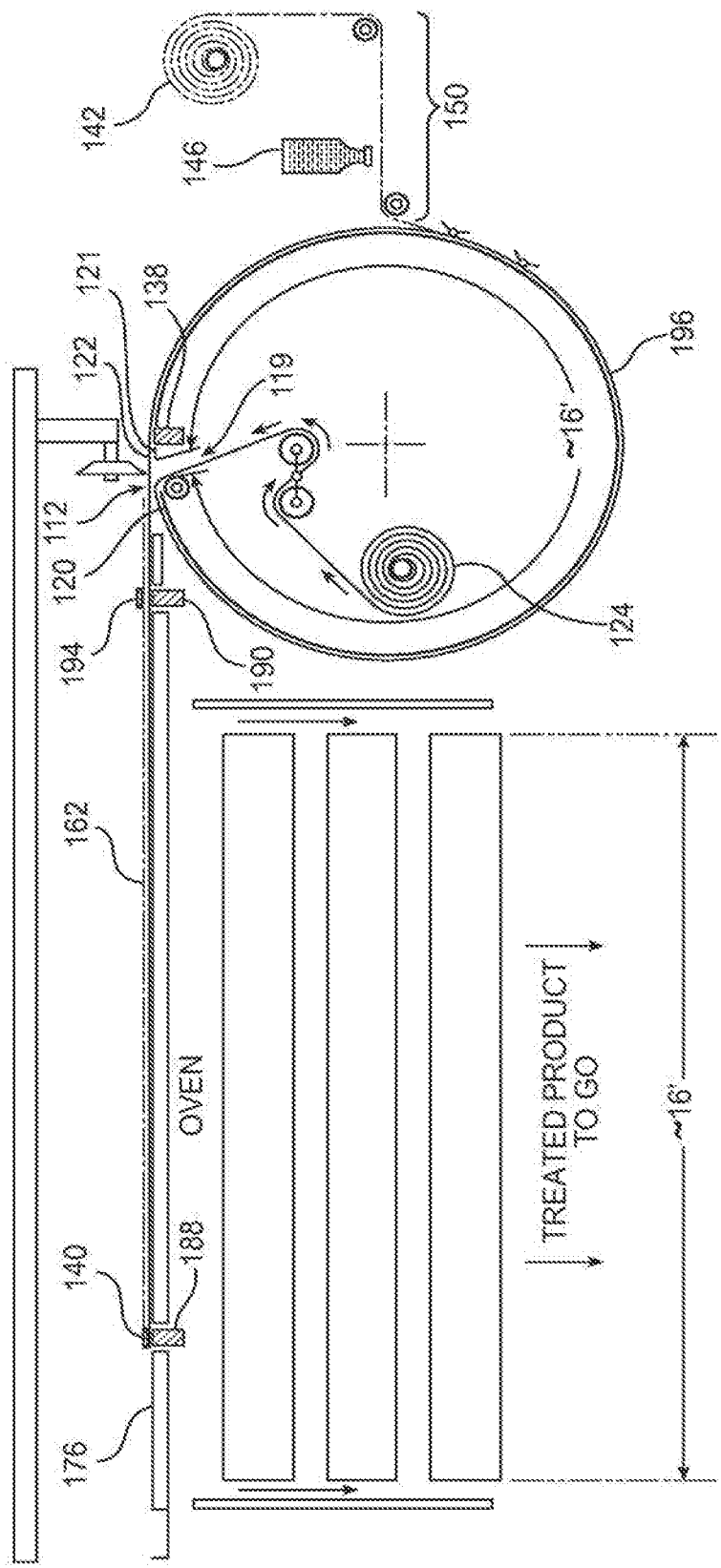
FIG. 18 represents a front elevational view of the disclosed system while performing a second step of the inventive process.
Figure 19:
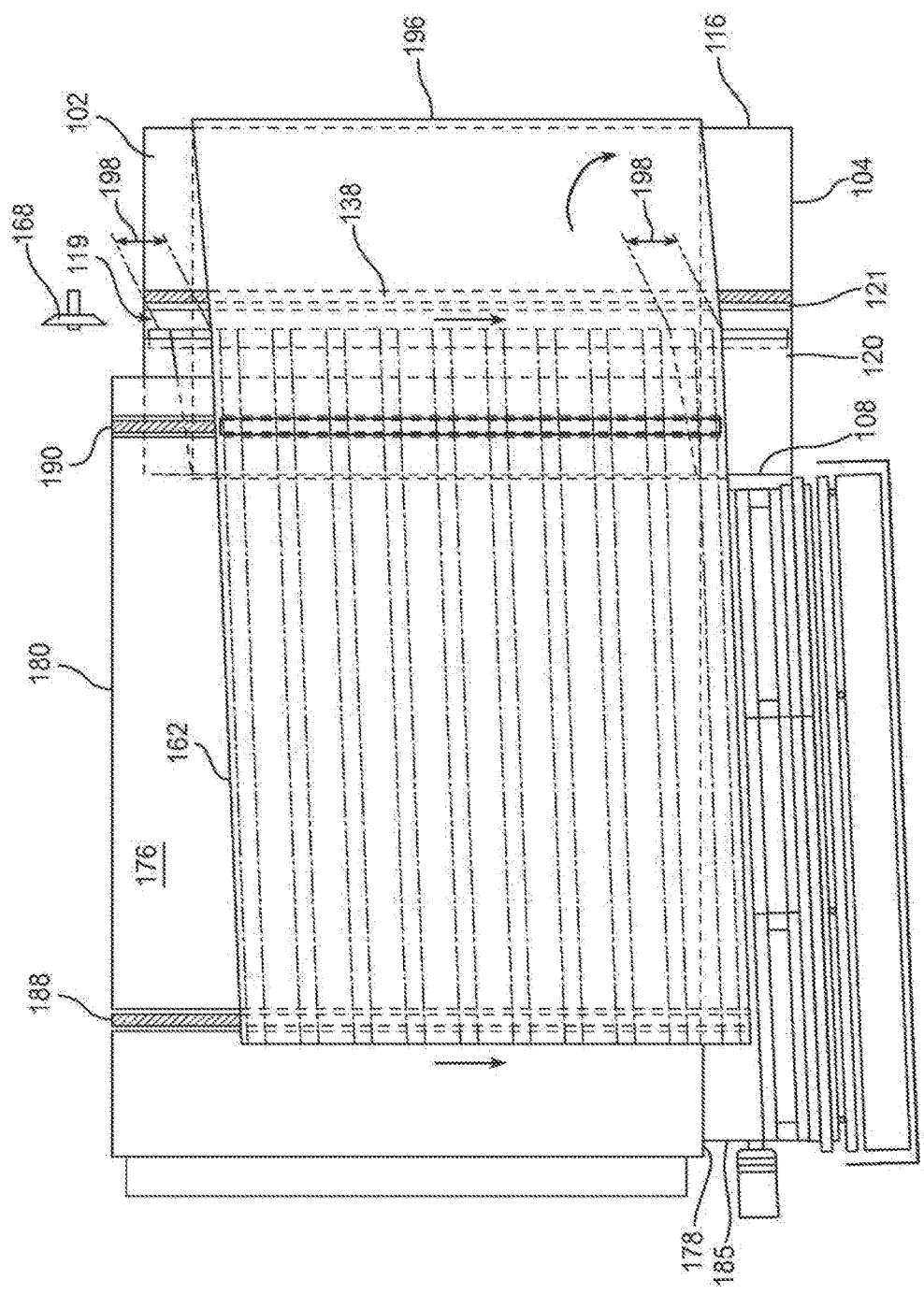
FIG. 19 represents a top elevational view of the disclosed system while performing a second step of the inventive process.

As illustrated in FIGS. 18 and 19, once the screen/slat product 162 is gripped by both platform magnets 188, 190, the drum 102 winds in a clockwise direction by one revolution, so that the axial opening 119 starts and finishes at the top 112 of the drum 102.

From the perspective of the top of the drum 102, this motion is tangentially away from the platform 176. As screen/slat product 162 is locked on the platform 176, this motion assists in pulling screen fabric 196 around the drum shell 116. During this process, the screen fabric supply roll 124 is not locked, but rather automatically revolving in a direction to assist in unwinding additional fabric 196.

The screen/slat product 162 which was against the guide roller 132, at the left side 120 of the axial opening 119, is now spaced from the guide roller 132 by the additional screen fabric 196. Furthermore, the screen fabric 122 now circumferentially extends between the left and right sides 120, 121 of the axial opening 119.

The left and right platform magnets 188, 190 are capable of moving simultaneously towards the front 178 (and back to the rear 180, at the end of the process) of the platform 176. The simultaneous movement of the magnets 188, 190 may be accomplished via, e.g., connecting the magnets 188, 190 on a common, automated track (not shown), under the platform 176.

During the winding process, i.e., while the drum 102 is advanced clockwise by one complete revolution, the platform magnets 188, 190 advance at a constant rate towards the front 178 of the platform 176. The movement of the magnets 188, 190 toward the front of the platform 176 carries the screen/slat product 162 in the same direction. The movement of the screen/slat product 162 on the platform 176 may be facilitated by an air cushion blower (not illustrated) located in the platform 176, midstream between opposing magnets 188, 190. With or without such air cushioning, this movement carries the additional screen fabric 196 towards the front axial end 104 of the drum 102.

As a result of the incremental forward traveling of the screen/slat product 162, during winding, the additional screen fabric 196 is helically wound about the drum shell 116. As with the measurement of the axial spacing 160 in the screen fabric 122, the helical winding is measurable by axial spacing 198. Furthermore, the top edge 164 of the screen/slat product 162 is now past the front edge 178 of the platform 176 and over the platform extension 185.

The location of the right platform magnet 190 is such as to minimize the travel required to obtain the proper helical winding of the additional screen fabric 196 about the drum shell 116. Such positioning is determined and optimized using basic mathematical principles, as would be known to one skilled in the art after review of this disclosure.

Figure 20:
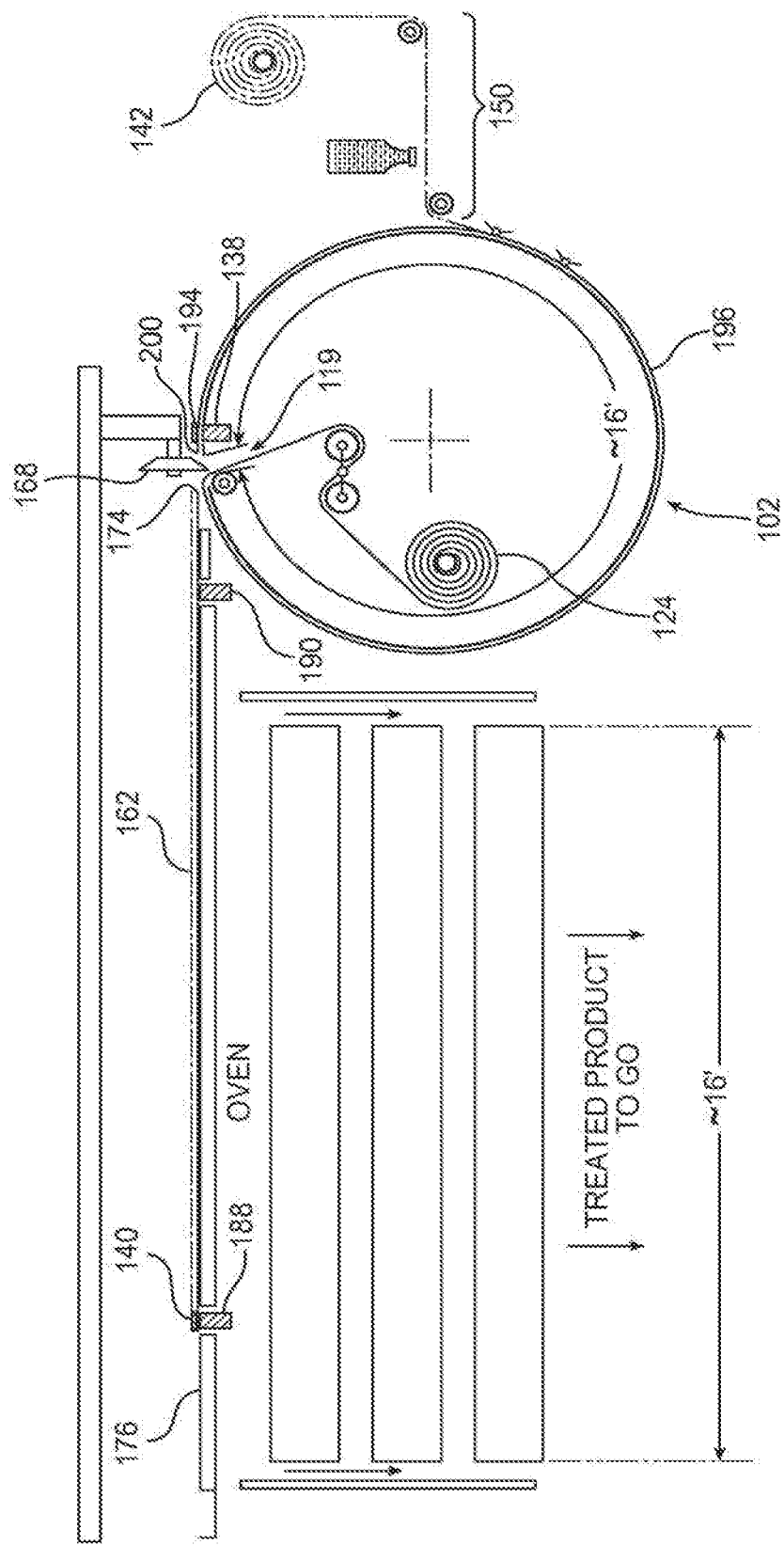
FIG. 20 represents a front elevational view of the disclosed system while performing a second step of the inventive process.
Figure 21:
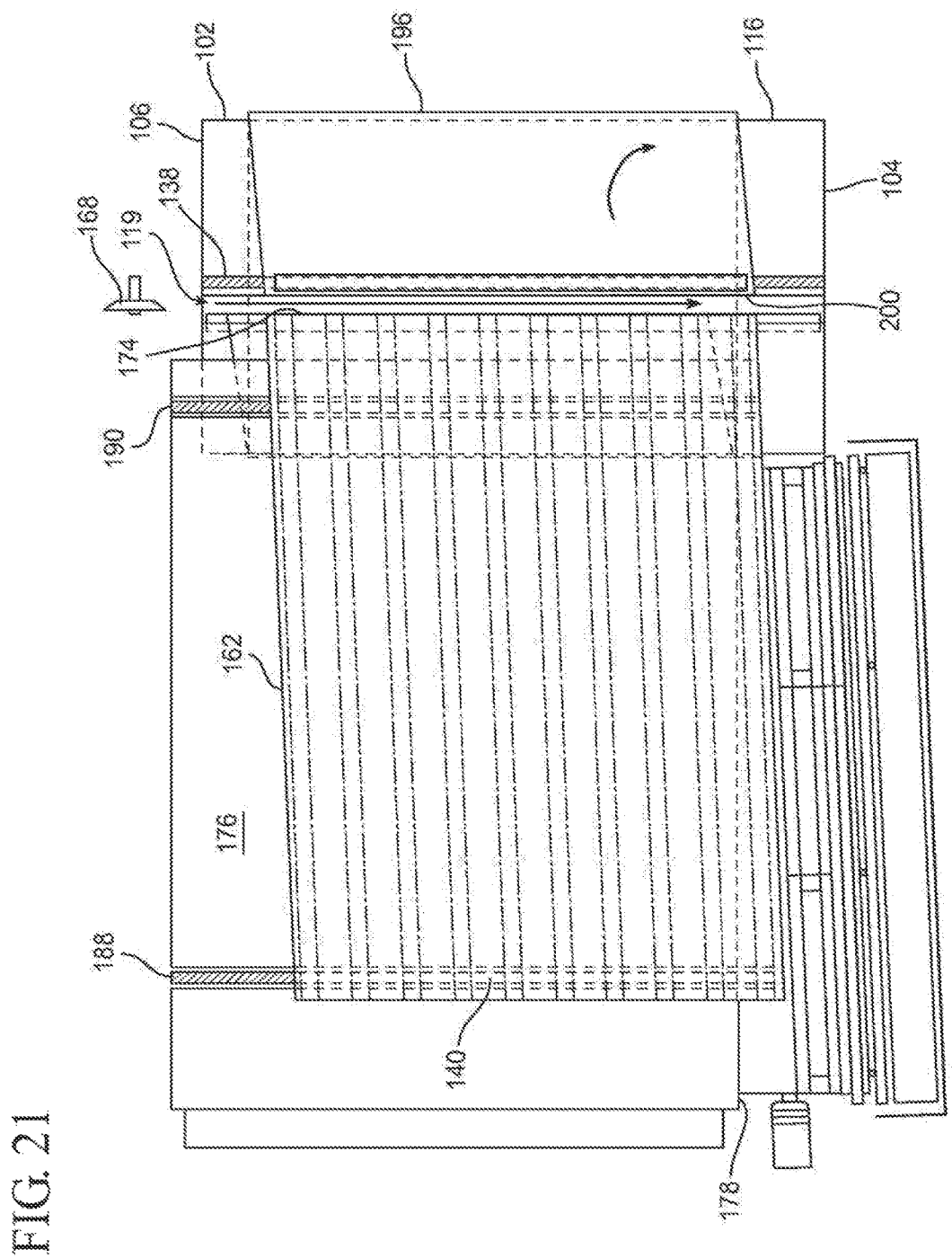
FIG. 21 represents a top elevational view of the disclosed system while performing a second step of the inventive process.

As illustrated in FIGS. 20 and 21, the gantry magnet 186 next moves the second metallic bar 194 to the drum magnet 138. From this action, the additional screen fabric 196 is locked in place at the drum magnet 138.

As an alternative, instead of moving the platform magnets 188, 190, the drum 102 can be axially moved so as to accomplish the same relative displacement between the platform 176 and the drum 102 (not shown). Such movement, while drawing additional fabric 196, would helically wind the fabric 196 about the drum 102. This process would create the same axial displacement 198 as accomplished by moving the platform magnets 188, 190 relative to the axially stationary drum 102. Once the additional fabric 196 is wound about the drum 102 and locked in place, the axially movable drum 102 would move back to its initial location.

The cutter 168 now advances between the axial rear and front ends 106, 104 of the drum 102 in the axial opening 119. This action separates screen/slat product 162 from the additional screen fabric 196, providing the screen/slat product 162 with a right side edge, i.e., a trailing edge 174. The additional screen fabric 196 is now provided with a leading edge 200 over the drum magnet 138, i.e., on the right side 121 of the axial opening 119 of the drum shell 116.

Figure 22:
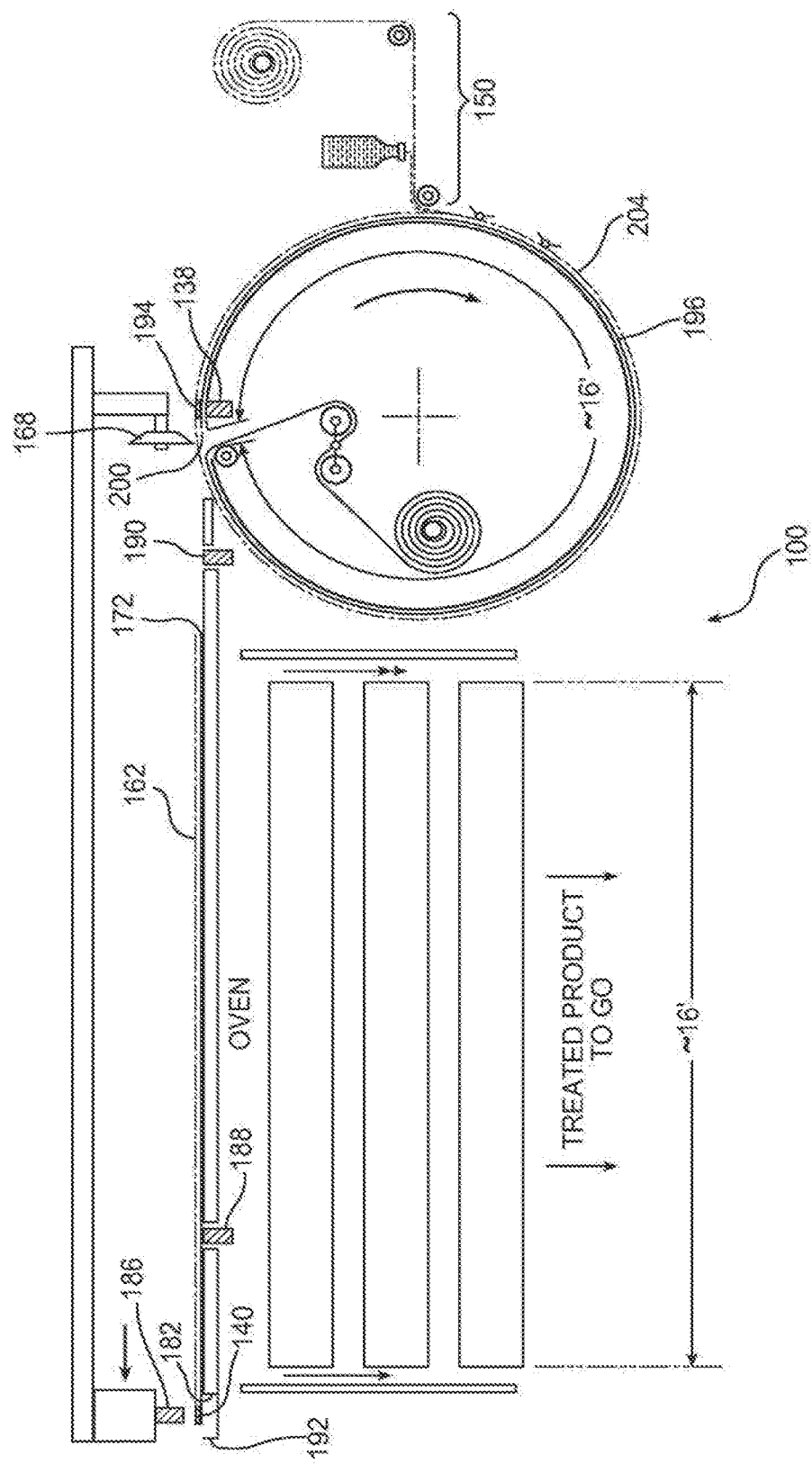
FIG. 22 represents a front elevational view of the disclosed system while performing a second step of the inventive process.
Figure 23:
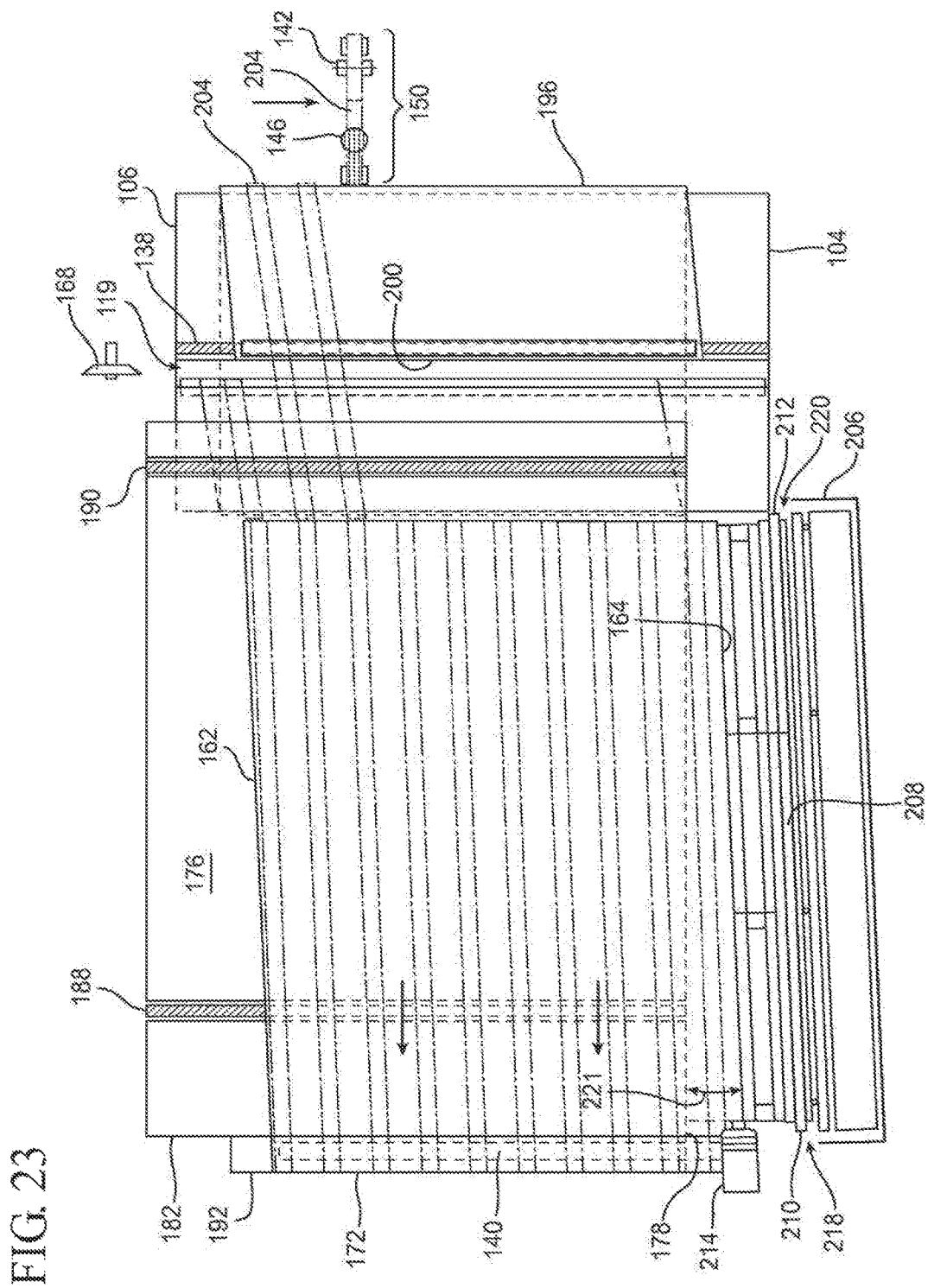
FIG. 23 represents a top elevational view of the disclosed system while performing a second step of the inventive process.

As illustrated in FIGS. 22 and 23, the gantry magnet 186 grabs the leading edge 172 of the screen/slat product 162, via the sandwiched metallic bar 140. The gantry magnet 186 moves the screen/slat product 162 towards the left end 182 of the platform 176, in the area of the bar tray 192.

At the left end 182 of the platform 176, the sandwiched metallic bar 140, as well as the immediately surrounding screen/slat product, are cut away from the remainder of the screen/slat product 162. The cutting action is by a manual or automated cutter (not illustrated) located at the left end 182 of the platform 176. The metallic bar 140, with attached screen/slat product waste, is automatically or manually deposited into the bar tray 192. The waste fabric can now be automatically or manually removed from the bar 140 using, e.g., a rigid blade.

While not discussed in detail, it is to be appreciated that the process for winding the screen fabric 122 about the drum shell 116, e.g., prior to Step S1, is the same as the disclosed process for helically winding additional screen fabric 196 about the drum shell 116, in Step S2.

As further illustrated in FIGS. 6, 22 and 23, when the screen/slat product 162 has cleared the drum shell 116, the system 100 cycles back to Step S1 with respect to the additional screen fabric 196 on the drum shell 116. That is, additional slat fabric 204 is helically deposited on the additional screen fabric 196. Simultaneously, the process continues to Step S3, discussed below.

Figure 24:
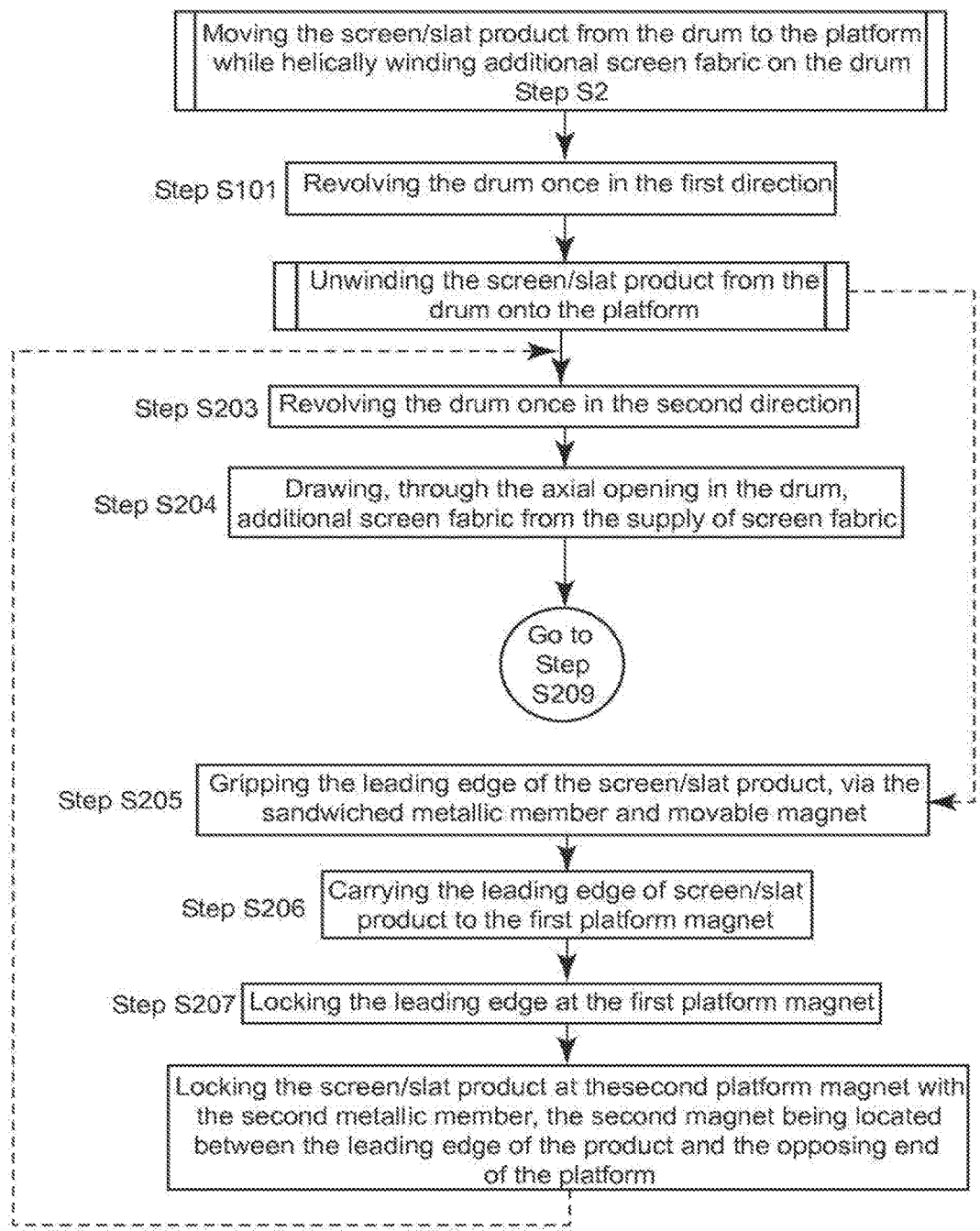
FIG. 24 is a flowchart providing further detail of the flowchart of FIG. 6.
Figure 25:
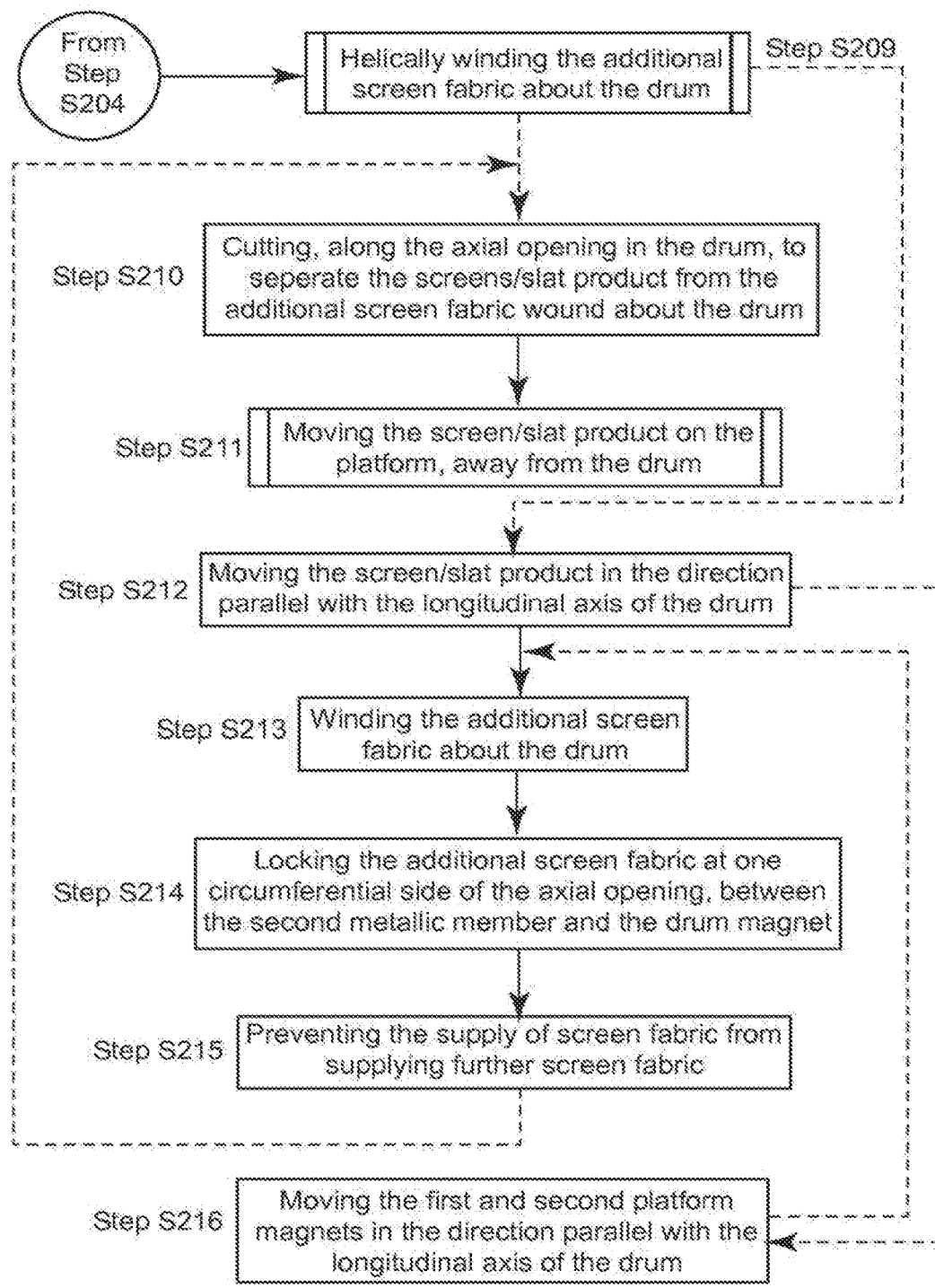
FIG. 25 is a flowchart providing further detail of the flowchart of FIG. 6.

Turning to FIGS. 24 and 25, flowcharts are now provided to further illustrate the process of Step S2, of moving the screen/slat product 162 from the drum 102 to the platform 176 while helically winding additional screen fabric 196 on the drum 102. As illustrated in FIG. 24, Step S2 includes Step S201 of revolving the drum 102 once in the first direction while, simultaneously, performing Step S202 of unwinding the screen/slat product 162 from the drum 102 onto the platform 176.

Once unwound, Step S2 includes Step S203 of revolving the drum 102 once in the second direction. Simultaneously, the process performs Step S204 of drawing, through the axial opening 119 in the drum 102, additional screen fabric 196 from the supply of screen fabric 124. The additional screen fabric 196, while being drawn, is helically wound about the drum 102, as indicated in Step S209.

As illustrated in FIG. 25, following the helical winding Step S209, the process includes Step S210 of cutting, along the axial opening 119 in the drum 102, to separate the screen/slat product 162 from the additional screen fabric 196 wound about the drum 102. Further, the process includes Step S211 of moving the screen/slat product 162 on the platform 176, away from the drum 102.

More specifically, as illustrated in FIG. 24, Step S202 of unwinding the screen/slat product 162 from the drum 102 onto the platform 176 includes plural steps. One step, Step S205, is gripping the leading edge 172 of the screen/slat product 162, via the sandwiched metallic member 140 and the movable magnet 186. A further step, Step S206, is carrying the leading edge 172 of the screen/slat product 162 to the first platform magnet 188.

Step S202 further includes Step S207 of locking the leading edge 172 at the first platform magnet 188. Step S202 also includes Step S208 of locking the screen/slat product 162 at the second platform magnet 190 with the second metallic member 194; the second magnet 190 being located between the leading edge 172 of the product 162 and the opposing end 184 of the platform 176.

Additionally, as illustrated in FIG. 25, Step S209 of helically winding the additional screen fabric 196 about the drum 102 includes plural steps. That is, Step S209 includes Step S212 of moving the screen/slat product 162 in the direction parallel with the longitudinal axis of the drum 102. Simultaneously, Step S209 includes winding the additional screen fabric 196 about the drum 102, as indicated in Step S213.

Once the winding is complete, the process includes Step S214 of locking the additional screen fabric at one circumferential side 121 of the axial opening 119, between the second metallic member 194, which has been moved from the platform magnet 190, and the drum magnet 138. At the same time, the process provides Step S215 of preventing the supply of screen fabric 124 from supplying further screen fabric. As the result of Steps S214 and S215, the additional screen fabric 196 is taut in the helical configuration about the drum 102.

Furthermore, Step S212 of moving the screen/slat product 162 in the direction parallel with the longitudinal axis of the drum 102 is obtained by Step S216. Step S216 is moving the first and second platform magnets 188, 190 in the direction parallel with the longitudinal axis of the drum 102, carrying the screen/slat product therewith.

Turning now to FIGS. 26-31, attention will be given to Step S3, of winding the screen/slat product about a roller tube to form a slatted roller blind, which provides the slats with a spiral curvature profile. As indicated, Step S3 occurs while the system 100 cycles through Step S1 with the additional screen fabric 196 deposited on the drum shell 116. At the start of Step S3, the screen/slat product 162 is positioned at the left end 182 of the platform 176.

Figure 26:
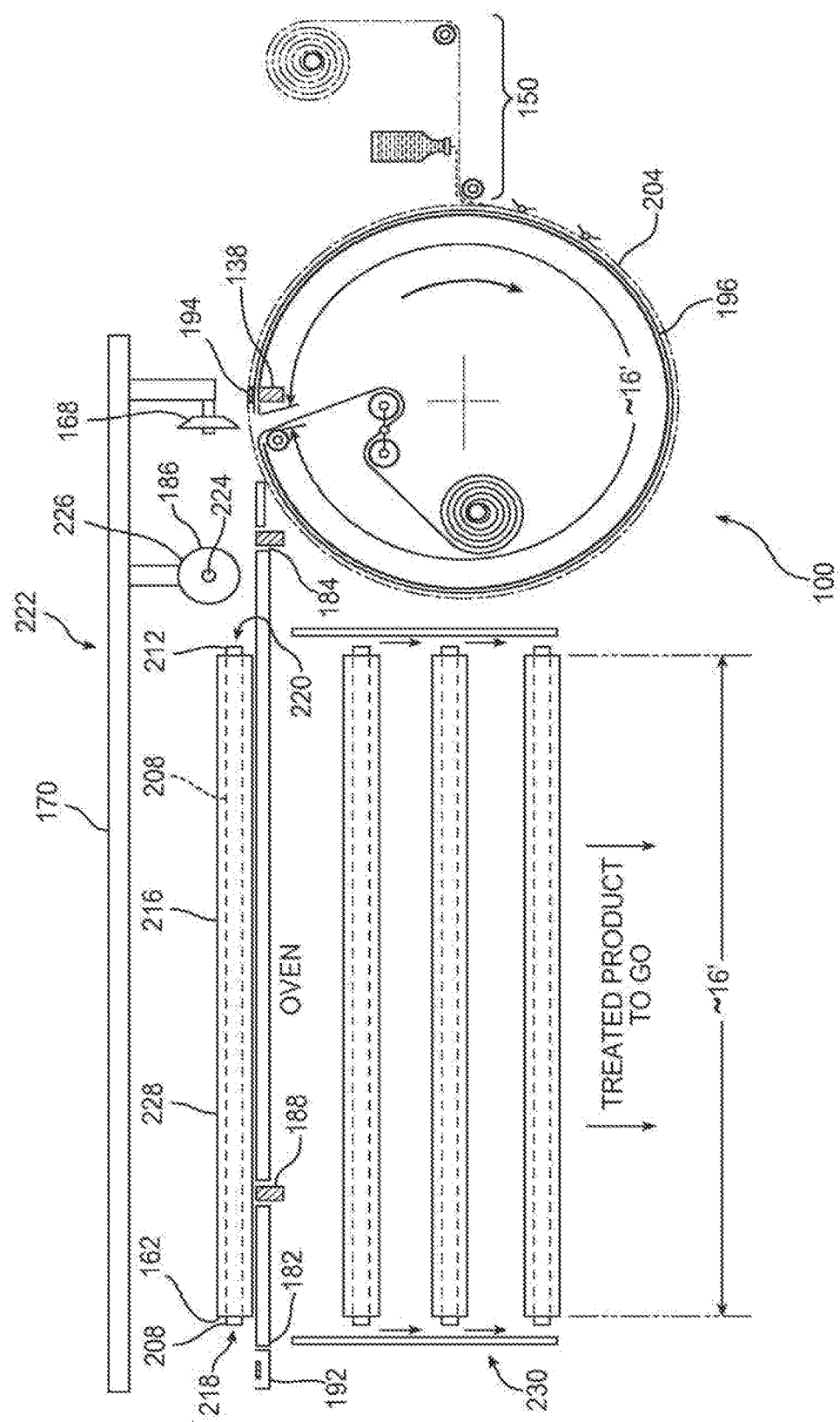
FIG. 26 represents a front elevational view of the disclosed system while performing third and fourth steps of the inventive process.
Figure 27:
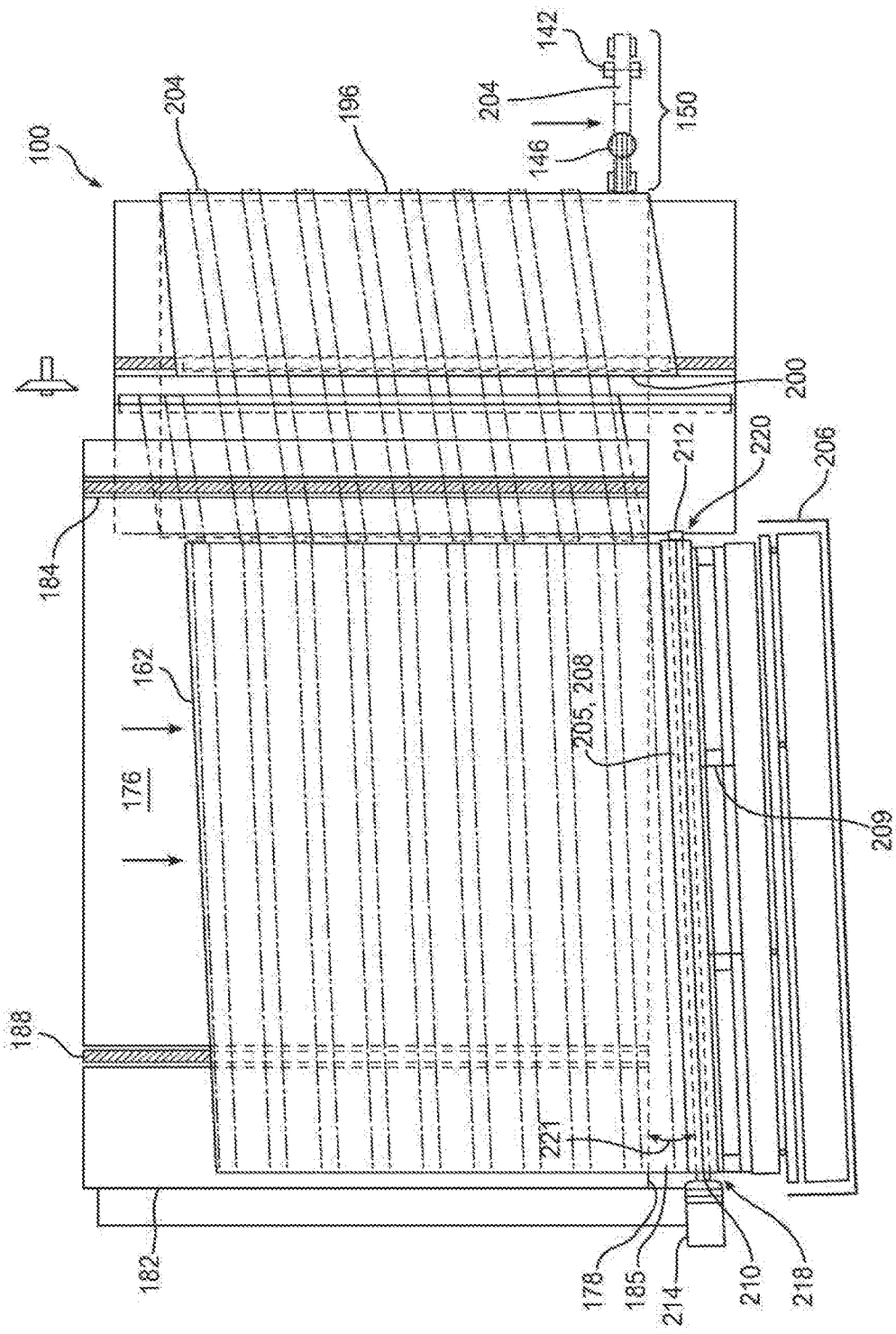
FIG. 27 represents a top elevational view of the disclosed system while performing third and fourth steps of the inventive process.

Turning to FIGS. 26 and 27, components of the disclosed embodiment for performing Step S3 include a supply of roller tubes, such as a magazine of roller tubes 206, from which a roller tube 208 will be obtained. The magazine 206 is provided along the front of the platform extension 185, where the top edge 164 of the screen/slat product 162 is located.

The roller tubes in the magazine 206 each have an axial length, which, consistent with the noted orientation, is defined between left and right opposing axial ends 210, 212 of the roller tubes. The axial length of the roller tubes is slightly larger than the widthwise span of the screen/slat product 162, i.e., the span of the top edge 164 of the screen/slat product 162, for reasons discussed below. As indicated, the widthwise span of the product 162 is substantially sixteen feet.

Figure 28:
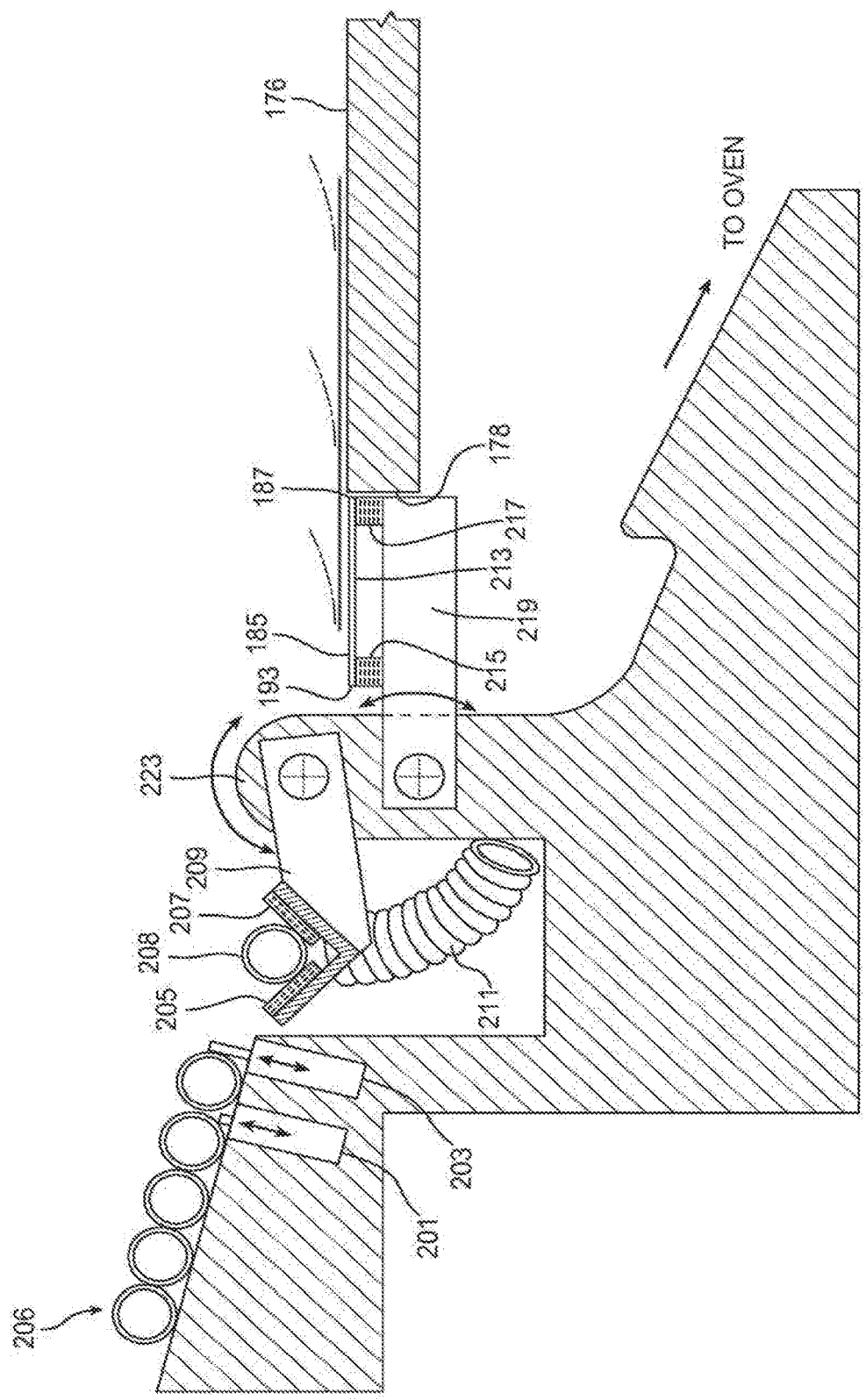
FIG. 28 is a side view of a portion of the disclosed system.

As illustrated in FIG. 28, the roller tube 208 is automatically obtained from the magazine 206 of roller tubes. This is achieved by positioning the magazine of roller tubes 206 at an angle so as to gravity feed the individual tubes against upstream and downstream automated pin cylinders 201, 203. One roller tube fits between pins 201, 203, and the pins are timed to allow one roller tube at a time into the mouth of a fixed "Y" shaped jaw 205 while thereafter advancing a next roller tube between pin cylinders 201, 203.

The angle for the "Y" shaped jaw 205 is approximately ninety degrees. The length of the jaw 205 is at least as long as the width of the screen/slat product 162, and slightly shorter than the roller tube 208. This configuration leaves a small length of roller tube 208 exposed at, e.g., the right end 184 of the platform 176, for reasons discussed below. The surface of the jaw 205 which faces the tube 208, is coated with a cushioning material 207, e.g., foam, and UHMWPE tape to minimize pressure points and friction during the below discussed rolling operation.

Figure 29:
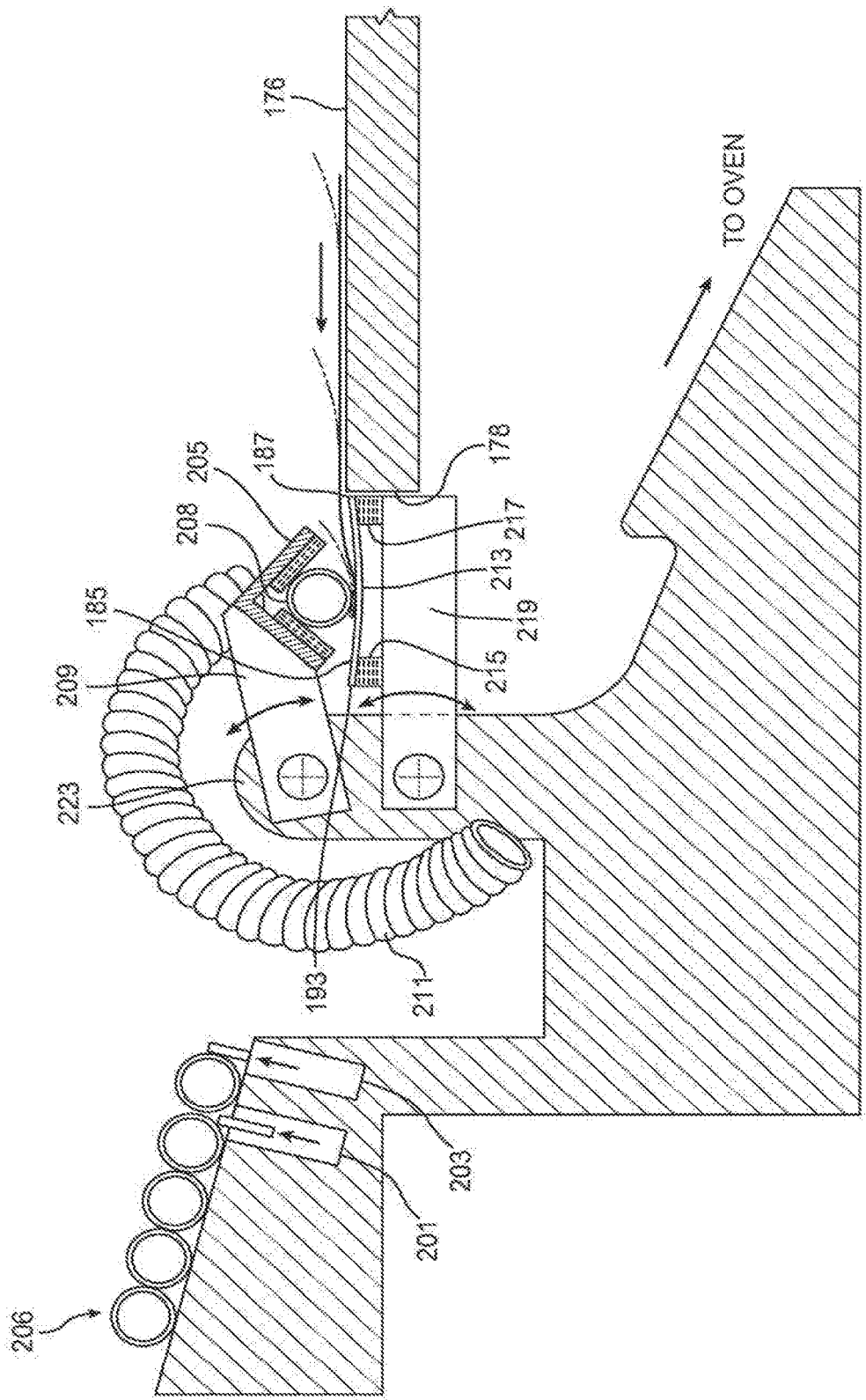
FIG. 29 is an additional side view of the portion of the disclosed system illustrated in FIG. 28.
Figure 30:
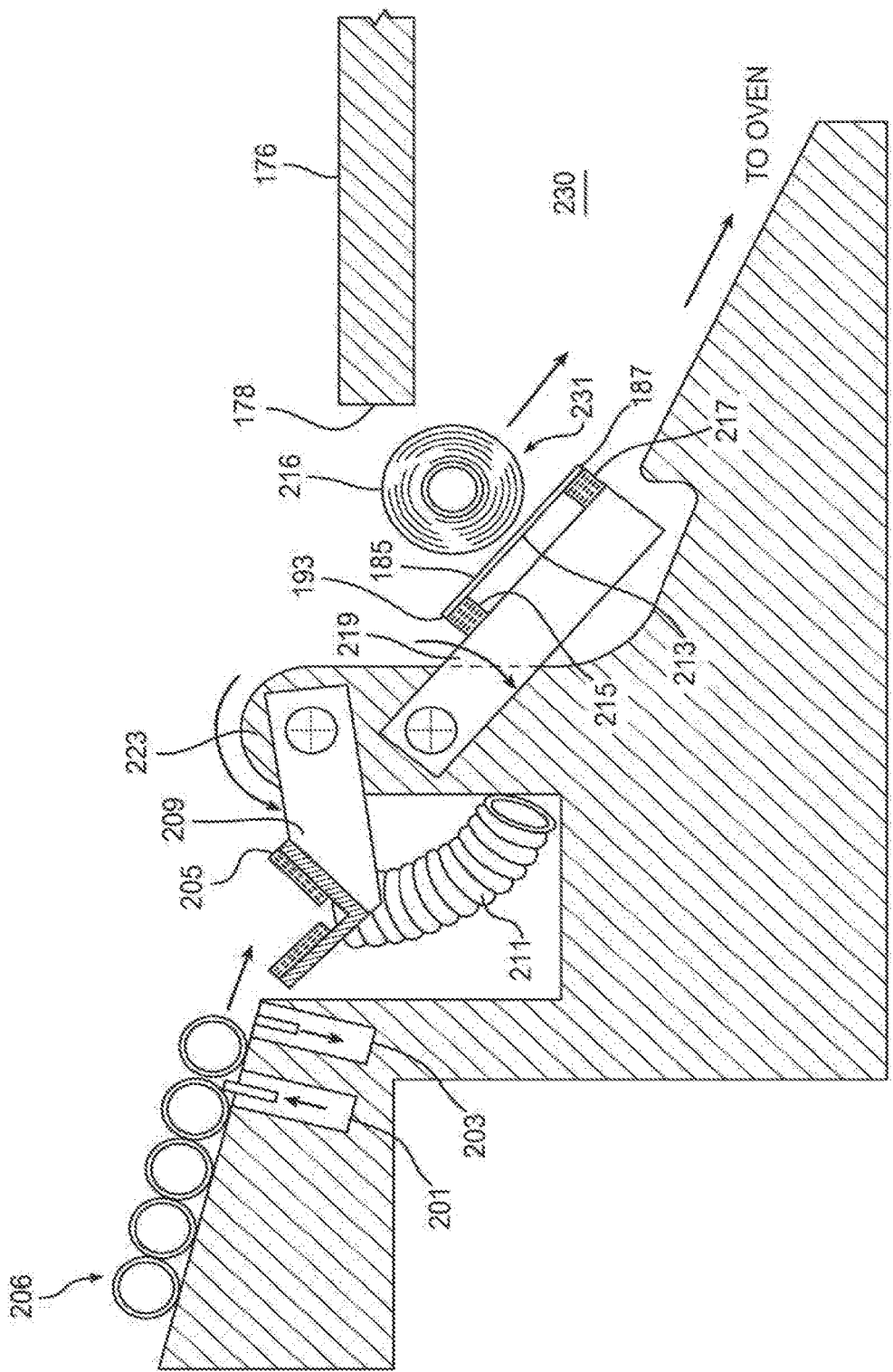
FIG. 30 is an additional side view of the portion of the disclosed system illustrated in FIG. 28.

As illustrated in FIG. 29, once the roller tube 208 obtained, it is loaded onto the platform extension 185, located at the front 178 of the platform 176. In this location, it is positioned against the top edge 164 of the front surface of the screen/slat product 162. To accomplish this, the fixed jaw 205 is connected to a pivot arm 209. The swing of the arm 209 is sized to properly position the roller tube 208 against the screen/slat product 162, so that the entire roller tube length 208 is on the platform extension 185. The fixed jaw 205 remains in this location until the screen/slat product 162 is dropped into the oven 230, as illustrated in FIG. 30 and discussed below.

To assist in gripping the roller tube 208, the fixed jaw 205 is perforated along its length, and a vacuum hose 211 is positioned under the perforations. Vacuum pressure enables positioning the roller tube without additional mechanical connections between the fixed jaw 205 and the roller tube 208.

The roller tube 208 is positioned on the screen/slat product 162 so that the two are squarely aligned. To create the proper alignment between the roller tube 208 and the screen/slat product 162, the roller tube 208 is positioned at an angle, reference number 221. Angle 221 is equivalent to the angular offset 158 at which the slats are deposited on the drum shell 116.

To further limit pressure points and friction during the below discussed rolling operation, the platform extension 185 comprises a flexible seat 213, supported at opposing ends by support members 215, 217. The configuration is such that the top of the seat 213 is flush with the top of the remainder of the platform 176.

A suitable material for the seat 213 is (0.010) thick spring stainless steel plate coated with UHMWPE tape of the same thickness, which is slick and more resistant to wear than Teflon. The seat 213 is positioned on a further pivot arm 219, discussed below. The support members 215, 217 space the seat 213 from the pivot arm 219 by a distance which allows for deflection of the seat 213.

The proper grip is created between the roller tube 208 and the screen/slat product 162 by pre-coating the roller tube 208 with double sided tape (not illustrated). Release paper on the tape is automatically or manually removed during this portion of the manufacturing process.

Alternatively, a layer of double sided tape can be automatically applied to the top edge 164 of the screen/slat product 164. This can be done by, for example, positioning a roll of tape (not illustrated) within the cavity 118 of the drum 102 and applying the tape during the process of winding the screen fabric 122 (or additional screen fabric 196) about the drum shell 116.

Yet alternatively, a layer of adhesive can be automatically applied to the front surface (facing away from the screen fabric 122) of the topmost slat fabric 144 during Step S1. This would be accomplished using the slat distributing structure 150. Release paper would not be applied to this topmost layer of slat fabric 122.

A roller motor with a chuck 214 is located at the left end 182 of the platform 176, over the platform extension 185, that is aligned with and engages the left end 210 of the roller tube 208. The roller motor 214 turns the roller tube 208, drawing in the screen/slat product 162. During this process, the fixed jaw 205 guides the screen/slat product 162 about the roller tube 208. The result is a slatted roller blind 216 that is substantially sixteen feet wide between opposing left 218 and right 220 axial ends of the blind 216.

The wound blind 216 has the configuration of the retracted blind 216 during actual use. This configuration provides a curvature on each slat, which as illustrated in FIGS. 2 and 3, is defined by the segment of the spiral curve on which the slat is positioned when the blind is retracted.

Figure 31:
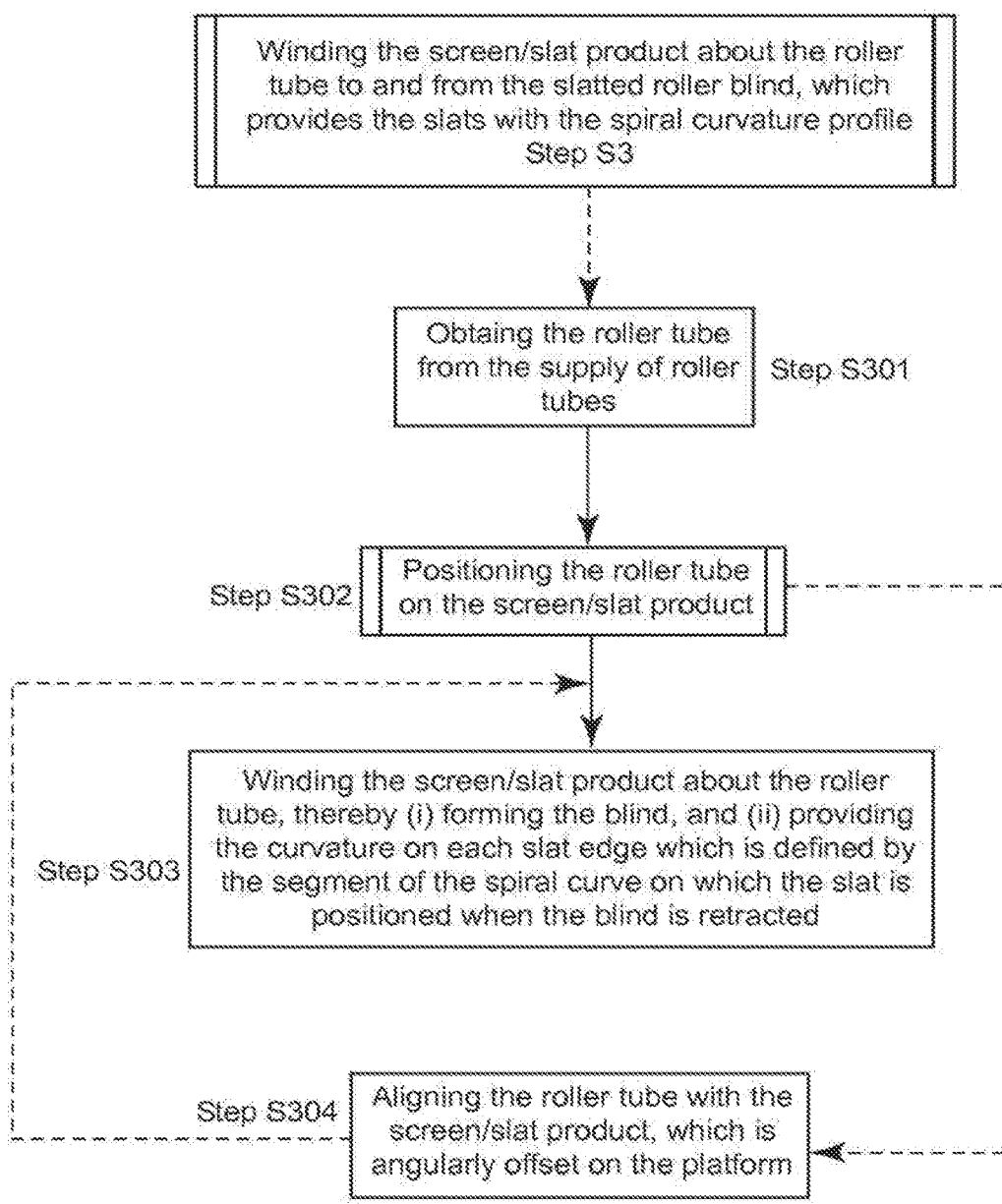
FIG. 31 is a flowchart providing further detail of the flowchart of FIG. 6.

Turning to FIG. 31, a flowchart is now provided to further illustrate the process of Step S3, of winding the screen/slat product about a roller tube to form a slatted roller blind, which provides the slats with a spiral curvature profile. Step S3 includes Step S301 of obtaining the roller tube 208 from the supply of roller tubes 206 and Step S302 of positioning the roller tube 208 on the screen/slat product 162.

Step S3 also includes Step S303 of winding the screen/slat product 162 about the roller tube 208. This forms the blind 216, and provides the curvature on each slat side edge which is defined by the segment of the spiral curve on which the slat is positioned when the blind 216 is retracted. In addition, Step S302 of positioning the roller tube 208 on the screen/slat product 162 includes aligning the roller tube 208 with the screen/slat product 162, which is angularly offset on the platform 176.

Remaining with FIGS. 26, 27, 30 and 32, a further discussion will now be provided of Step S4 of heat treating the blind to set the spiral curvature profile into the slat fabric.

The gantry structure 170 includes structure 222 (not previously illustrated for clarity purposes) for encapsulating the roller blind 216. The encapsulation ensures keeps the blind 216 tightly wound during subsequent processing.

The structure 222 for encapsulating the blind 216 includes a tape support 224 for supporting a supply roll of clear-packing tape 226. The tape support 224, in its initial location, is positioned at the front-right end 178, 184 of the platform 176, in the area of the platform extension 185, adjacent to the right end 220 of the blind 216.

The structure 222 is capable of moving, e.g., with structure supporting the gantry magnet 186, over the platform extension 185, between the right and left 218, 220 ends of the blind 216. Throughout this range of motion, the tape support 224, and the supply roll of tape 226, remain in the area of the front end 178 of the platform 176, adjacent to the blind 216.

Tape 228 from the supply of tape 226 is automatically or manually connected to the right end 212 of the roller tube, which extends past the right end 220 of the blind 216, and the right end of the jaw 205. The roller motor 214 is again actuated while the roll of tape 226 is moved on the gantry 170 towards the left end 218 of the blind 216. During this process, the blind 216 is encapsulated with a layer of tape 228. Once the blind 216 is taped, the chuck from the roller motor 214 releases the roller tube 208 within the blind 216.

A heat treating device, which is an oven 230, is positioned under the platform 176 so that an inlet (not illustrated) to the oven 230 is at the front end 178 of the platform 176, in the area of the taped roller blind 216. The taped roller blind 216 is automatically dropped into the inlet of the oven 230. To achieve this, the second pivot arm 219, illustrated in FIG. 30, pivots the platform extension 185 in a downward direction, as illustrated in FIG. 30, and gravity drops the blind 216 into a mouth 231 of the oven 230.

As illustrated in FIG. 30, once the blind 216 is dropped into the oven 230, the fixed jaw 205 is pivoted back to its initial position, where the pins 201, 203 are actuated in a synchronized fashion to receive another roller tube from the magazine 206.

As further illustrated in this figure, the pivot arms 209, 219 for the fixed jaw and the platform extension 185 can be connected to the same fulcrum member 223 and have a common pivot centerline. In the illustration, the pivot centers are height-wise spaced, with pivot arm 209 above pivot arm 219. This enables the jaw 205 to pivot upwardly, over the fulcrum 223, to meet the platform extension 185, while enabling the platform extension 185 to pivot downwardly, in the direction of the oven 230.

In the oven 230, the blind 216 is heat treated, as disclosed above, so that the spiral curvature in each slat side edge is permanently set. For example, as indicated, an example of suitable slat fabric is seven to fifteen mils thick PVC, PET, or PC film. This material is thermo-formable at between (170) and (250) degrees F. Accordingly, the oven 230 bakes the blind 216 between (170) and (250) degrees F. to set the spiral curvature profile into the slats. It is to be noted that the oven may be a standard convective type, an RF (radio frequency) type, or a different type of oven which is capable of activating the thermo formable properties within the thermo formable slat material.

As the heat treatment process is substantially longer than the time to obtain the encapsulated blind 216, the oven 230 is large enough to hold a stack of blinds so that the system need not stop during the cyclical process of manufacturing the blinds.

Figure 32:
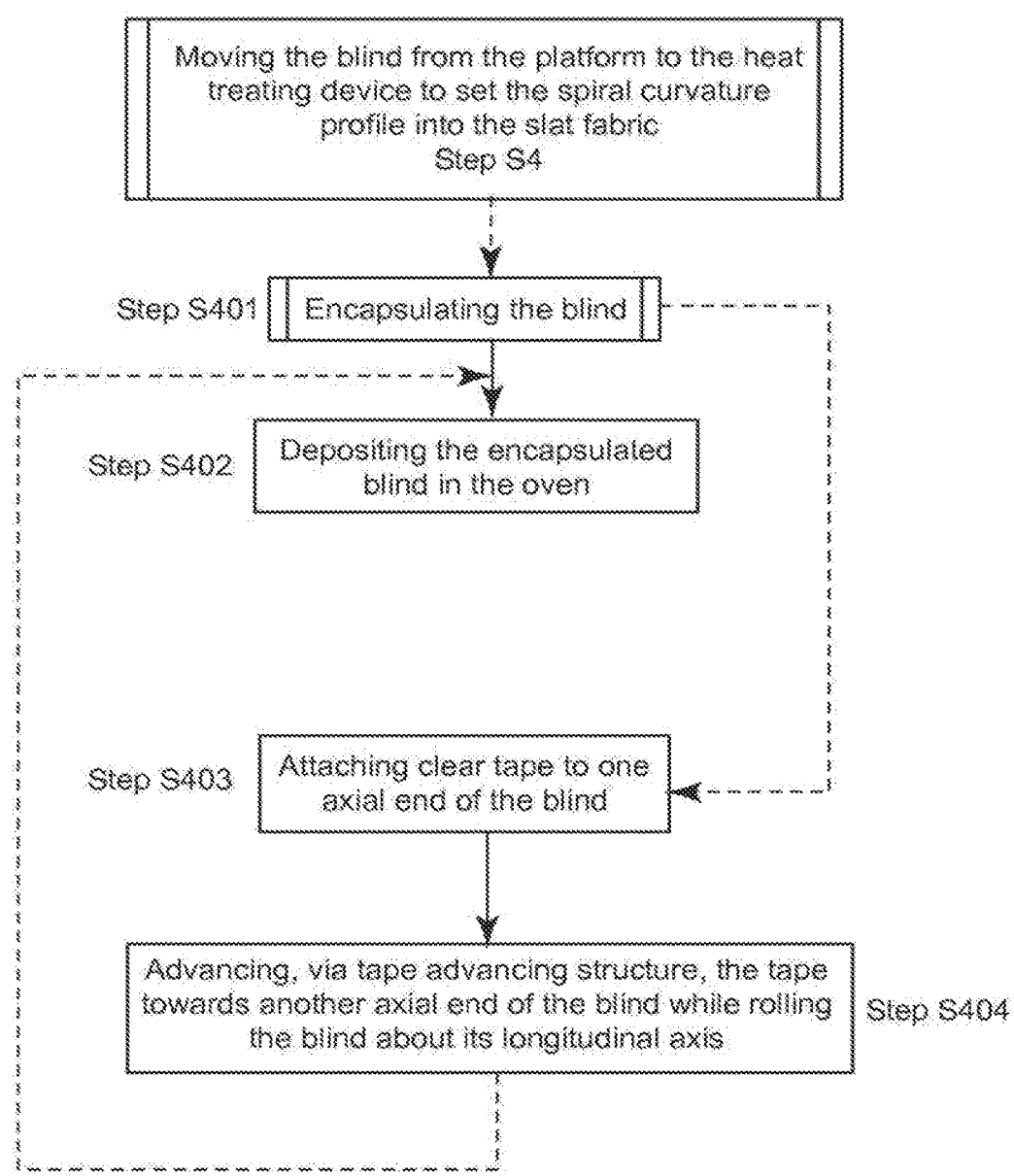
FIG. 32 is a flowchart providing further detail of the flowchart of FIG. 6.

Turning to FIG. 32, a flowchart is now provided to further illustrate the process of Step S4, of moving the blind from the platform to a heat treating device to set the spiral curvature profile into the slat fabric. Step S4 includes Step S401 of encapsulating the blind 216. Step S4 also includes Step S402 of depositing the encapsulated blind 216 in the oven 230, to heat treat the blind 216 and set the spiral curvature profile shape into the slats.

More specifically, Step S401 of encapsulating the blind includes Step S403 of attaching clear tape 228 to one axial end 220 of the blind 216. Step S401 also includes Step S404 of advancing, via the tape advancing structure 220, the tape 228 towards another axial end 218 of the blind 216, while rolling the blind 216 about its longitudinal axis.

As indicated, Steps S1 through S4 are synchronized such that rolling the screen/slat product 162 about the roller 208, taping the roller blind 216, and dropping the blind 216 into the oven 230, occurs while the system 100 winds additional slat fabric 204 about the additional screen fabric 196. The combined product of the additional screen fabric 196 and additional slat fabric 204 can now be unwound onto the platform 176 as the system cycles to Steps S2 through S4 for this additional fabric product. It is to be noted that the implementation of the metallic bars 140, 194 reverses with each consecutive cycle through Steps S1 through S4.

Due to the synchronization of Steps S1 through S4, blinds can be rapidly manufactured. If winding the slats about the screen fabric takes only minutes, it can be appreciated that many blinds can be manufactured each hour, for each system 100 in operation.

Once the baking is complete, the blind 216, with the slats now conforming to the spiral curve pattern, is removed from an oven outlet (not illustrated). The blind 216 can be divided with, e.g., an electronically actuated miter saw, so as to provide at least one blind 10, illustrated in FIG. 1.

Once divided, the roller may be equipped with a headrail, bottom rail, frame, and/or controls. Regarding a headrail, the size of the headrail would be large enough to house the roller and retracted blind.

Regarding a bottom rail, the blind can be fitted with a weighted bottom rail for maintaining the screen in a taut condition. The weight of the bottom rail would be particularly useful for the blind disposed in an exterior side of the architectural opening. In this configuration, the weight of the bottom rail would maintain stability of the blind despite, e.g., the presence of wind in an exterior configuration. Typically, tracks or tension cables, which engage the bottom rail, provide additional resistance to wind.

The headrail and bottom rail may take on any of a number of shapes. Considerations for selecting a shape would be anticipated durability, cost, or aesthetic requirements of the overall blind assembly.

As indicated, the blind assembly may be provided within a frame. Such a configuration is available whether in an interior or exterior installation. When disposed in a frame, the bottom rail, for example, might be unnecessary.

Regarding controls, a direct control mechanism or an indirect control mechanism can be implemented to extend or retract the blind. An example of a direct control mechanism is a lift cord with associated gears. An example of an indirect control mechanism is an electric motor operated by a wall switch or a wireless remote. The wireless remote could communicate with the electric motor using electronics typically adapted for radio frequency communications.

The use of a direct control mechanism will typically be in an indoor installation. The use of an indirect control mechanism will typically be in an exterior installation. However, neither configuration of the control mechanisms is limited to the exterior or interior installation. Various known options for direct or indirect operation of the roller are available. Accordingly, further discussion of these components is omitted.

The next series of figures illustrate various alternative blinds which are capable of being manufactured using the above disclosed system. These blinds can be manufactured with minimal modifications to the disclosed materials and process, as will be appreciated by one of ordinary skill, after reading the present disclosure.

Figure 33A:
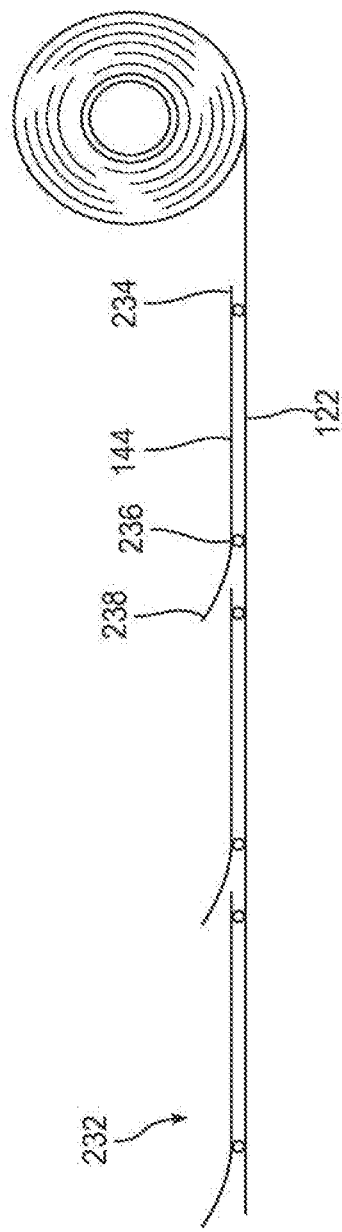
FIG. 33A is an alternative blind which can be manufactured by the disclosed process, shown before heat treating.
Figure 33B:
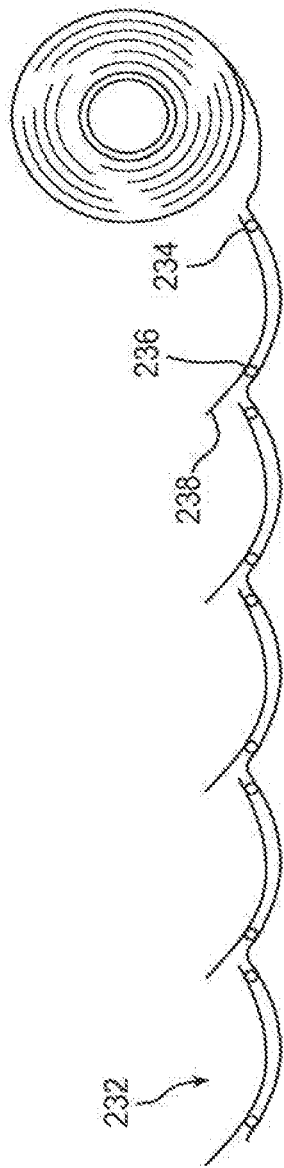
FIG. 33B is an additional view of the blind in 33A, shown after heat treating.

FIGS. 33A and 33B illustrate a roller blind 232 according to a first alternative design. The roller blind 232 is similar to that of FIG. 1, with differences which will now be discussed. In the roller blind 10 of FIG. 1, there is one line of adhesive 234, near the top edge on the rear surface of the slat fabric 144. In the alternative roller blind 232, there is, in addition to the first line of adhesive 234, a second line of adhesive 236.

As with the first line of adhesive 232, the second line of adhesive 236 is on the rear surface of the slat fabric 144. The second line of adhesive 236 is offset from the bottom edge of the slat fabric 144 by about ten to fifteen percent of the circumferential width of the slat. This action creates a bottom slat tail section 238, below the second adhesive line 236. The size of the tail section 238, based on the adhesive offset spacing, may be varied for aesthetic preferences, and can be brought to zero, especially when more opaque sheer (screen) fabrics are used.

The second line of adhesive 234 is applied at the same time of applying the first line of adhesive, with minimal modifications to the slat distributing structure 150 (not shown). That is, a second adhesive dispenser, spaced from the first dispenser, would provide the second line of adhesive.

Each slat is positioned such that the slat tail section 238 is disposed over the top edge of the front face of the previously wound slat and such that the second line of adhesive 236 lands a distance away from the top edge of the previously wound slat, bonding to the sheer (screen) fabric 122 beneath it. To accomplish this positional shape relationship, a constant spacing is used between adjacent slats.

The slat fabric 144 in the resulting blind covers the entire surface of the blind, from the top edge to the bottom edge of the blind. Accordingly, the screen fabric 122 need not be transparent and instead could be opaque or translucent. Upon winding and heat treating the blind, the resulting blind would appear as illustrated in FIG. 33B.

A second alternative is illustrated in FIGS. 34A and 34B, which is similar to FIG. 26 in co-pending U.S. patent application Ser. No. 10/581,872, filed Jun. 5, 2006, titled "Retractable Shade For Coverings For Architectural Openings," which claimed priority to PCT/US04/43043, filed Dec. 21, 2004, both of which are incorporated herein by reference in their entirety. The spacing of the slats in this blind embodiment is the same as that in FIGS. 33A and 33B. Accordingly, the screen fabric 122 may again be opaque. This embodiment, includes only the top edge glue line 232. Furthermore, the roller tube 208 in this embodiment is positioned below the screen/slat product 162.

The configuration of this embodiment could be accomplished by positioning the roller tube 208 flush with the top of the platform 176, at the front 193 of the platform extension 185. When the platform magnets 188, 190 carry the screen/slat product 162 towards the platform extension 185, the top 164 of the rear surface of the screen/slat product 162 would come to rest over the roller tube 208. Winding would happen in a counterclockwise roller tube motion, as opposed to previous examples, where winding happens in a clockwise motion. Upon winding and heat treating the blind, the resulting blind would appear as illustrated in FIG. 34B.

Figure 35A:
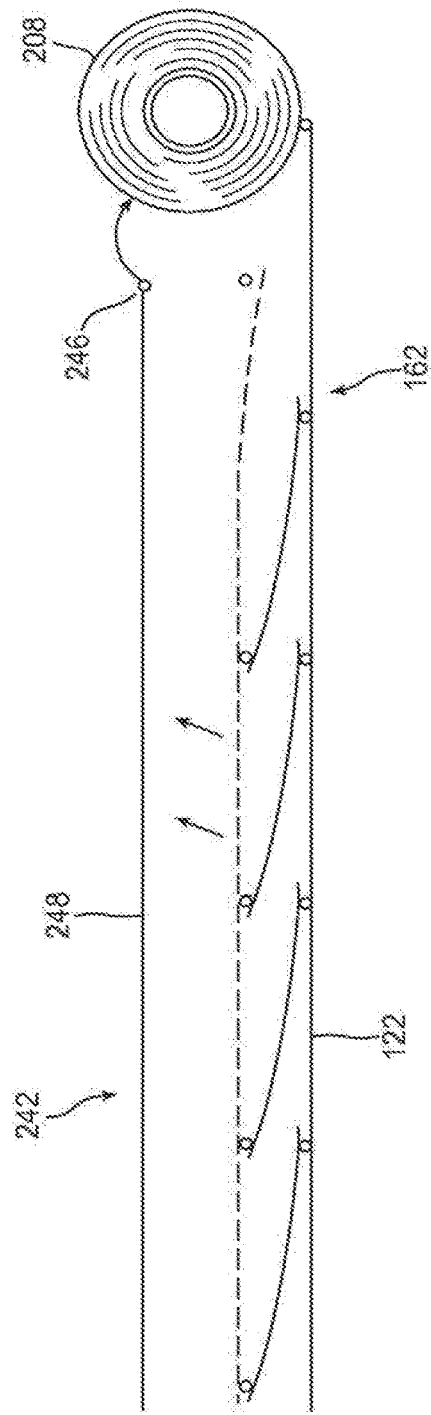
FIG. 35A is an alternative blind which can be manufactured by the disclosed process, shown before heat treating, where some bonds will be created during heat treating.
Figure 35B:
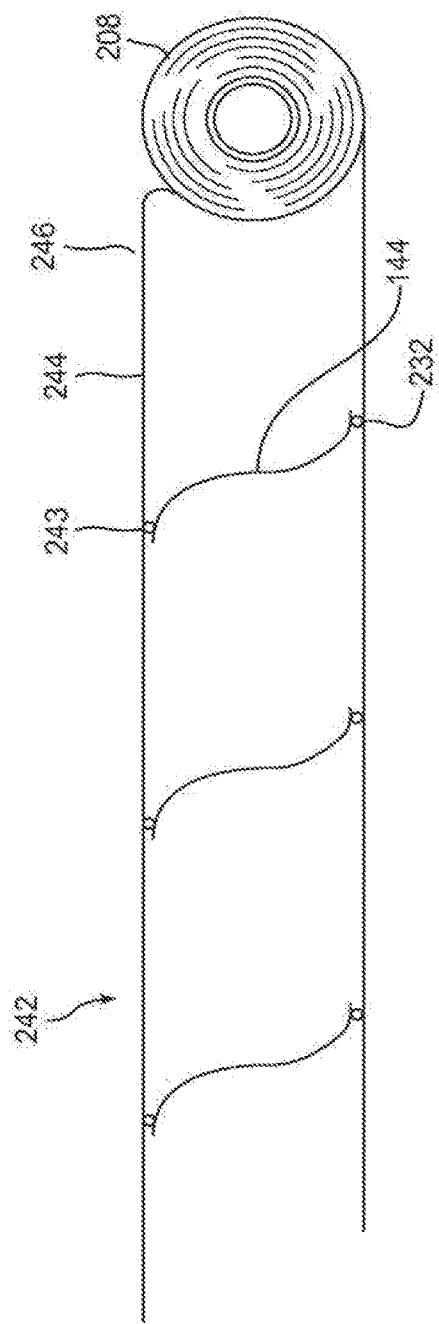
FIG. 35B is an additional view of the blind in 35A, shown after heat treating, with bonds created by heat treating, and opened at full roller extension.

FIGS. 35A and 35B illustrate a third alternative blind 242. Each slat has a line of adhesive on both the front and rear surfaces. The line of adhesive 232 on the rear surface is again at the top edge of the slat fabric 144. The line of adhesive 243 on the front surface is at the bottom edge of the slat fabric 144. This line of adhesive is also applied when applying the first line of adhesive 232 by the slat distributing structure 150.

A second layer of screen fabric 244 is positioned on top of the screen/slat product 162 of this embodiment. The second layer of screen fabric 244 is connected to the roller tube 208, at a top edge 246 of the front surface 248 of the second layer of screen fabric 244. This connection is either via another layer of glue or another layer of double-sided tape on the roller tube 208. As compared with the connection to the roller tube, the second layer of screen fabric 244 will be connected to the slat fabric 144 on its rear surface once heat treating creates that bond.

Once heat treated, the blind looks like that illustrated in FIG. 35B. The slats, which are substantially more flexible than in previous examples and which, in this embodiment, are not heat formable at the applied oven temperatures, assume an "S" profile when the blind is extended. Similarly, the top of the second layer of screen fabric 244 also assumes a curved shape, due to being connected at its front surface to the roller tube.

In order to properly position the second layer of screen fabric 244, the second line of adhesive is allowed to cool on the slats before positioning the second layer of screen fabric 244. This cooling process occurs rather quickly while winding the slats 144 on the first layer of screen fabric. Accordingly, the second line of adhesive does not adhere to the second layer of screen fabric 244 until its temperature is raised during the heat treatment process. At that time, the second layer of screen fabric 244 is properly oriented against the slat fabric 244.

The product described above is similar to a commonly manufactured product, known as Silhouette™, manufactured by Hunter Douglas Inc., located at 2 Park Way, Upper Saddle River, N.J. In Silhouette, bonds on the top-rear and bottom-front of the slats are created in the flat fabric position. When the fabric is rolled onto the roller tube, the coaxial winding of the face and rear sheer (screen) fabric and the subsequent different circumferences about which they are wound, create stresses and puckers in the wound state.

In contrast to Silhouette, the second bond 243 to the bottom-front of the slat 144 is created after the wind up onto the roller tube 208. Thus, none of the above stresses are created in the rolled up state, resulting in a tighter and smoother rollup. However, also in contrast to Silhouette, and for the same reasons as described above, the slat angle in the deployed position will vary more between the top and the bottom of the blind, being more open at the bottom due to the same coaxially induced circumference distance. This may or may not be advantageous depending on the application.

A release paper may need to be rolled up together with the above described construction to prevent the glue line from soaking through the sheer (screen) fabric and bonding to the adjacent layers below. This can be accommodated as described with the first disclosed embodiment.

Figure 36:
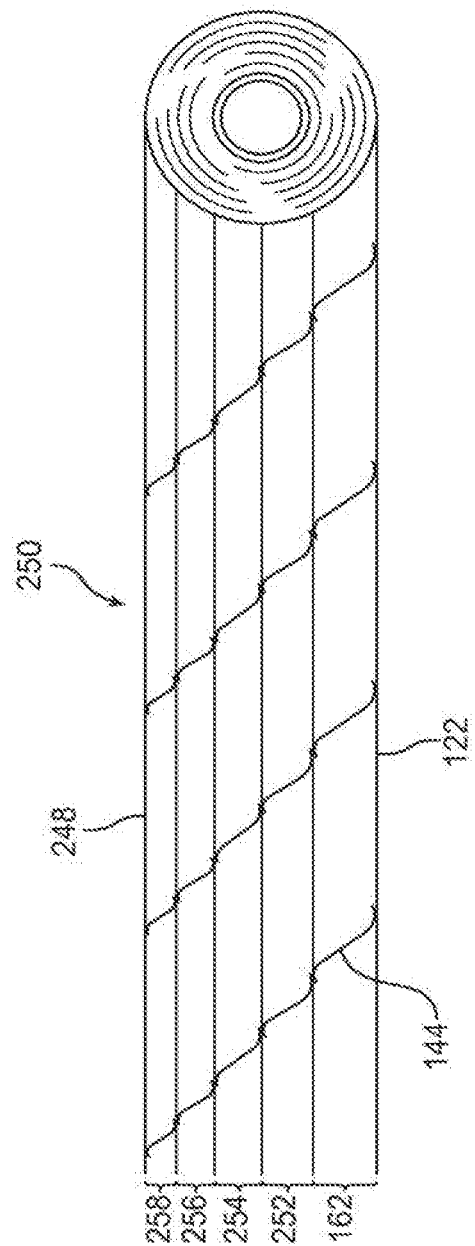
FIG. 36 is an alternative blind which can be manufactured by the disclosed process.

A further alternative blind 250 is illustrated in FIG. 36. This blind 250 is similar to that illustrated in FIGS. 35A and 35B, and the slats are again not heat formable and are substantially more flexible than in the originally disclosed embodiment. In this figure, plural additional layers of screen/slat product 252, 254, 256, 258 are positioned between the lower layer of screen/slat product 162 and the top screen layer 248.

In this embodiment, the slat fabric 144 is offset in each successive layer of screen/Slat product so that the slats in the final blind appear to have a continuous "S" curvature between opposing screen layers 122, 248. The offset is based on successively increasing multiples of the width of the slat fabric. That is, layer 252 is offset by one multiple of the width of the slat fabric, layer 254 is offset by two multiples of the width of the slat fabric, etc.

Figure 37A:
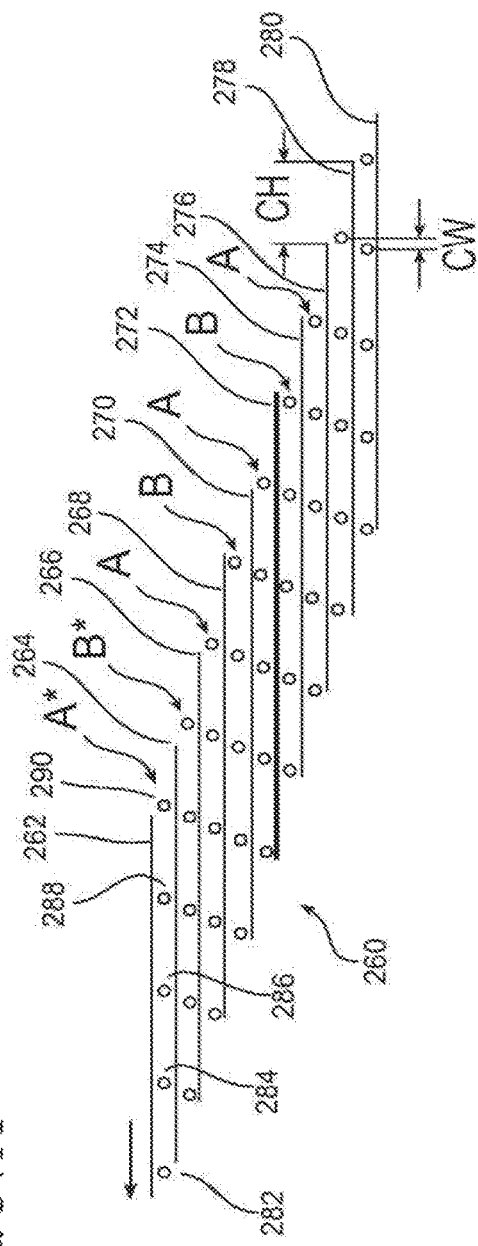
FIG. 37A is an alternative blind which can be manufactured by the disclosed process, shown before heat treating, where some bonds will be created during heat treating.
Figure 37B:
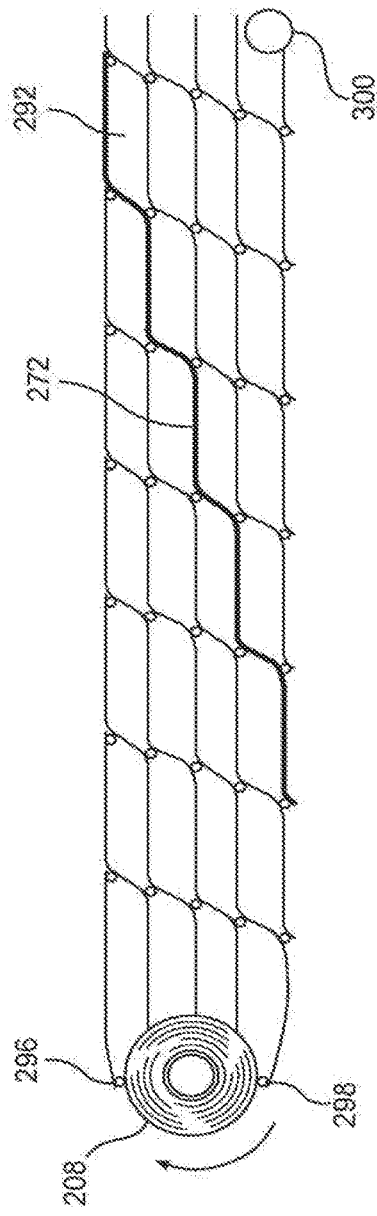
FIG. 37B is an additional view of the blind in 37A, shown after heat treating, with bonds created by heat treating, and opened at full roller extension.

FIGS. 37A and 37B disclose a further alternative blind 260. This blind is obtained by helically winding only elongated layers of slat fabric 144 about the drum 102. In the illustration, there are ten such slat layers 262-280. Each layer is connected to each other layer via plural lines of adhesive, which are applied simultaneously with the slat distributing structure 150. In the illustration, there are five such lines of adhesive 282-290 connecting adjacent layers of slat fabric. The spacing between adjacent lines of adhesive 282-290 is substantially the same on each slat.

FIG. 37B illustrates the blind 260 manufactured according to the layout of FIG. 37A. The progression of slat layer 272 through the extended blind is highlighted for illustrative purposes. The adjacent slat layers form a plurality of cells 292. The height CH of each cell 292 is based on the rate of axial advancement of the slat distributing structure 150, which is a constant rate for this embodiment.

The width of each cell, which defines an "S" shape of the slats, is determined by the spacing, along the axis of the drum 102, between the nth adhesive line in any one slat and the (n+1)th adhesive line in the next-applied slat. This spacing is also typically constant for this embodiment. For example, the width of each cell can be determined by measuring the spacing CW between the fourth adhesive line in slat 280 and the fifth adhesive line in slat 278, which is wound about the drum immediately after slat 280.

Slats at the axial top and bottom of the drum 102 would need to be trimmed to as to properly terminate at respective top and bottom ends of the blind. Furthermore, the slat fabric connects with the roller tube 208 at two points 296, 298. These connection points 296, 298 are illustrated as being above the centerline of the roller tube, in the height-wise direction, in FIG. 37B. Furthermore, a weight 300 is provided in the bottom of the blind to help the blind hold its shape while extended.

Accordingly, what has been disclosed is a process and system for forming a slatted roller blind, which includes structure for performing various steps comprising obtaining a sheer fabric layered with a thermally formable slat fabric (e.g., Step S1-S2), winding the layered sheer fabric about a roller (e.g., Step S3), encapsulating the wound roller and heat treating the wound roller so as to set a wound shape into the slat fabric (e.g., Step S4).

According to the disclosed steps, the slats are coupled to the sheer fabric (screen) prior to heat treatment (e.g., Step S1). In such instances, the coupling is a bonding, and the bond may be an adhesive. The bonding may also be, for example, stitching or obtained via welding (an alternative to Step S1, not illustrated). In such instances, the screen/slat product is arranged prior to being introduced to the alternative system. In such a configuration, the drum comprises a roll of prefabricated screen/slat product unwound onto the platform 176 as needed.

Alternatively, as disclosed, the heat treatment couples the slat fabric to the sheer fabric (e.g., FIGS. 35A and 35B). In such instances, the slats are coated with a thermally activated adhesive.

Furthermore, according to the disclosed embodiments, the thermally formable slats and sheer fabric can be the same material type, and the slats are treated with a thermally formable resin prior to being layered to the sheer fabric. Alternatively, the thermally formable slats and sheer fabric can be the same material type, but the slats can be treated with a thermally formable resin after being layered to the sheer fabric.

Stated differently, the disclosed embodiments provide a process and system for forming a slatted roller blind including structure capable of performing plural steps comprising obtaining a fabric layered with a plurality of formable slats, including a first slat and a last slat, where each slat has a face (Step S1). According to the disclosed steps, the layered fabric is wound into a coil (see FIG. 27; item 216, FIG. 30; item 50, FIG. 2 and Step S3) having an axis such that the face of each slat is substantially parallel with the axis of the coil.

The steps include treating the coil so as to set a wound shape into the slats such that the first slat is the innermost slat of the coil and has a radius smaller than the last slat which is the outermost slat of the coil (Step S4). The disclosed embodiments also relate to a slatted roller blind made in accordance with the disclosed process.

In other words, the disclosed embodiments provide a process and system for forming a slatted roller blind including structure for performing plural steps, comprising obtaining a fabric layered with a plurality of formable slats (Step S1) and winding the slat layered fabric about a roller to create a fabric wound roll (Step S3). The steps include treating the fabric wound roll so as to set a wound shape into each slat (Step S4). According to the disclosed steps, the fabric wound roll is treated with heat to set the wound shape of each slat. The disclosed embodiments also relate to a slatted roller blind made in accordance with the disclosed process.

Stated differently, the disclosed embodiments provide a process and system for fabricating a blind which includes structure for performing plural steps comprising a first step of helically winding slat fabric about a drum, thereby forming a slat product. A second step is moving the slat product from the drum to a platform. A third step is winding the slat product about a roller to form a roller blind. A fourth step is moving the blind from the platform to a treating device. According to the disclosed embodiments, the roller is a roller tube.

Further to the first step, the slat fabric is wound about a screen fabric, which is wound about the drum, so that the slat product forms a screen/slat product. Additionally, the second step further comprises moving the screen/slat product from the drum to the platform while winding additional screen fabric on the drum. According to the disclosed steps, the screen fabric is helically wound about the drum.

An alternative embodiment of the invention will now be addressed. This alternative is not identified herein as being less or more preferential than the previously disclosed embodiment as circumstances may arise in which one configuration is necessitated over the other. In this embodiment, structural components which are the same as or essentially the same as those disclosed in the prior embodiment will receive the same identifying numbers.

Figure 38:
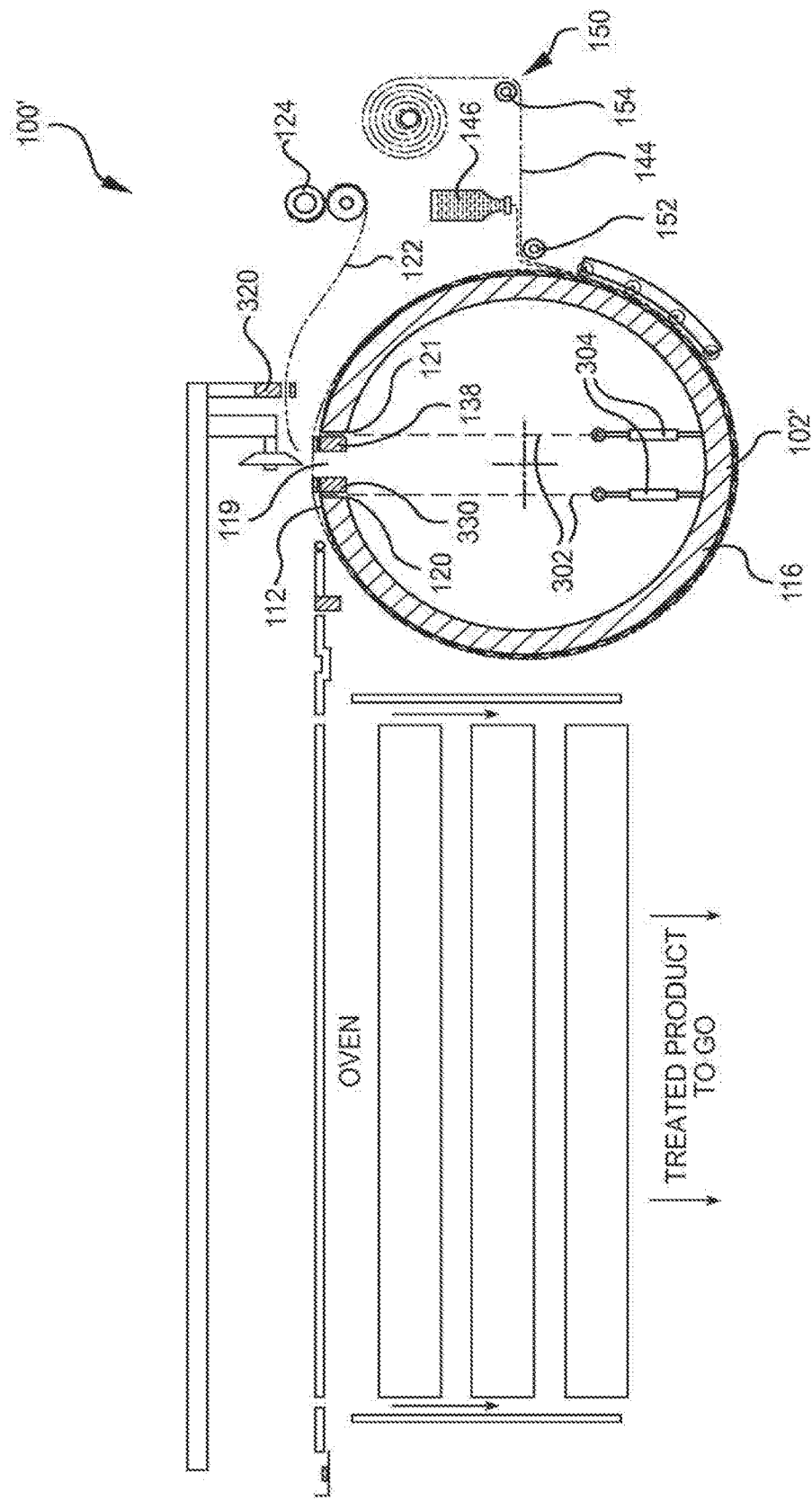
FIG. 38 illustrates a front elevational view of an alternative embodiment wherein screen/slat product is wrapped about the drum.
Figure 39:
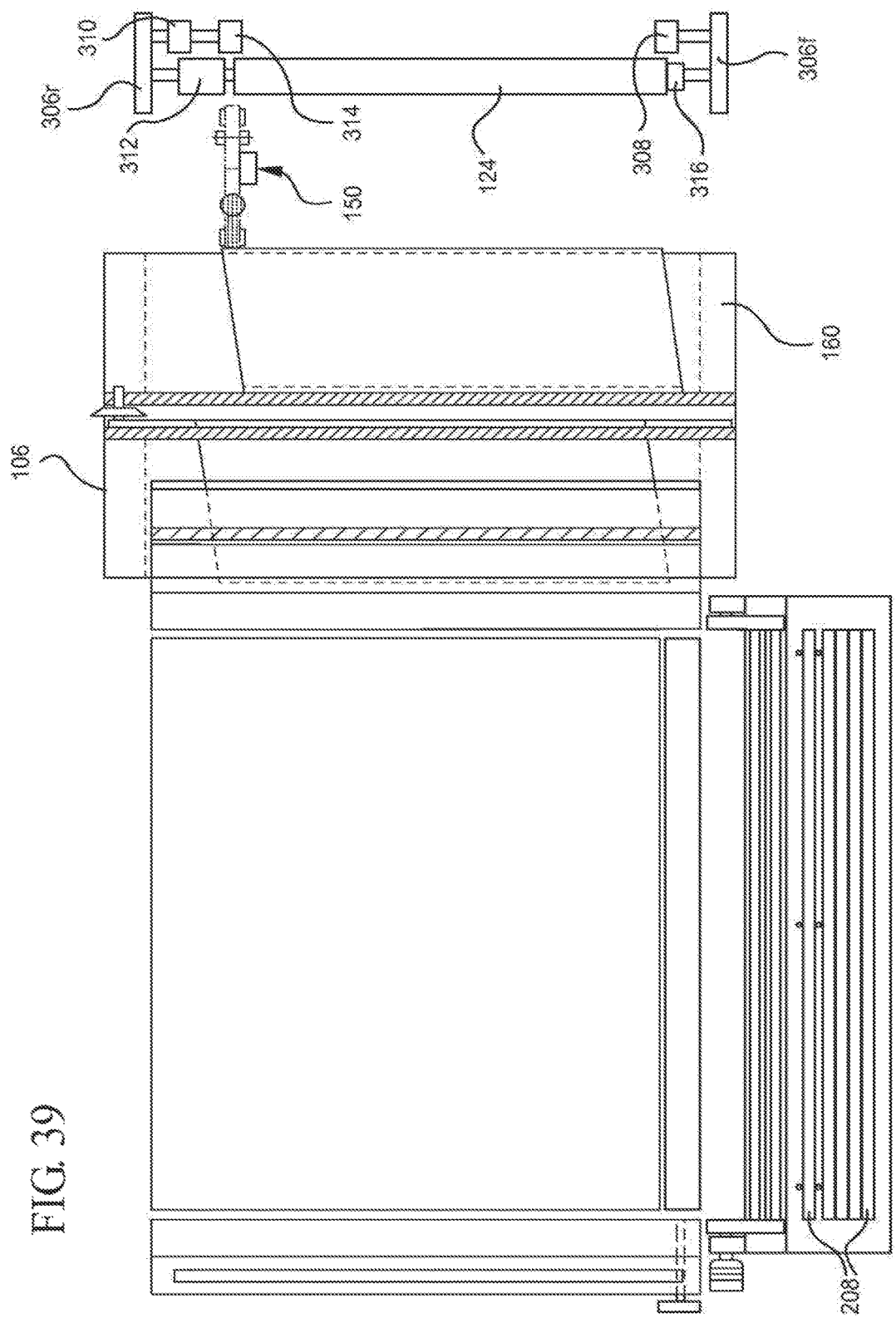
FIG. 39 illustrates a top elevational view of the embodiment of FIG. 38, wherein screen fabric is wrapped about the drum.

Turning to FIGS. 38 and 39, the components of the alternative embodiment for the system 100' will be reviewed which provide for helically winding sheer and slat fabric about the drum 102'. The components of the system 100' include the master drum 102', which has the same overall size as the drum 102 disclosed above, except as otherwise discussed herein, and is also capable of rotating about its center axis as explained before. The drum 102' has an axial groove 119' (FIG. 39) in the external shell 116, disposed at the location of the axial opening 119 in the previous embodiment. It is noted that in FIG. 38, the drum is wrapped with screen/slat product while, for comparison, in FIG. 39, the drum is only wrapped in screen fabric.

The axial groove 119' is in the top end 112 of the drum shell 116 when the drum 102' is in its initial, top-dead-center, or home position. The axial groove 119' extends the length of the drum and has the circumferentially spaced, left 120 and right 121, axially extending sides. The width of the groove 119', measured in the circumferential direction for the drum, will become apparent by reading this disclosure. The groove 119' is designed for seating the magnets disclosed herein, such as magnet 138.

A silicone sheet 302 is wrapped about the drum shell 116. The sheet 302 is a tacky material and, importantly, is a glue release material, meaning the glue does not adhere, which enables the screen fabric 122 to remain wrapped cleanly about the drum 102' and enables clean removal of the glue laden screen/slat product 162. The silicone sheet 302 may be held in place by a bank of turnbuckles 304 connected within the drum cavity 118', and connected to free ends of the sheet 302 which extend into the drum cavity 118' through, for example, an opening in the groove 119'. The benefit of the turnbuckle connections is the ability to replace the sheet 302 if it is accidentally torn. Other structure can be considered for attaching the sheet 302 about the outer drum shell 116. For example, one or more rigid bars could extend in seams in the ends of the silicone sheet, which fit into slots disposed at the groove 119'.

In this embodiment, the screen fabric supply roll 124, which is dimensionally the same as before, is supported on a carriage or other support structure 306F/306R, illustrated schematically in FIG. 39, which is exterior to the drum 102'. The support structure may be supported, for example, on the floor. In the illustration, the roll 124 is spaced above the top 112 of the drum, and at the right side of the drum 110, though this is just one possible location. Also supported on the support structure 306F/306R, as illustrated in FIG. 39, is a head tape 308 disposed toward the front of the drum 104 and is connected to a front component 306F of the support structure. On the other hand, a tail tape 310, wrapping paper 312 and a joint tape 314 are disposed towards the rear of the drum 106, and are supported on a rear component 306R of the support structure. It is to be appreciated that the tapes and support 306F/306R are schematically illustrated and the illustration is not intended to provide constraining limits on the location and configuration of these components.

Figure 40:
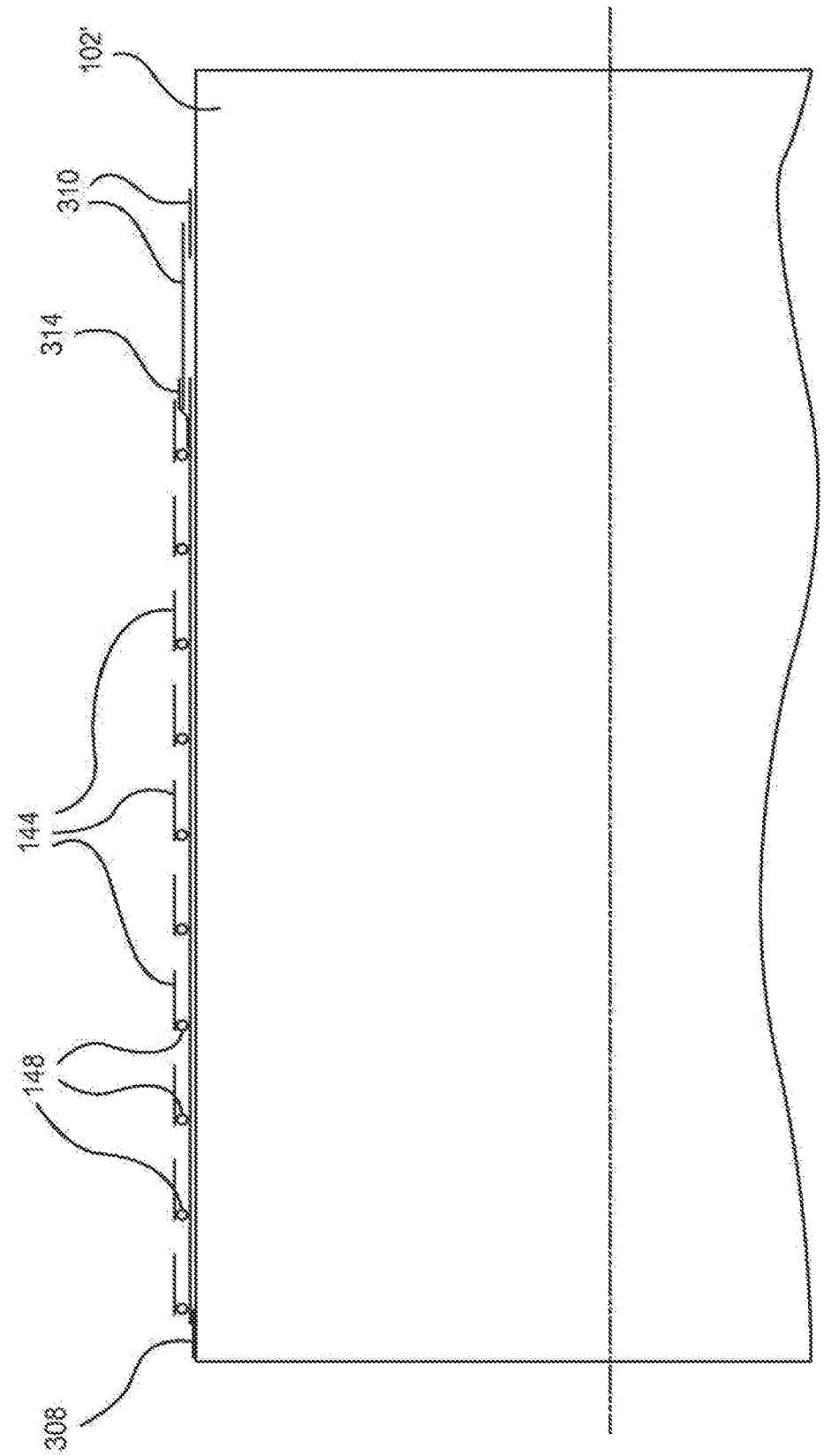
FIG. 40 illustrates a side view of the drum wrapped with screen/slat product in the embodiment of FIG. 38.

Each of the tapes 308, 310, 314 can be a one-sided packing tape. The tapes 308, 310, 314 and paper 312 are connected to the fabric roll 124 to form an integral sheet when loaded onto the support structure 306 so that there is no need to reconnect during each cycle of creating the screen/slat product 162. In the connected configuration, illustrated schematically in FIG. 40, the joint tape 314 holds the paper 312 to the screen fabric. In addition, the head tape connects the screen/slat product 162 to the roller tube 208 when winding the screen/slat product 162 about the tube. During the same procedure, the tail tape 310 enables encapsulating the screen/slat product 162 in the paper 312 so that the screen/slat product is securely encased during heat treatment. When wound about the drum 102', the head and tail tapes 308, 310 are disposed so that a tacky portion is outwardly exposed on the drum 102'. On the other hand, the joint tape 314 is provided so that the tacky side faces the drum 102', with approximately half of the tacky surface gripping the paper 312 and half gripping the screen fabric 124. In addition, in the location where the paper and screen fabric overlap, the joint tape 314 and screen fabric sandwich the paper 314. As a result, a bottom portion of the slat fabric 144, at the foot of the screen/slat product 162, will sit on top of the joint tape 314 rather than the paper 312 or the screen fabric.

Figure 41:
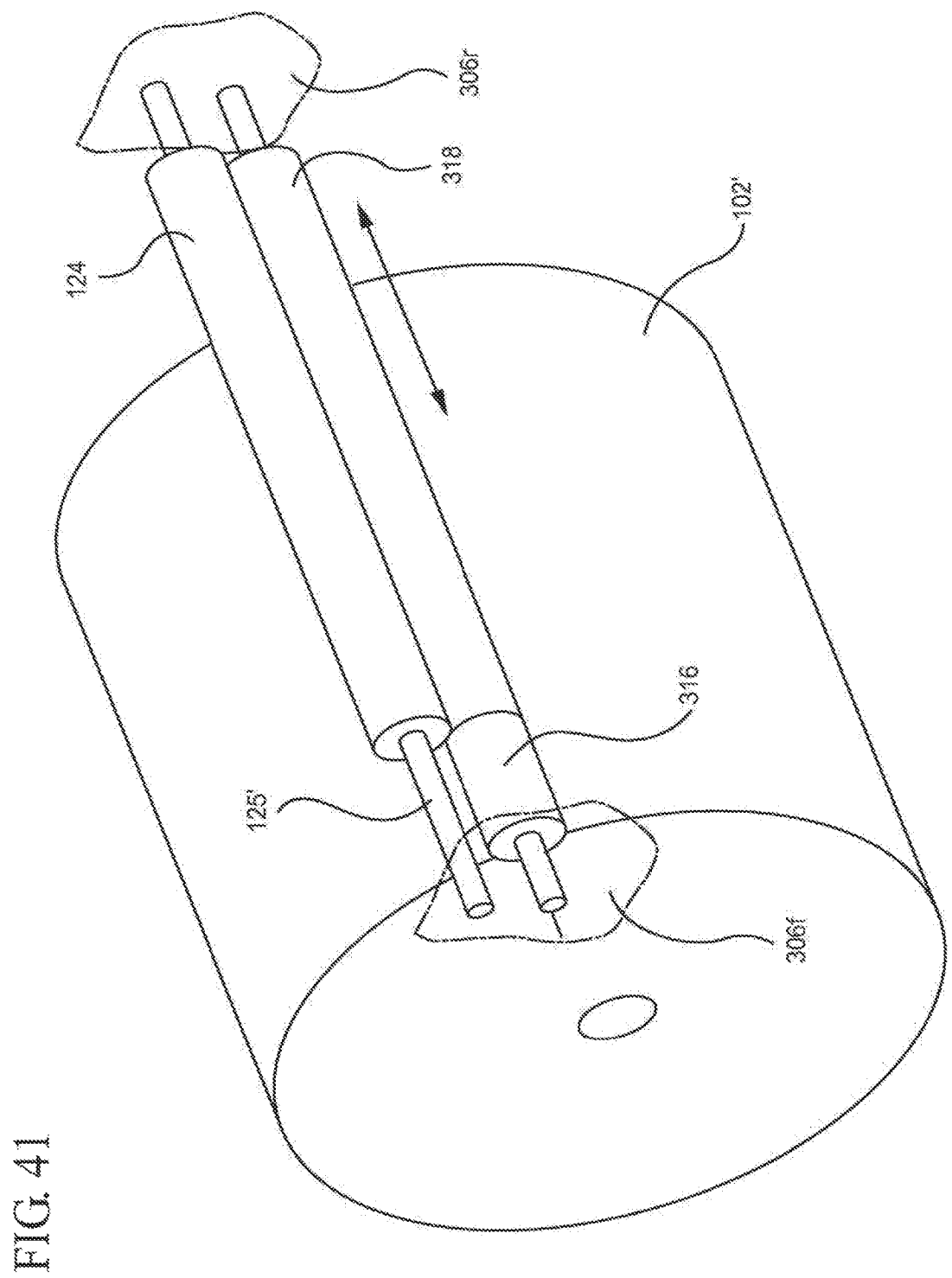
FIG. 41 illustrates the drum, screen supply roll and support roll of the embodiment of FIG. 38.

As partially illustrated in FIG. 41, the screen fabric supply roll 124 is supported on a roller bar 125' which is capable of vertically moving, substantially freely, in the left and right support structures 306R, 306F. Vertically adjacent to the fabric roller 125' is a support roller 318, which is connected to the support structure 306 and supports the fabric roll 124 along its length during unwind. Fabric material is snaked from the supply roll 124 about the support roller 318 and then lead downstream (in the feed direction) to the drum surface. A brake 316 (FIG. 39), such as a band belt, is disposed on one end of the support roller 318 so that the brake is independent of the diameter of the roll of fabric on the fabric supply roll 124, and so tension is uniform throughout the process of unrolling fabric from the roll. A second support roller (not illustrated) could be provided, with the fabric roll 124 cradled between the two support rollers, as with typical surface unwind configurations.

As can be appreciated, the drum 102' has an axial length which is greater than the axial length of the screen fabric supply roll 124 as connected to the head tape 308, tail tape 310 and wrapping paper 312. This enables the drum shell 116 to support the entire height-wise span of the screen fabric 122 and related materials during the fabrication process.

Figure 42:
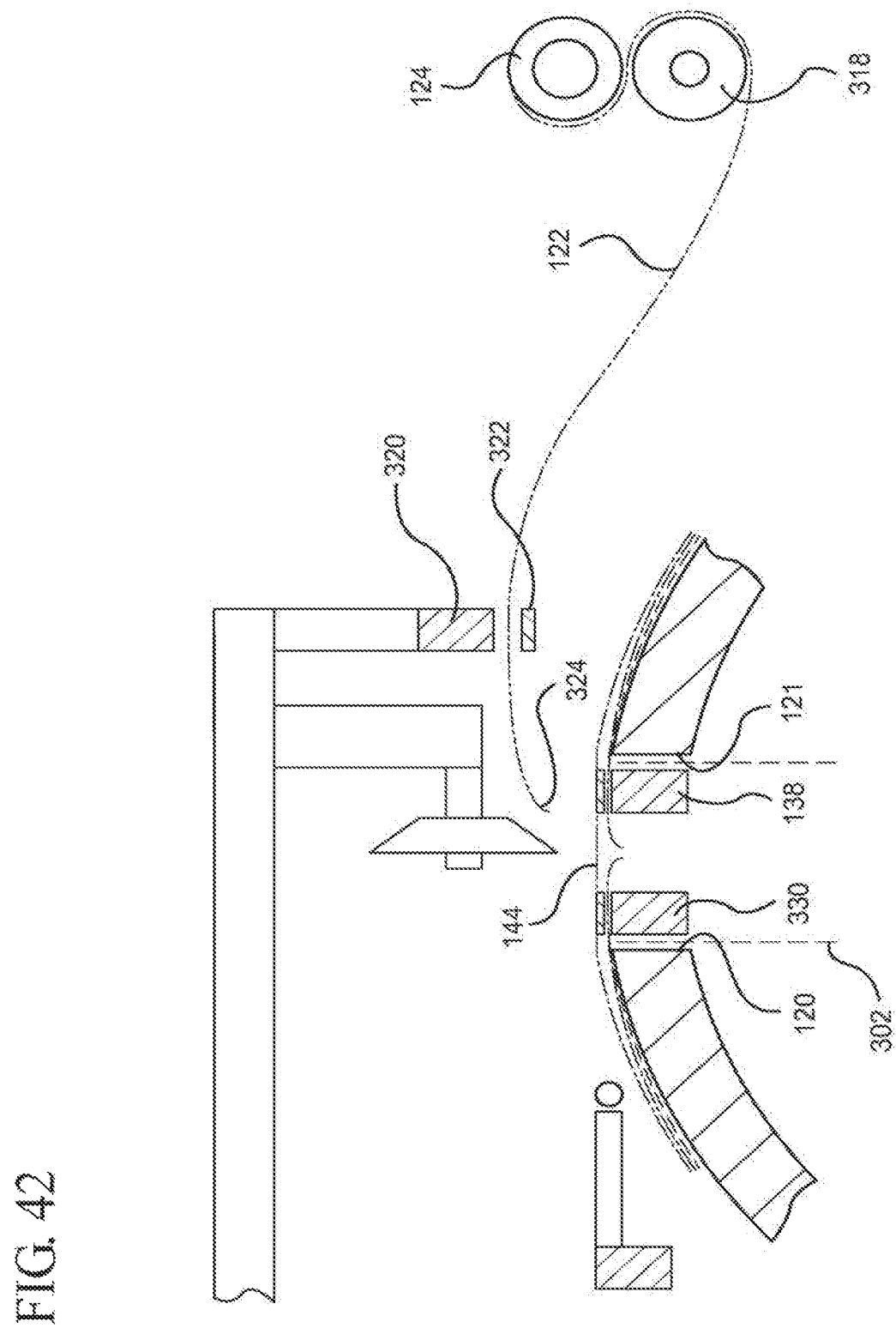
FIG. 42 illustrates an enlarged view of a portion of the drum wrapped with screen/slat product in the embodiment of FIG. 38.

As illustrated in FIG. 42, a vertically movable feed magnet 320 is provided between the supply roll 124 and the drum 102', adjacent to and above the top-dead-center position for the drum 102'. The feed magnet 320, as well as other magnets utilized in this process, as indicated, may be electromagnets or permanent magnets, and screen fabric material is fed between the feed magnet 320 and a metallic bar 322 before reaching the drum 102'. Unlike the other magnets and bars utilized with the embodiments, the bar 322 is kept in place against the feed magnet 320, for example, by being substantially permanently connected at opposing ends to the magnet 320.

A tendered amount of fabric 324 is allowed to hang freely in the downstream direction from the feed magnet 320, and a front portion of this tendered fabric will serve as the fabric leading edge 134 when the fabric is wrapped on the drum 102'. Accordingly, the length of the preset tendered fabric enables the leading edge 134 of the fabric to sit against the drum magnet 138 when the feed magnet 320 is advanced towards the drum 102', while the drum 102' is in its home, or top-dead-center position. With the preset tendered amount of fabric 324, there is no need to draw an initial amount of fabric from the supply roll 124 each time a new sheet of fabric 122 (FIG. 43D) is drawn about the drum between cycles of creating sheets of screen/slat product 162.

Before discussing the process of wrapping the fabric about the drum 102', it is noted that in this embodiment, as illustrated in FIGS. 39 and 42, the drum 102' includes a leading drum magnet, which is the drum magnet 138 located disclosed in the previous embodiment. That is, the leading drum magnet 138 is essentially flush with the drum shell 116, at the right side 121 of the axial groove 119'. In addition to the leading drum magnet 138 is a trailing drum magnet 330 located essentially where the guide roller 132 was located, on the left 120 of the axial groove 119'. As with the leading magnet 138, the trailing magnet 330 is essentially flush with the drum shell 116, and is positioned under the trailing edge of the fabric 326. Walls of the groove 119' or brackets which could be mounted in the drum cavity provide a stationary support for the drum magnets 138, 330. A gap between the leading and trailing magnets need only be that which enables cutting of fabric extending over the groove 119', such as the screen/slat product 162, as discussed with the previous embodiment.

Figure 43A:
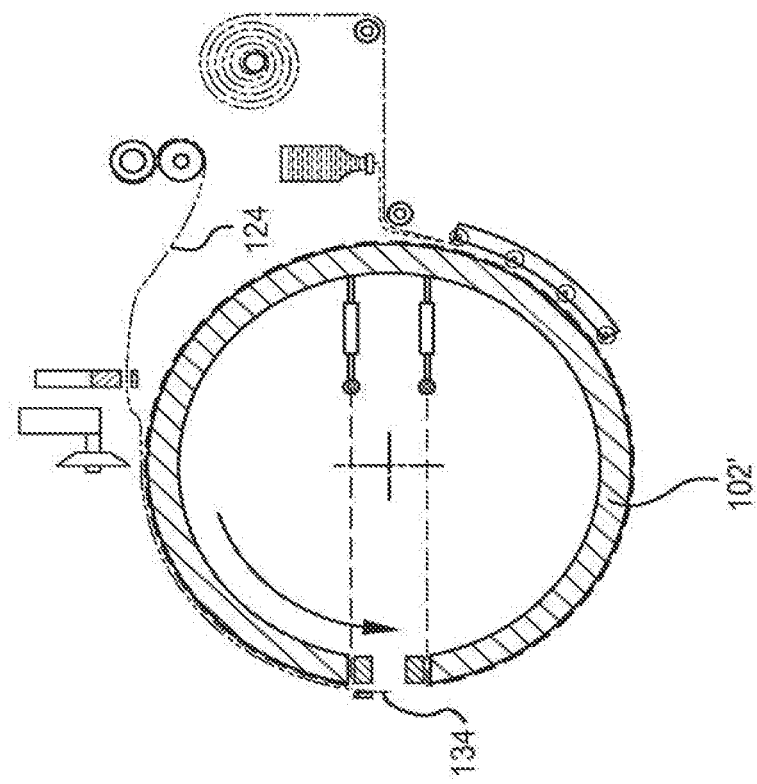
FIGS. 43A-43D illustrate the drum being wrapped in screen fabric in the embodiment of FIG. 38.

To wrap the drum 102' with a sheet of fabric 122, as illustrated in FIGS. 43a-43d, and starting with FIG. 43a, the feed magnet 320 vertically advances, downwardly, to the drum 102', positioning the leading portion of the tendered fabric 324 against the drum magnet 138. The gantry magnet 186 deposits a leading edge metallic bar, which is the metallic bar 140 disclosed in the previous embodiment, at the drum magnet 138, which locks the leading edge of the screen fabric 134 against the drum magnet 138. It is noted that the metallic bar has a length which is at least the same as the axial length of the screen supply roll 124 along with the paper 312 and tail and head tapes 308, 310 so as to grip the full length of the leading edge 134 of the sheet of screen fabric 122.

Figure 43B:
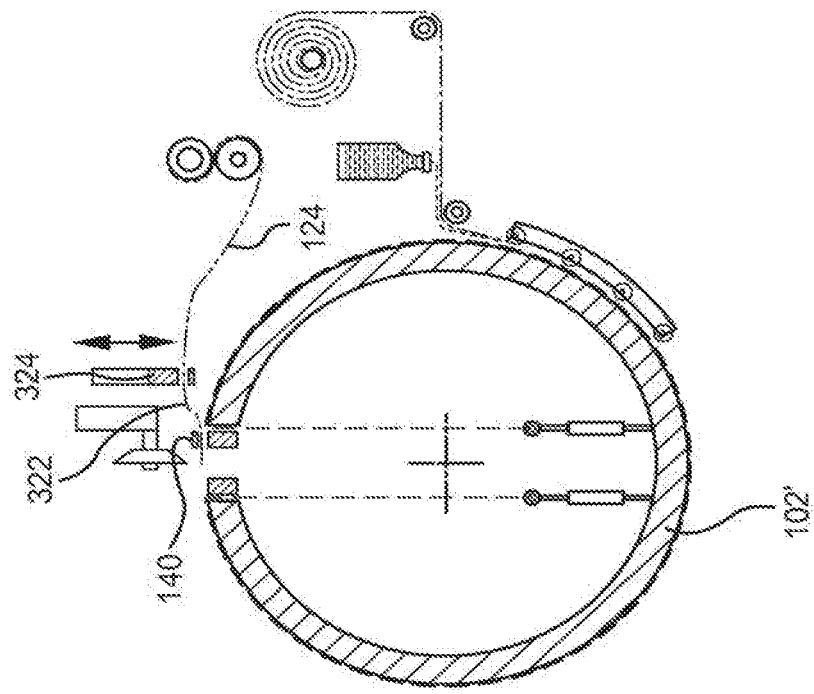

As illustrated in FIG. 43b, once the leading edge bar 140 is in place, the feed magnet and bar 320, 322 disengage while the fabric 122 is being wound about the counterclockwise spinning drum 102'. During the winding, the support structure 306R/F advances in the axial direction (FIG. 41) so as to helically wind the fabric 122 about the drum 102' and provide the axial offset spacing 160 (greatly exaggerated in the figures) as measurable between the fabric positioned over the leading edge magnet and the trailing edge magnet as illustrated in FIG. 39.

Figure 43C:
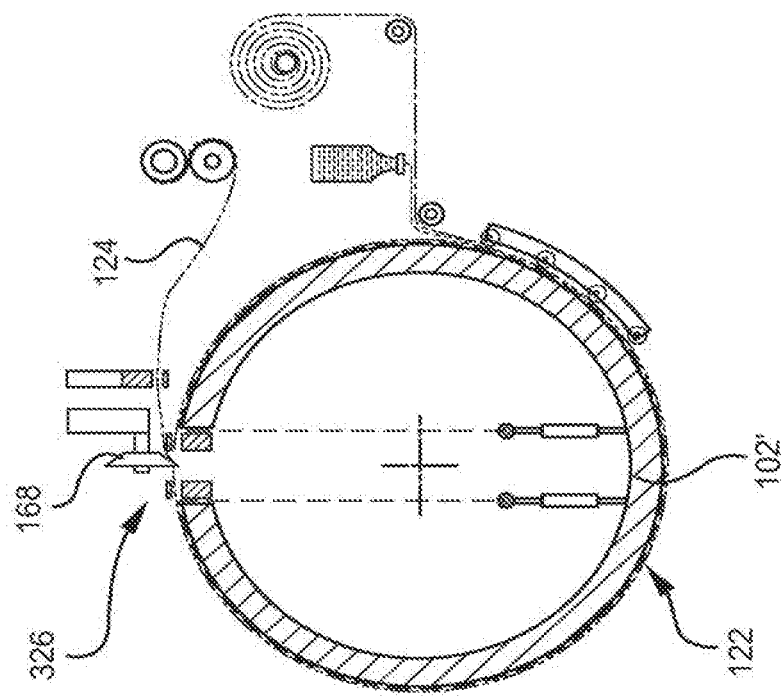

When the drum 102' returns to top-dead-center, as illustrated in FIG. 43c, a trailing edge metallic bar 334 is deposited by the gantry magnet 186 against the trailing edge magnet 330, locking the screen fabric 326 against the drum magnet 138. For convenience, the metallic bars 140, 334 are interchangeable. At this point, fabric extends over the axial groove 119', from the trailing edge magnet and into the feed magnet 324.

Figure 43D:
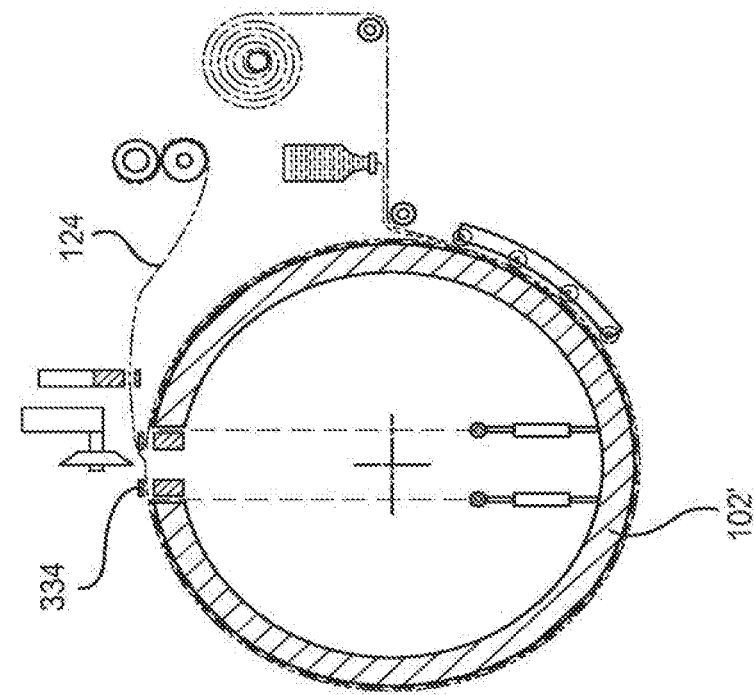

As illustrated in FIG. 43d, the gantry supported cutter 168, which is the only cutter in this embodiment, passes along the axial groove 119', between the leading edge magnet 138 and trailing edge magnet 330 so as to provide the screen fabric 122 with a trailing edge 326 which extends in the axial direction for the drum 102'. The trailing edge 326 at this point of the process does not exist in the previously disclosed embodiment. The fabric 122 on the drum 102' at this point appears as illustrated in FIG. 39. In addition, another preset tendered amount of fabric 324, is now allowed to hang freely in the downstream direction from the feed magnet 320. At this point, the feed magnet 320 vertically retracts, upwardly, from the drum 102' and the feed magnet 320 engages the magnetic bar 322 to prevent additional feeding of the screen fabric, e.g., when the slat material 144 is wound about the fabric covered drum 102'.

The slat material is deposited essentially the same way as with the previously disclosed embodiment by the structure 150 for distributing slat fabric 144 against the screen fabric 122. As identified herein, but applicable to the previously disclosed embodiment, the glue is a fast crystallizing version of the co-polyester used in the above embodiment. Co-polyester type glues tend to remain tacky for a period of time after they harden until they crystallize. Once the glue crystallizes, it will no longer be sticky until it is brought up to its melt point, about 230 degrees F. The glue in the above disclosed embodiment takes about 24 hours to crystallize, during which time it remains tacky, and is made even more tacky by the 170 degrees Fahrenheit heat treating temperature.

More specifically, the glue in each embodiment is pushed all the way though the sheer in the drum wind process and cools against that textured silicone belt. The glue is thus present on the other side of the screen fabric 122. This push through provides better glue strength, but with the glue in the previously disclosed embodiment, it also means that that glue stuck to the layer of material below in the rolled up state when heated to the 170 degrees heat treatment temperature causes blocking when the shade is unrolled. This is why the above noted release paper was used.

The currently described glue crystallizes in seconds. This means by the time the drum roll is complete, it is crystallized, and the liner is not required to prevent blocking. This glue is by the same supplier, EMS-GRILTECH, of Sumter, S.C., USA, and is called Griltex D 1442E.

Note that when exterior grade materials are used to form the shades, the slat curving temperature is still approximately 250 degrees F. Thus, even with the EMS-GRILTECH glue, a release liner is required. In such circumstances, the roll of release paper, schematically illustrated as 335, is supported by the slat distributing structure 150 as disclosed in the previous embodiment. In addition, as with the previous embodiment, the release paper could be wide enough to cover the entire surface of the screen fabric 122. In such case, a base layer of release paper could be either rolled between the screen fabric 122 and the drum 102 or over the screen fabric 122 after the completed application of the slat fabric 144. Such a length of release paper could be obtained from a roll of such material supported on the support structure 306 and wound about the drum 102' along with the winding of the screen fabric 122.

Figure 44:
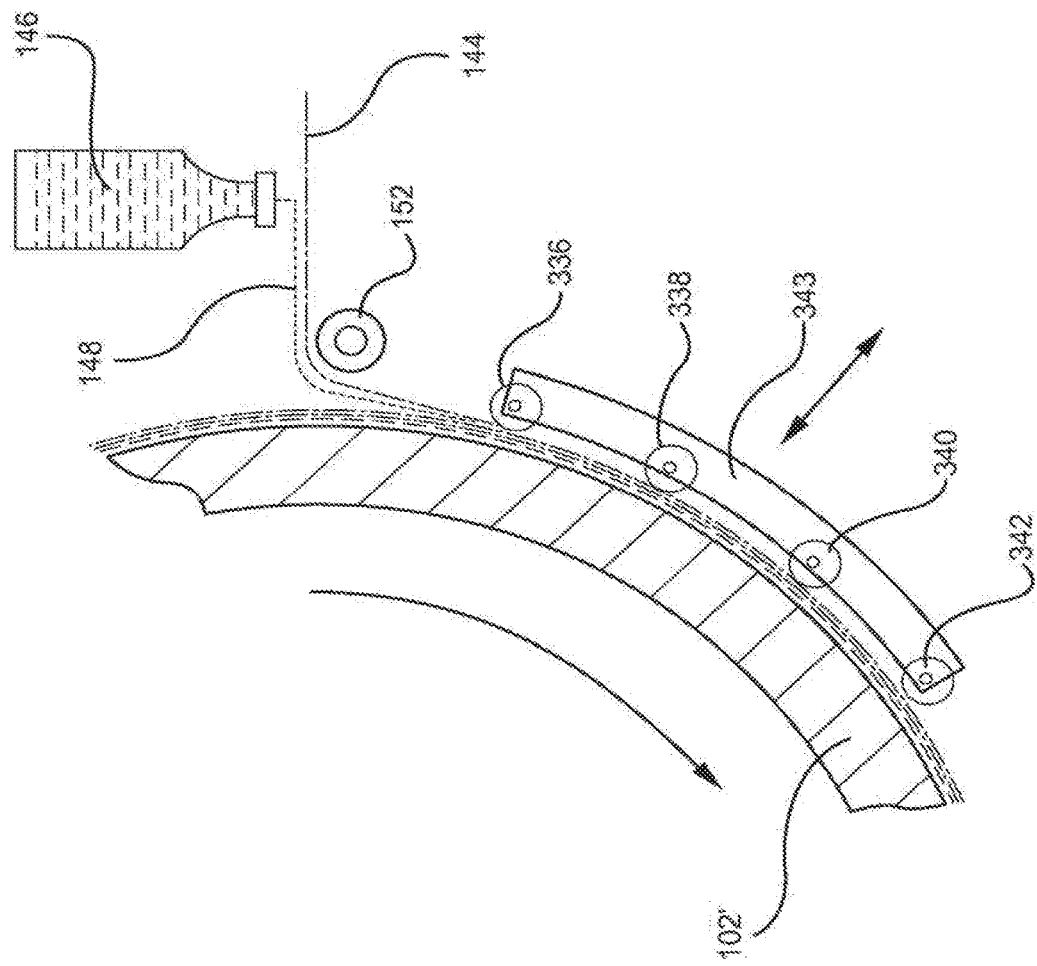
FIG. 44 illustrates an enlarged view of a portion of the drum while slat fabric is applied and with roller nips positioned against the drum in the embodiment of FIG. 38.

The slat distributing structure in this embodiment, instead of including plural spring metal nips, includes plural rubber rollers 336-342 as multiple nips, as illustrated in FIG. 44. The rollers 336-342 are disposed in line with respect to the drum circumference, are capable of being pressed against the outer circumference of the drum 102', and are downstream of the guide rollers 152, 154. The structure 343 to which each of the rollers is connected positions the rollers on the same arch as the outside diameter of the drum 102' and applies pressure to position the slat fabric 144 against the screen fabric 122 and firmly press the adhesive 148 into the screen fabric 122 for reasons disclosed with the use of the nips. The spacing between each roller is at least that of the width of the axial groove 119' and four rollers assures that at least three rollers are always on the surface of the drum 102', i.e., when one of the rollers is over the groove 119'. This prevents unwanted vibrations as the rollers pass over the groove 119'.

Figure 45:
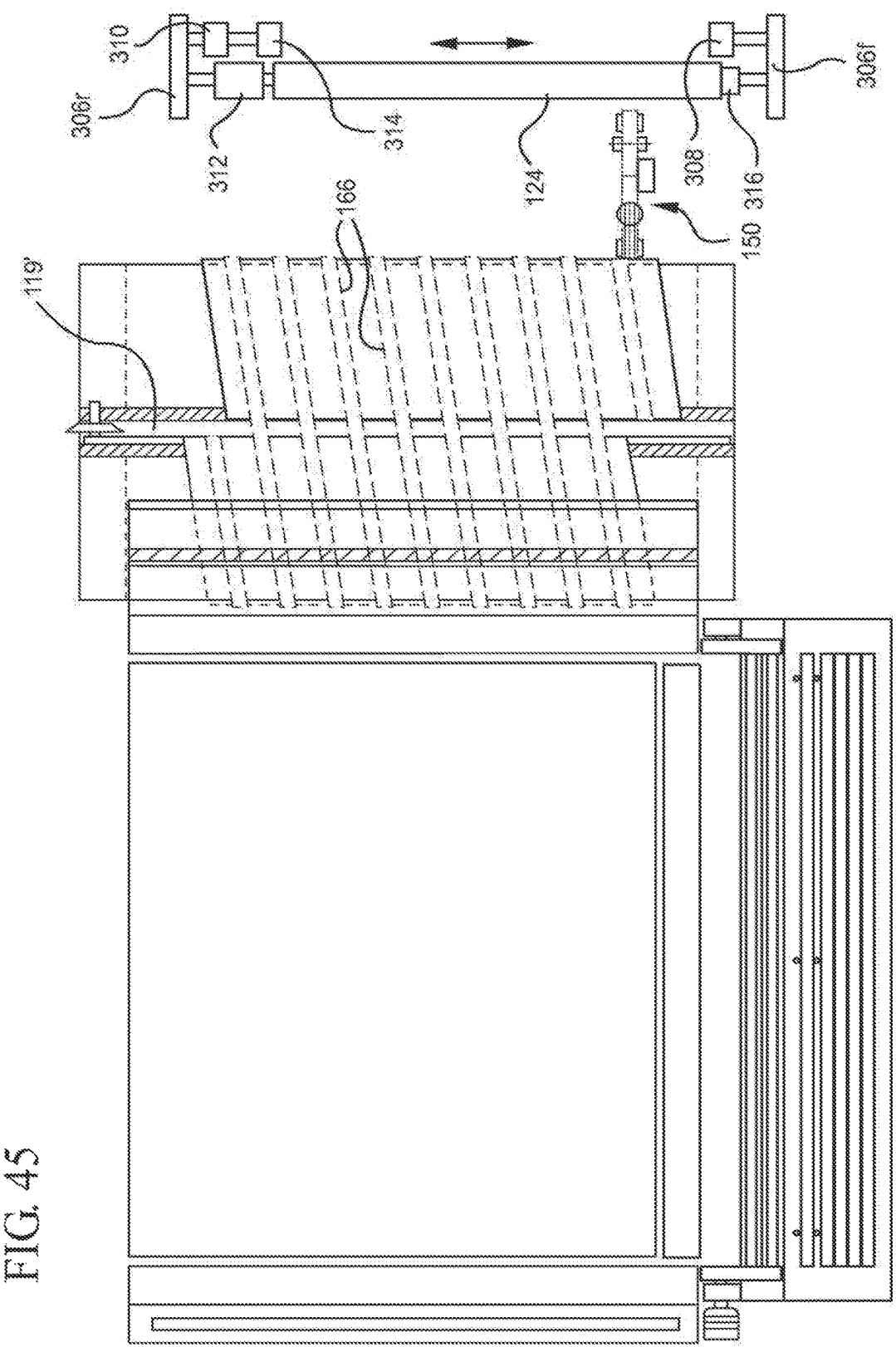
FIG. 45 is a top elevational view of the embodiment of FIG. 38, wherein slat fabric is wrapped about the drum.
Figure 46:
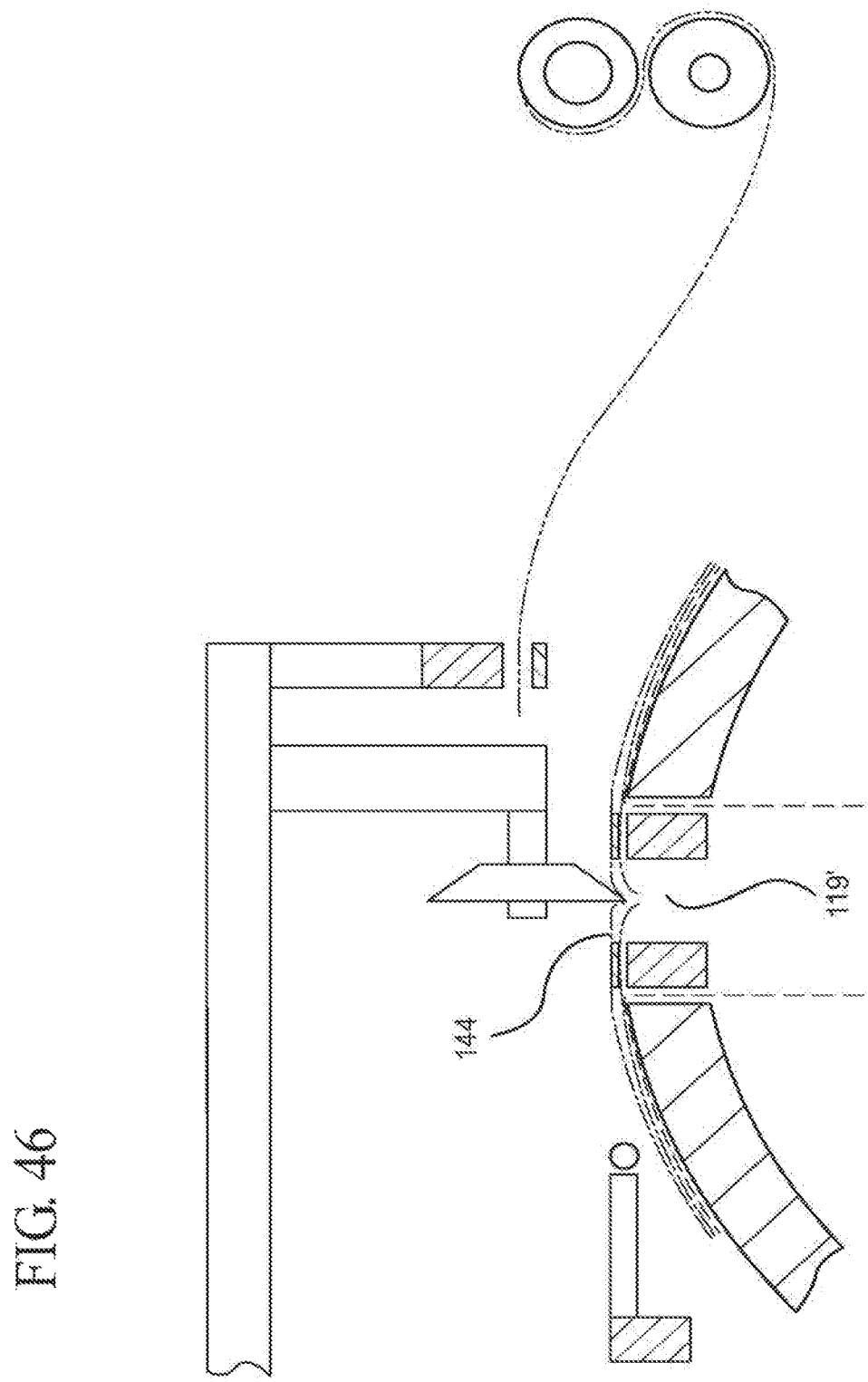

The process of winding the slats 144 about the screen fabric 122, which forms the screen/slat fabric 162, sandwiches the metallic bars 140, 334 at respective leading edge and trailing edge drum magnets 138, 330, between the screen/slat fabric 162. Furthermore, as illustrated in FIGS. 45 and 46, the slat winding process wraps the slat fabric 144 continuously about the drum shell 116, e.g., circumferentially across the axial groove 119' in the drum shell 116. As with the previous embodiment, the gantry supported cutter divides the slat fabric 122 to create the screen/slat product 162.

Turning now to FIG. 47, a review of the components of the system required for removing the screen/slat product from the drum, rolling the screen/slat product about a tube 208 to form an elongated blind 216, and heat treating the blind to set the form of the slats 144. In this embodiment, as illustrated in FIGS. 47 and 48A/B, the platform 176' has overall dimensions which are similar to the previous embodiment, except that the platform 176' does not have the platform magnets (188, 190) because of the decoupling of the process for winding screen fabric 122 on the drum 102' from loading the screen/slat product 162 onto the platform 176'.

The gantry structure 170, which is utilized in the previous embodiment, is schematically illustrated which, relative to the platform 176', includes a stationary front structure 344, a stationary rear structure 346 and a traversing gantry member 348 which is capable of traveling in tracks in the stationary structures between the left end 182 of the platform 176', the right end 184 of the platform 176, and over to the drum 102.' The traversing gantry member 348 includes the gantry supported magnet and gantry supported cutter (cutter illustrated in FIG. 47). The stationary gantry structures may be supported on the floor or part of the platform structure.

In FIG. 48A, the gantry magnet drags the leading edge magnet to the left end 182 of the platform 176' while the drum turns simultaneously so as to remove the screen/slat product 162, as disclosed in the previous embodiment. As the unwinding of the screen/slat product 162 is decoupled from the winding of the screen fabric 122 about the drum 102', winding of new fabric 122' about the drum 102' is not occurring during this process. Once the screen/slat product 162 has cleared the drum 102', as illustrated in FIG. 48B, the front portion 350 of the traversing gantry member 348 further advances relative to the rear portion 352, for example, by speeding up, so as to render the top and bottom edges 164, 166 of the screen/slat product 162 square with the platform 176'.

Figure 49:
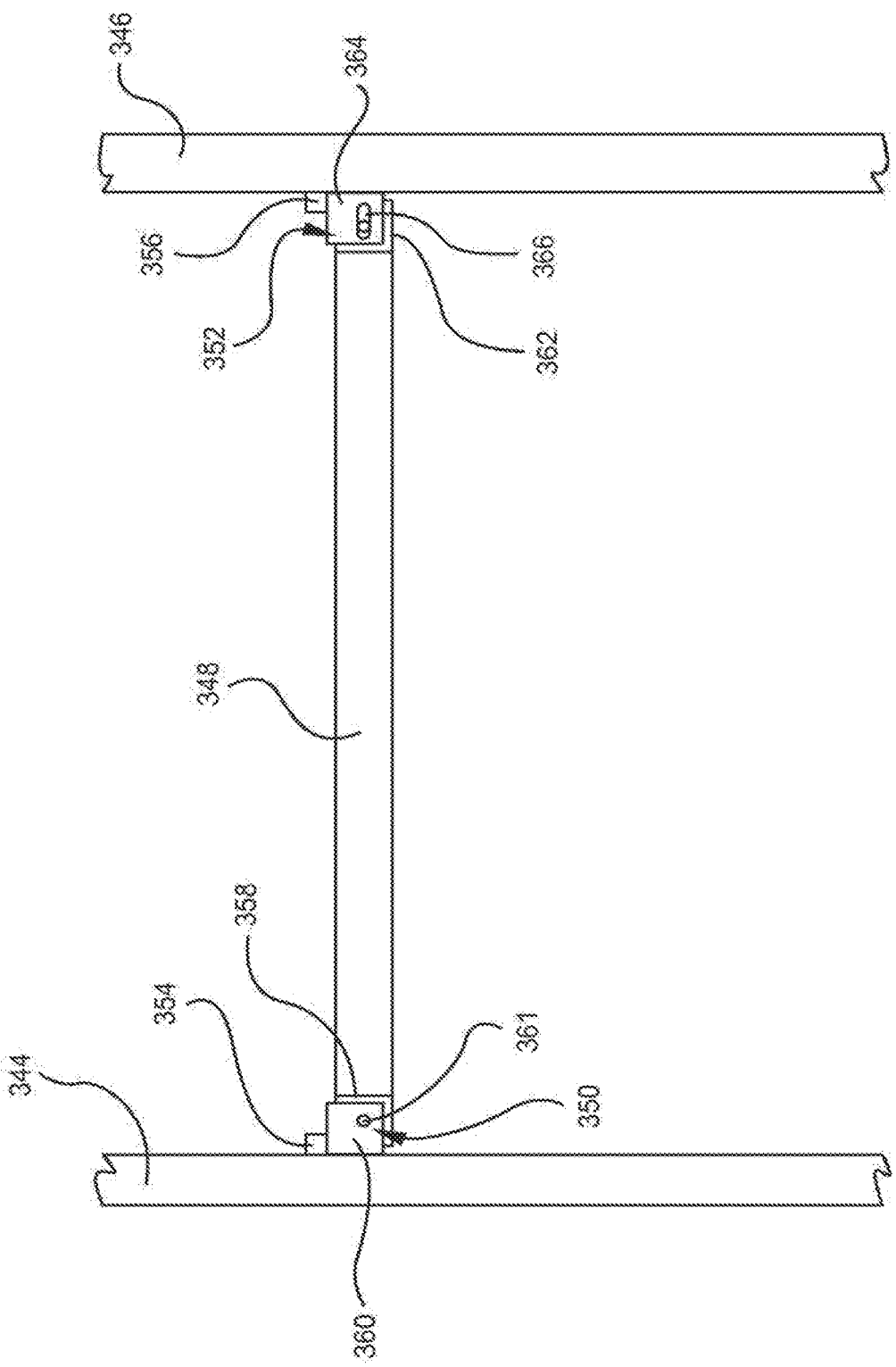
FIG. 49 illustrates a second of a gantry system utilized for removing screen/slat product from the drum in the embodiment of FIG. 38.

As illustrated schematically in FIG. 49, this relative motion is made possible by, for example, providing the front portion and rear portions 350, 352 of the traveling gantry member 348 with independent motors 354, 356 which are timed appropriately. To limit torque applied to the gantry, the front of the traversing member 350 could be connected to a first plate 358 which is connected to a second plate 360 at a pivot 361. In addition, the second plate 360 slides on the front gantry support 344 and is driven by the front motor 354. On the other hand, the rear of the traversing member 352 could be connected to a third plate 362 which pivotally connected to a fourth plate 364 via a slot 366 which may be curved to match the swinging motion of the traversing gantry member 348. In addition, the fourth plate 364 slides on the rear gantry member 346 and is driven by the rear motor 356.

It is to be appreciated that in FIGS. 48A/B, the angular offset illustrated in the boundaries of the screen/slat product, such as between the top edge 164 of the screen/slat product and the front end 178 of the platform in FIG. 48A, and the extent to which the screen/slat product boundaries our out of square, is greatly exaggerated. In practice, for example, such angular offset from a squared configuration would be less than one degree due to, for example, the corresponding angular offset resulting from helically winding screen and slat fabric about the drum.

Once the top and bottom edges 164, 166 of the screen/slat product 162 (relative to the platform 176') are squared with the platform 176', the screen/slat product 162 is set on the platform 176' and remains in the same location until wound about the tube 208. As illustrated in FIG. 50A, the gantry magnet 186 (more clearly illustrated in, for example, FIG. 14) is retracted and the gantry cutter 168 is positioned to engage the screen/slat product 162, on the right side of the leading edge metallic bar 140. In addition, at this point on the platform 176', a left side platform slot 368 is provided which extends from the front 178 to the rear 180 of the platform 176', which allows the gantry cutter 168 to engage the screen/slat product 162 without cutting the platform 176'. Once cut, as illustrated in FIG. 50B, the gantry magnet 186 then engages the leading edge metallic bar 140 and moves it to the tray 192 located off of the left side of the platform 176'. The tray 192 may be angled to allow the leading bar to slide away from the platform 176' into a bin which can store as many such bars as would accumulate over an extended period of time, such as a day or more continuously manufacturing blinds.

As illustrated in FIG. 50C, the gantry 170 then moves towards the right side 184 of the platform 176' and the cutter 168 engages the screen/slat product 162 on the left side of the trailing edge metallic bar 322. In addition, at this point on the platform 176', a right side platform slot 370 is provided which extends from the front 178 to the rear 180 of the platform 176', which allows the gantry cutter 168 to engage the screen/slat product 162 without cutting the platform 176'. The gantry magnet 186 then engages the trailing edge metallic bar 322 and moves it to the tray 192.

It is to be appreciated that in this embodiment, once the gantry cutter 168 has cut the edges off of the screen/slat product 162, the screen/slat product is entirely square with the platform 176'. At this point, the screen/slat product is wound about the tube as with the previous embodiment, with the same structure being utilized, such as the structure illustrated in FIGS. 28-30 and disclosed above, such as the magazine of rollers 206, except that this structure is now squared with the platform 176'. One difference is that the paper and tail tape now encase the wound screen/slot roller shade for the heat treatment process so that the above noted structure 222 for encapsulating the blind, including the disclosed tape support 224 and roll of tape 226, are not necessary. Once wound, the blind is dropped into the oven as previously indicated.

Additionally, illustrated in FIG. 51, though applicable to both embodiments, is that the platform 176' includes a series of openings 375 under vacuum pressure, with associated tubing (not illustrated) being provided under the platform 176'. The openings, add tension to the screen/slat product while being rolled upon the tube, enabling a smoother winding of the fabric about the tube. Only one series is illustrated though as many parallel series of such openings will be provided so as to maintain the proper pressure throughout the winding process.

Figure 52:
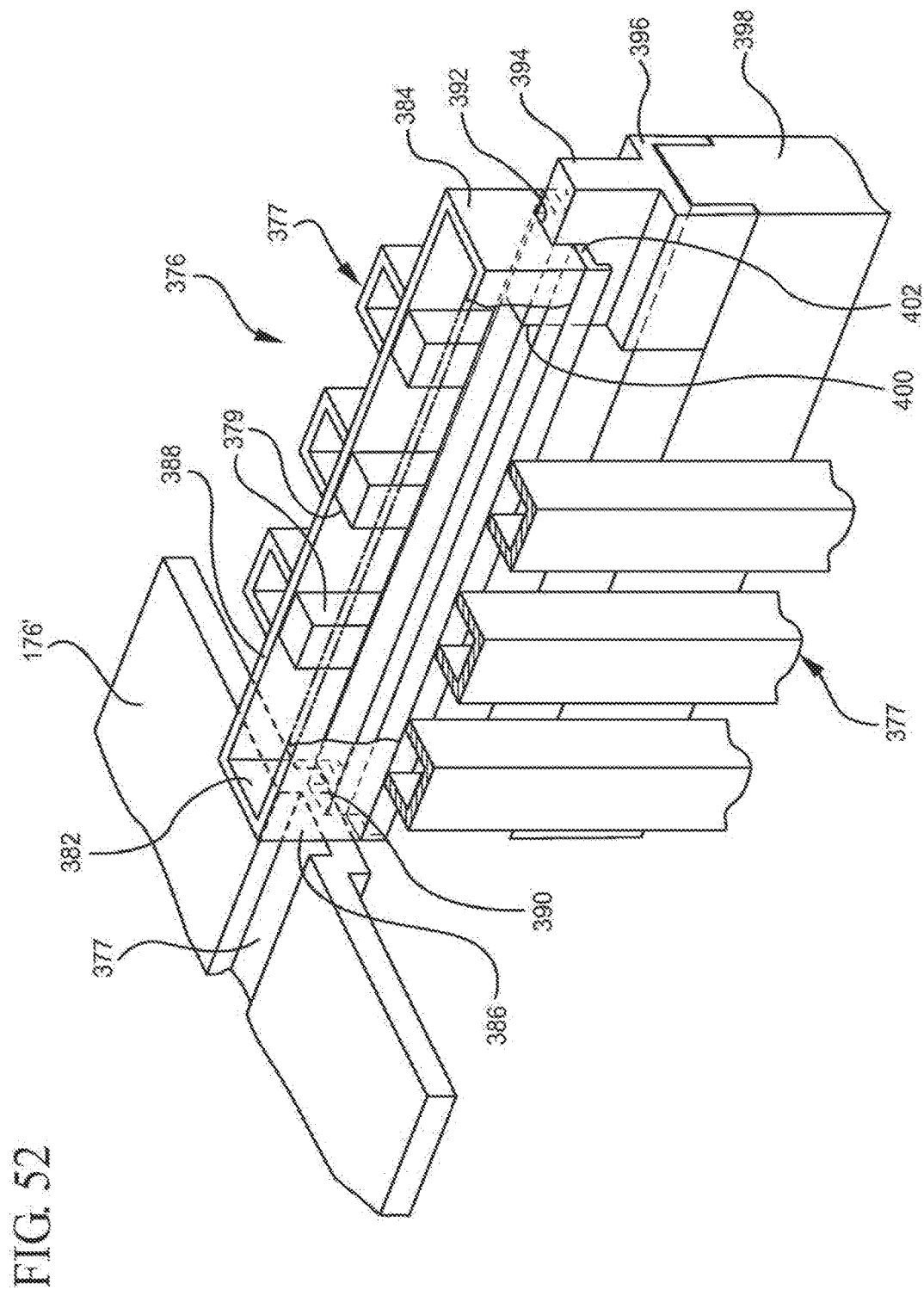
FIG. 52 illustrates a mechanism for loading metallic bars onto the platform in the embodiment of FIG. 38.

Turning to FIG. 52, structure 376 is illustrated for supplying metallic bars to the platform 176'. The structure 376 includes a slot or groove 377 manufactured in the platform 176', such as by routing, for receiving and storing one metallic bar which will later be used as either of the leading and trailing edge metallic bars as needed. The slot 377 is recessed into the platform 176' so the metallic bar seated therein does not interfere with the other operations occurring at the platform 176' surface, including the magnetized gantry magnet 168 dragging screen/slat product 162 off of the drum 102', onto the platform 176'. In addition, the slot 377 is only slightly larger in width (left to right relative to the platform 176') so that the placement of the metallic bar is true, that is, square with the platform 176', for proper gripping and subsequent placement by the gantry magnet 186. In the illustrated embodiment, the slot 377 is upstream of the screen/slat product 162 when it is seated on the platform 176'.

Off of the platform 176', the structure includes a container 378 for storing one or more of the metallic bars and supplying one bar at a time to the platform slot 377. The container 378 is stationary and supported, for example, on the floor, such as by supports 377, or cantilevered from the platform 176'. The container 378 has a base 380 which is dimensioned to seat a metallic bar. The container further includes, relative to the platform 176', a rear wall 382, which is located adjacent to and faces the platform 176', a front wall 384, which is spaced away from the platform 176', a left side wall 386, only a portion of which is illustrated, and a right side wall 388.

The side walls 386, 388 need not be continuous but can have openings or be fabricated from spaced apart segments which allow for easily positioning and stacking plural metallic bars within the container 378. The height of the walls 386, 388 is such as to enable the container to store 30 or more stacked metallic bars, e.g., for a full day or more of continually fabricating blinds 216. If needed, guides, e.g., a set of one or more molded plastic bars 379, can be connected to the inside of the side walls 386, 388, or can even form the side walls, on each side of the container 378, to keep the metallic bars properly aligned within the container. For simplicity, only one set of such bars is illustrated, against the right side wall 388.

The rear wall 382 of the container is essentially solid except for an opening 390 at its bottom (lower most, relative to gravity) edge. The opening 390 has the same area as the cross sectional shape of one metallic bar when the one or more metallic bars are stacked within the container 378 and pressed against the front wall 382. This assures that only one metallic bar at a time can be supplied or dispensed from the container 378 and, therefore, the container 378 can effectively store plural metallic bars.

The front wall 384 has an opening 392 at its bottom edge, which may be smaller than opening 390, designed to fit a protuberance 394 connected to or formed on a sled member 396. The sled member 396 sits on top of an air powered track 398, which is stationary and supported, for example, with the same structure for supporting the container 378. The protuberance 394 is adapted for being positioned against a front edge 400 (relative to the platform 176') of one metallic bar, which is seated on the base 380 of the container 378. However, the protuberance 394 is not sized to reach metallic bars stacked above the one metallic bar positioned against the base 380. In addition, the base 380 of the container 378 has a track 402, extending from the front to the rear walls 382, 384, which allows for the protuberance 394 to travel the full length of the container 378 via the sled 396.

Based on the above structure, the air sled 396 is activated as needed so that the protuberance 394 will urge or push the lowest metallic bar in a stack of such bars out of the front opening 390 of the container 378 and dispense the metallic bar into the platform slot 377. Gravity will drop the next metallic bar into place as the sled 396 returns to its home position, outside of the rear wall 384 of the container 378.

Figure 53:
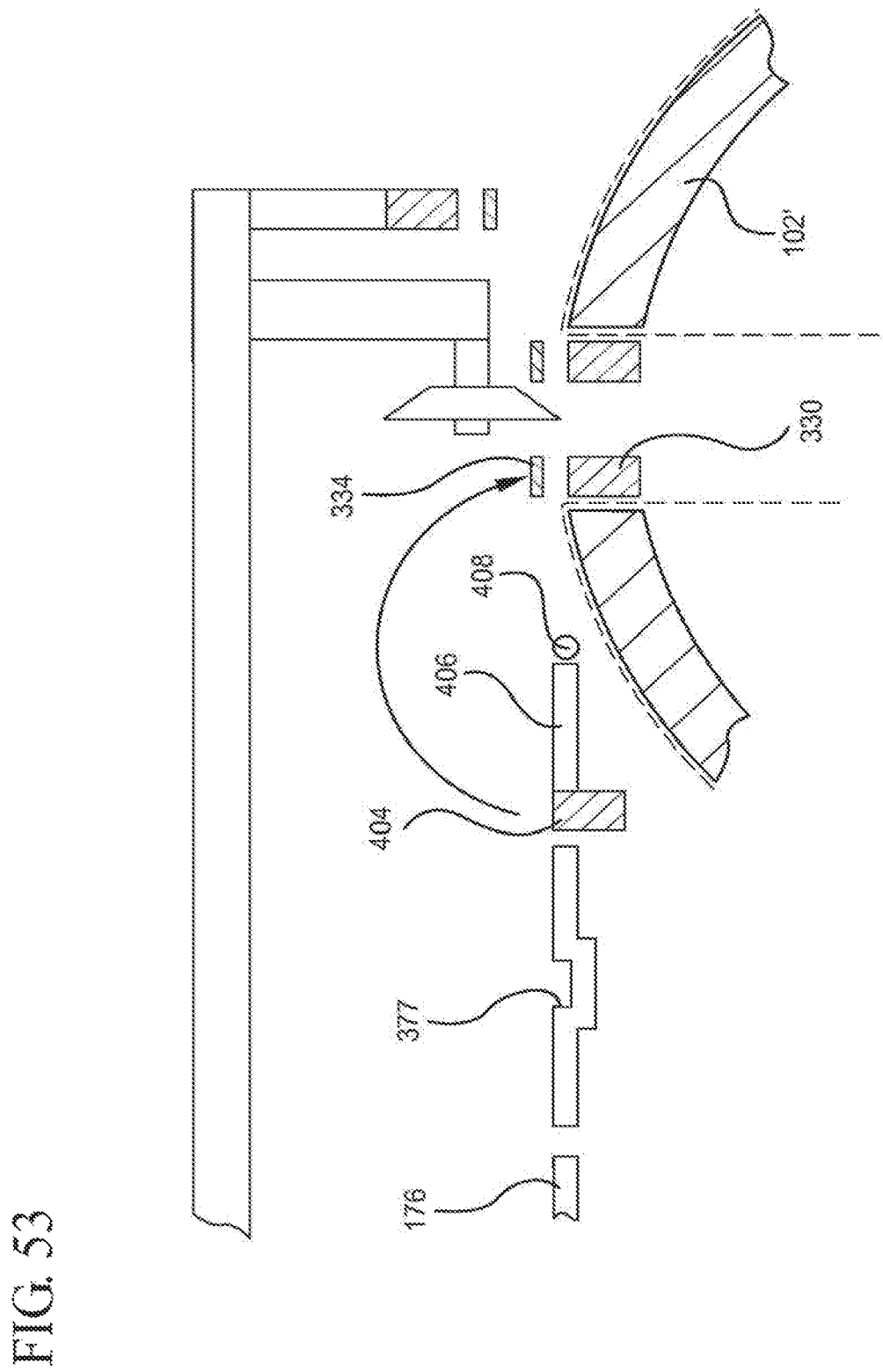
FIG. 53 illustrates an enlarged view of a portion of the platform and drum in the embodiment of FIG. 38, further illustrating the motion of the pivoting platform magnet.

Finally, turning to FIG. 53, a pivotable magnet 404 is provided, which can be integral to the above embodiments or alternative thereto. The pivotable magnet 404 is connected to a pivot arm 406 which pivots about a pivot point 408 on the platform 176'. The pivotable magnet 404 is the same size and shape as the drum magnets and the swing of the pivot arm enables positioning the pivotable magnet 404 either flush with the platform 176' (illustrated), which is its home position, or against the trailing drum magnet 330.

The pivotable magnet 404 is used when the configuration of the screen/slat fabric 162 is such that it needs to be positioned on the platform 176' so that material facing the drum 102' faces upwardly on the platform 176' rather than downwardly as previously described. Accordingly, the pivotable magnet 404, once pivoted against the trailing magnet 330, will engage the trailing edge metallic bar 334, which is sandwiched within the screen/slat product 162 (not illustrated in FIG. 53). At this point, the trailing magnet 330 will disengage, and the pivotable magnet 404 will flip back to its home position. The gantry magnet 186 will then grab the trailing edge metallic bar 334 from the pivotable magnet 404 and move towards the left end 182 of the platform 176' while the drum 102' simultaneously turns clockwise to let out the screen/slat product 162 disposed about the drum 102'.

Figure 54:
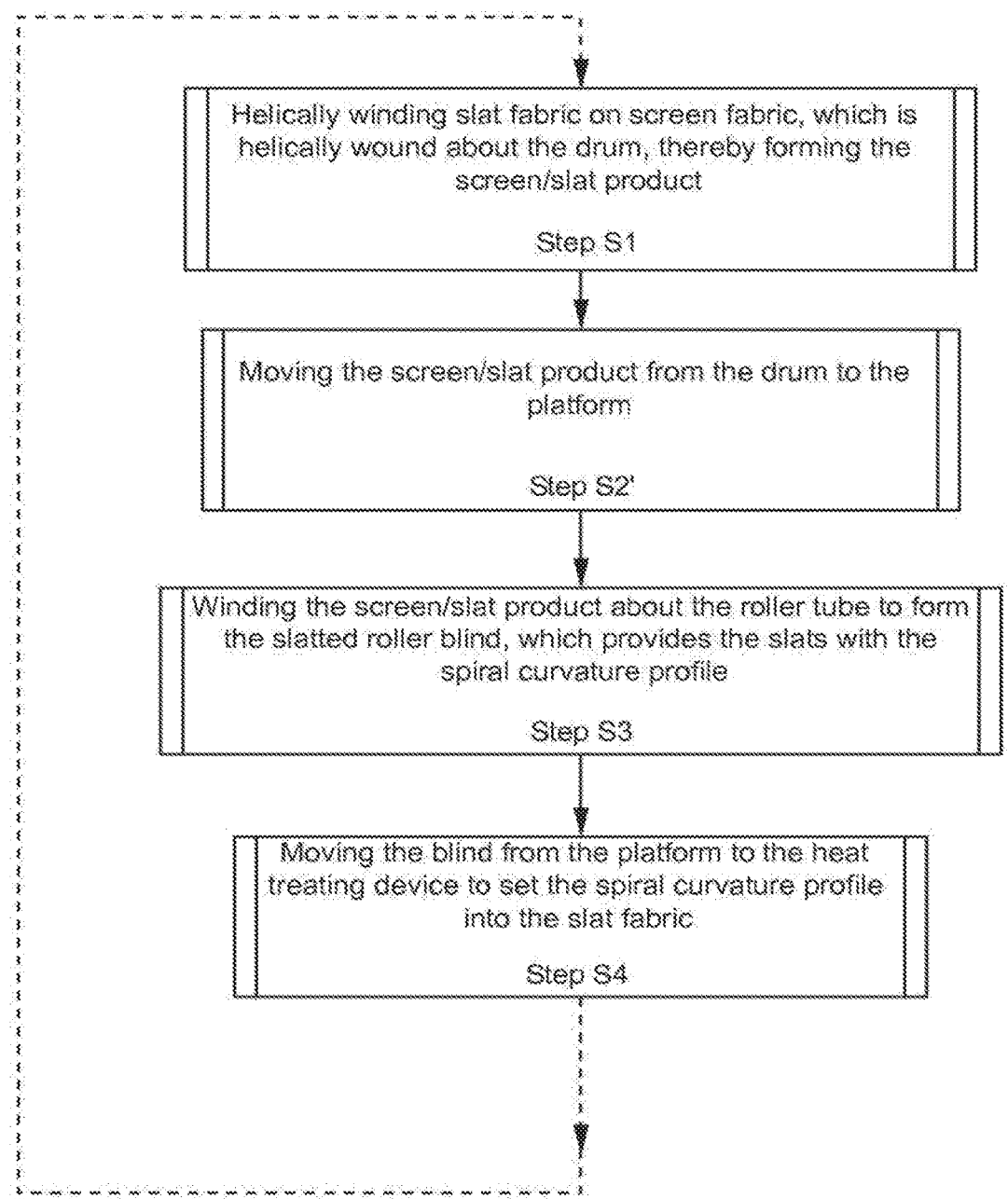
FIGS. 54-60 illustrate flow charts describing the process of manufacturing a roller blind according to the alternative embodiment.

The differences between the first and alternative embodiments may be understood by reviewing the figures directed to the process steps for the first embodiment. Specifically, FIG. 54 represents FIG. 6 in the alternative embodiment. Due to the decoupling of the process of unwinding screen/slat product from the drum and winding additional screen fabric onto the drum, Step S2' reads "moving the screen/slat product from the drum to the platform" and excludes "while helically winding additional screen fabric on the drum." In addition, the alternative embodiment does not include Step S5 of "synchronizing the steps, so that the first-formed blind, from the first-formed screen/slat product, is moved from the platform to the heat treating device, substantially when the second formed screen/slat product is moved from the drum to the platform."

Figure 55:
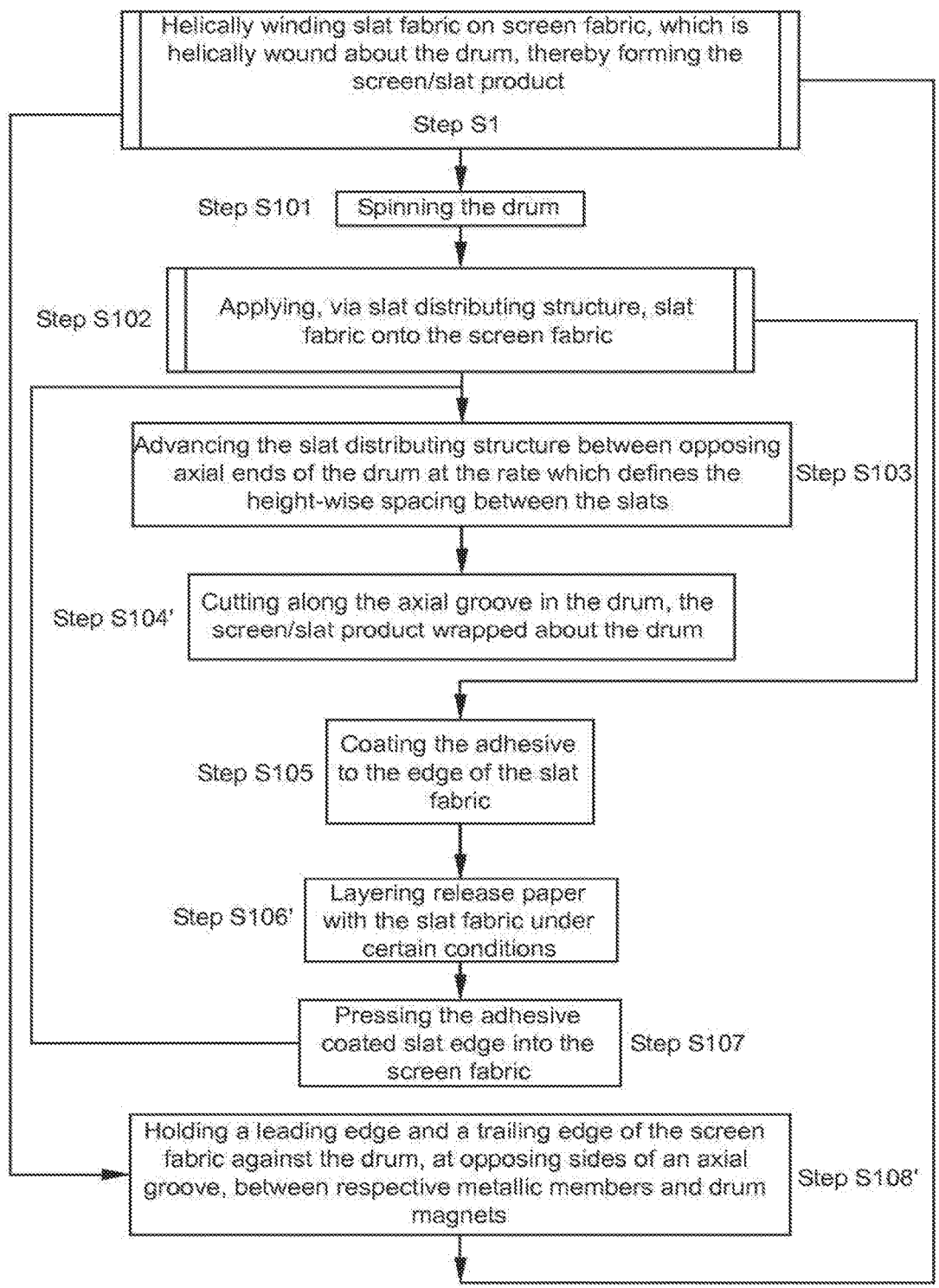

Further, with reference to FIG. 55, which represents FIG. 13 in the alternative embodiment, it is noted that while Steps S104 and S108 refer to an axial opening in FIG. 13, Steps S104' and S108' refer to an axial groove. This is because an opening is not needed in the alternative embodiment with the screen supply roller located exterior to the drum. Further, Step S106' of layering release paper in the alternative embodiment is only required when exterior grade materials are used to form the shades due to the use of the alternative glue. Further, due to the decoupling of the process of unwinding screen/slat product from the drum and winding additional screen fabric onto the drum, Step S108' in the alternative embodiment provides for "holding a leading edge and a trailing edge of the screen fabric against the drum, at opposing sides of an axial groove, between respective metallic members and drum magnets." That is, the trailing edge of the screen fabric is now held against the drum by a magnet. In addition, Step S109 of "preventing the supply of screen fabric, disposed within the drum, from supplying additional screen fabric through the axial opening is not necessary in the alternative embodiment" is not included.

Figure 56:
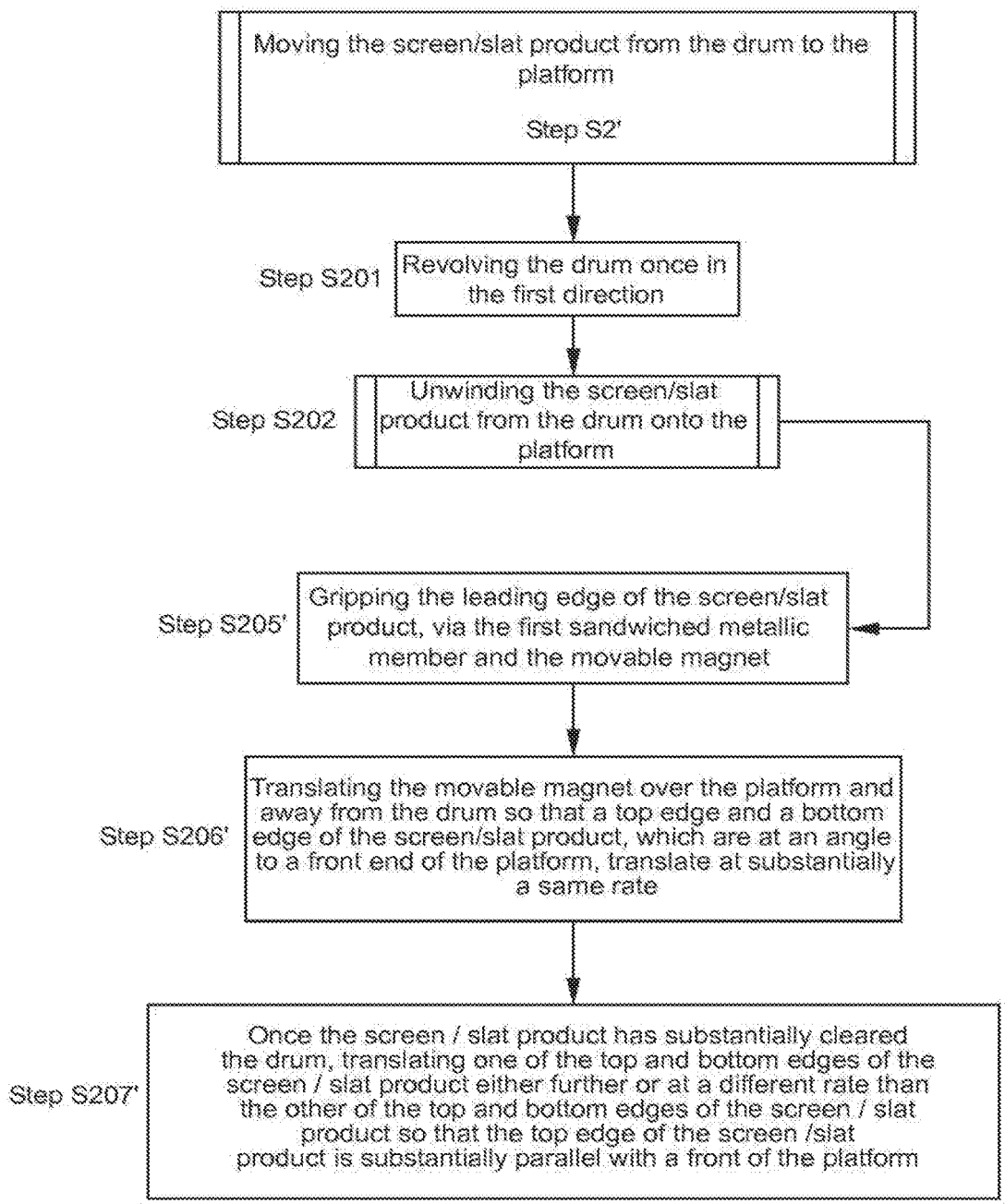

With reference to FIG. 56, which represents FIG. 24 in the alternative embodiment, Step S2' of "moving the screen/slat product from the drum to the platform" has already been identified, above, as compared with Step S2. Due to the decoupling of the process of unwinding screen/slat product from the drum and winding additional screen fabric onto the drum, the alternative embodiment does not include: Step S203 of "revolving the drum once in the second direction;" Step S204 of "drawing, through the axial opening in the drum, additional screen fabric from the supply of screen fabric;" or Step S208 of "locking the screen/slat product at the second platform magnet with the second metallic member, the second magnet being located between the leading edge and the opposing end of the platform." Furthermore, "Goto Step S209' has been relocated to FIG. 59, to be addressed below. Regarding Step S208, platform magnets are not utilized in the alternative embodiment. Though, it is noted that platform magnets could be utilized in a further alternative embodiment to move the screen/slat product about the platform, as needed.

In addition, the Step S205' recites "gripping the leading edge of the screen/slat product, via the first sandwiched metallic member and the movable magnet." This reflects the fact that in the alternative embodiment, there are two metallic bars, for holding the leading edge and the trailing edge, respectively, of the screen fabric in place on the drum. In addition Step S206' recites "translating the movable magnet over the platform and away from the drum so that a top edge 164 and a bottom edge 166 of the screen/slat product, which are at an angle to a front end of the platform, translate at substantially a same rate." Step S207' recites "once the screen/slat product has substantially cleared the drum, translating one of the top and bottom edges 164, 166 of the screen/slat product 162 either further or at a different rate than the other of the top and bottom edges 164, 166 of the screen/slat product so that the top edge 164 of the screen/slat product is substantially parallel with a front of the platform." In other words, Step S207' aligns the top edge 164 of the screen/slat product 162 with the front 178 of the platform 176'.

Figure 57:
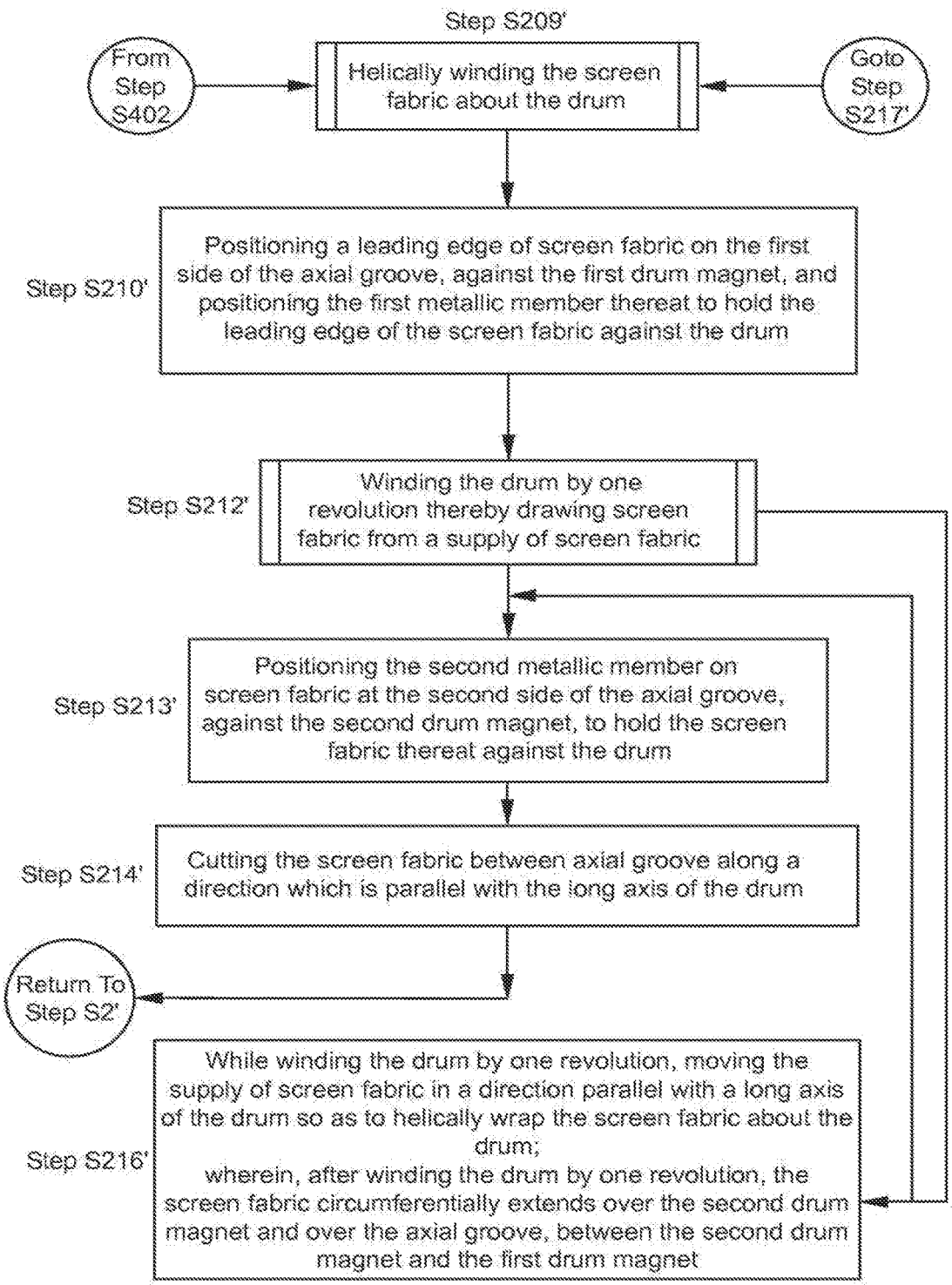

With reference to FIG. 57, which represents FIG. 25 in the alternative embodiment, this step represents the process of winding screen product around the drum. In the alternative embodiment, this step follows Step S402 rather than Step S204 as with the first embodiment. In addition, due to the decoupling of the process of unwinding screen/slat product from the drum and winding additional screen fabric onto the drum, the alternative embodiment recites the steps of Step S210' of "positioning a leading edge of screen fabric on the first side of the axial groove, against the first drum magnet, and positioning the first metallic member thereat to hold the leading edge of the screen fabric against the drum;" and Step S212' of "winding the drum by one revolution thereby drawing screen fabric from a supply of screen fabric." As noted in the figure, drum winding Step S212' comprises Step S216' of "while winding the drum by one revolution, moving the supply of screen fabric in a direction parallel with a long axis of the drum so as to helically wrap the screen fabric about the drum; and wherein, after winding the drum by one revolution, the screen fabric circumferentially extends over the second drum magnet and over the axial groove, between the second drum magnet and the first drum magnet."

Figure 58:
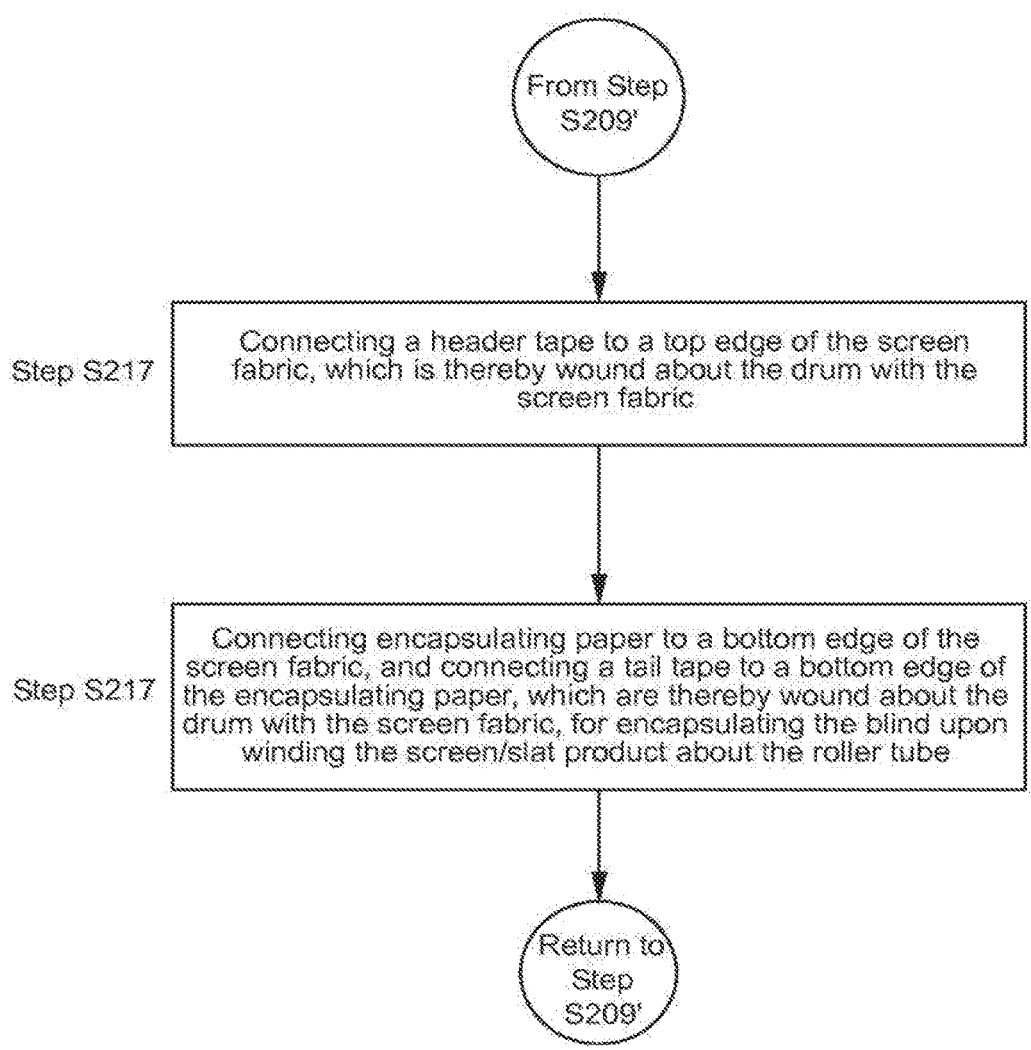

Step S209' in the alternative embodiment recites "helically winding screen fabric about the drum." The term "additional" has been removed as the same process for winding screen fabric is applied in the alternative embodiment whether it is the first application of screen fabric or any application thereafter, due to the decoupling of the process of unwinding screen/slat product from the drum and winding additional screen fabric onto the drum. In addition, Step S209' includes the initial indicator of "GoTo Step S217, which is illustrated in FIG. 58. That is, FIG. 58 includes the Step S217 of "connecting a header tape to a top edge 164 of the screen fabric, which is thereby wound about the drum with the screen fabric" and the Step S218 of "connecting encapsulating paper to a bottom edge of the screen fabric, and connecting a tail tape to a bottom edge of the encapsulating paper, which are thereby wound about the drum with the screen fabric, for encapsulating the blind upon winding the screen/slat product about the roller tube."

Returning to FIG. 57, Step S209' further includes the Step S213' of "positioning the second metallic member on screen fabric at the second side of the axial groove, against the second drum magnet, to hold the screen fabric thereat against the drum." Furthermore, Step S209' includes the Step S214' of "cutting the screen fabric between axial groove along a direction which is parallel with the long axis of the drum." At this point, the process can return to Step S209' of helically winding slat fabric about the drum.

Figure 59:
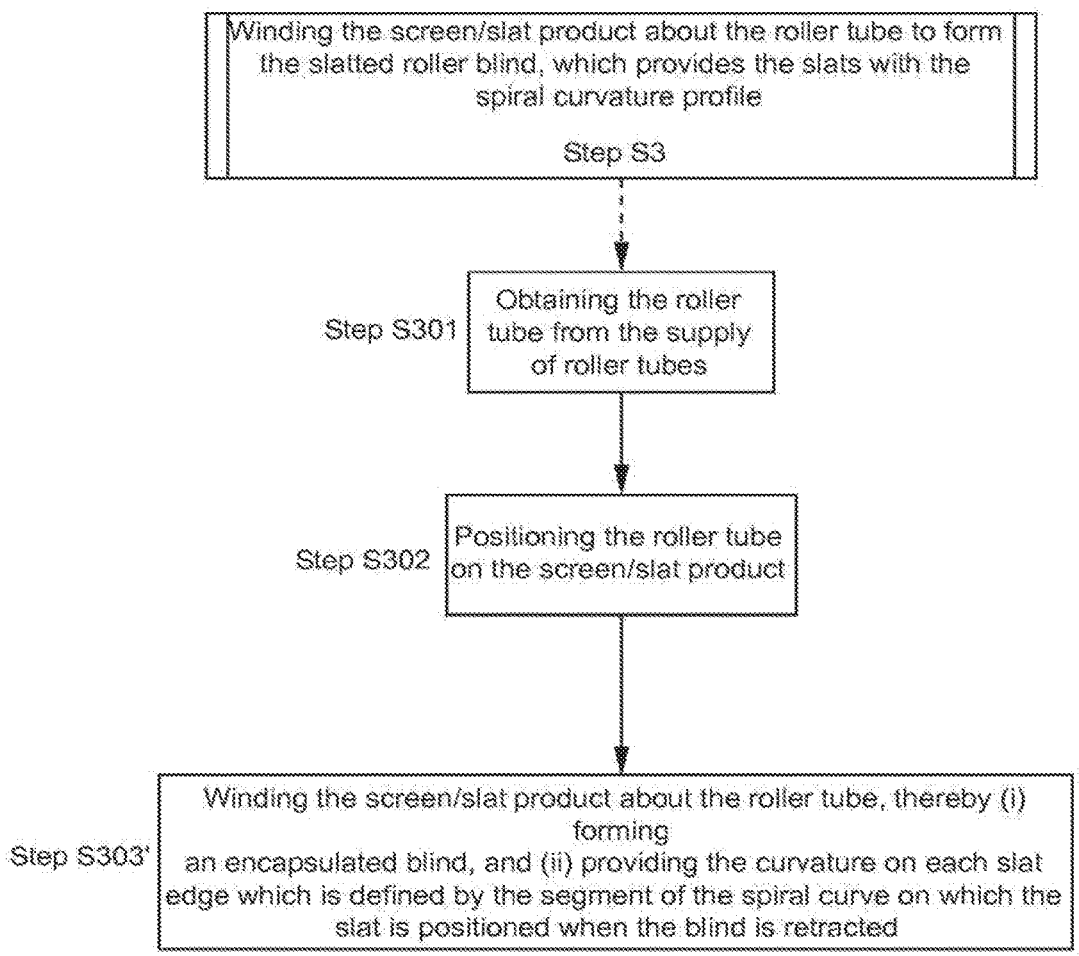

With reference to FIG. 59, which represents FIG. 31 in the alternative embodiment, this step represents the process of "winding the screen/slat product about the roller tube to form the slatted roller blind, which provides the slats with the spiral curvature profile." The primary difference in this process is the exclusion of Step S304 of "aligning the roller tube with the screen/slat product, which is angularly offset on the platform," due to the aligning step S207'. In addition, as recited in Step S303', the winding process encapsulates the blind, due to the inclusion of the encapsulating paper and tail tape introduced in Step S218.

Figure 60:
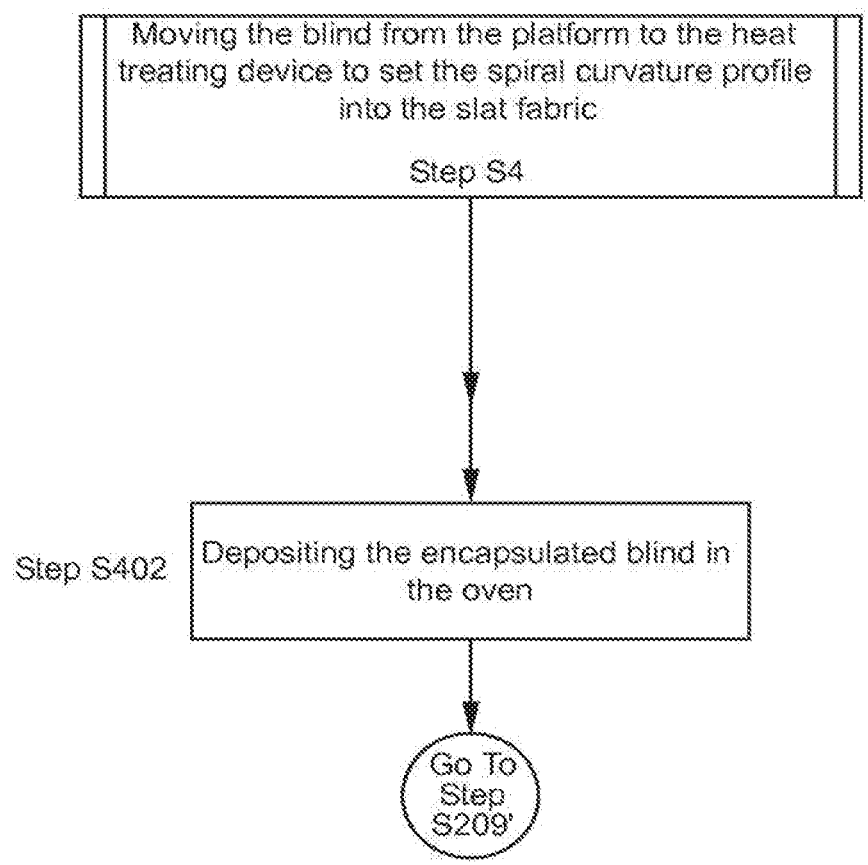

With reference to FIG. 60, which represents FIG. 32 in the alternative embodiment, Step S401 of encapsulating the blind is now in provided in Step S303', so that Steps S401, S403 and S404, directed to encapsulating according to the first disclosed embodiment, are no longer required. However, as indicated, with the process complete at S402, the next step would be returning to Step S209' of helically winding additional screen fabric about the drum. Indeed, it is to be appreciated that due to the decoupling of the process of unwinding screen/slat product from the drum and winding additional screen fabric onto the drum, so long as the tendered amount of screen fabric, connected with header tape, tail tape and wrapping paper are connected and fed through the feed magnet 320 and metallic bar 340, a reasonable starting point in the cycle of fabricating a roller blind in the alternative embodiment is Step S209'.

Although several embodiments of the present invention have been disclosed above, the present invention should not to be taken to be limited thereto. In fact, it is to be understood that one of ordinary skill in the art will be able to devise numerous arrangements, which, although not specifically shown or described, will embody the principles of the present invention and will fall within its scope. Modifications to the above would be obvious to those of ordinary skill in the art, but would not bring the invention so modified beyond the scope of the appended claims.

What is claimed is:
1. A method of manufacturing a blind including a roller and a fabric, the fabric being formed by overlapped layers of fabric, the method comprising:
   helically winding elongated fabric about a drum to form the overlapped layers of fabric;
   attaching adjacent layers of the overlapped layers of fabric together at attachment lines spaced along an axis of the drum to define a cell between adjacent attachment lines;
   attaching the roller to a top end of the fabric;
   winding the fabric including the overlapped layers of fabric about the roller; and
   heat treating the blind to set a wound shape into the elongated fabric;
   wherein a first adjacent layer of the overlapped layers of fabric forms a front surface of a first cell and a rear surface of an adjacent second cell.

2. The method of claim 1, wherein attaching adjacent layers of the overlapped layers of fabric together at attachment lines comprises adhering adjacent layers of the overlapped layers of fabric together via adhesive lines.

3. The method of claim 2, further comprising applying the adhesive lines to the elongated fabric prior to helically winding the elongated fabric about the drum.

4. The method of claim 3, wherein the adhesive lines comprise co-polyester glue.

5. The method of claim 1, wherein helically winding elongated fabric about the drum comprises:
   attaching an end of the elongated fabric to the drum;
   rotating the drum about the axis of the drum; and
   moving the elongated fabric along a length of the drum via a fabric distributing structure as the elongated fabric is being wound around the drum.

6. The method of claim 1, further comprising moving the overlapped layers of fabric to a platform.

7. The method of claim 6, wherein moving the overlapped layers of fabric to the platform comprises:
   restricting rotation of the drum; and
   cutting the overlapped layers of fabric along an axial opening in the drum.

8. The method of claim 7, further comprising:
   gripping an edge of the overlapped layers of fabric formed by cutting the overlapped layers of fabric; and
   moving the edge of the overlapped layers of fabric lateral to the axis of the drum to unwind the overlapped layers of fabric from the drum and position the overlapped layers of fabric onto the platform.

9. The method of claim 8, wherein gripping the edge of the overlapped layers of fabric comprises gripping the edge via a movable magnet.

10. The method of claim 1, further comprising trimming fabric at opposing ends of the overlapped layers of fabric to form a top end and a bottom end of the overlapped layers of fabric.

11. The method of claim 1, further comprising attaching a weight to the bottom end of the fabric.

12. The method of claim 1, further comprising encapsulating the blind to keep the overlapped layers of fabric tightly wound about the roller.

13. The method of claim 1, wherein the wound shape comprises a spiral curvature profile.

14. The method of claim 1, wherein the spacing between the attachment lines is substantially the same for each layer of the overlapped layers of fabric.

15. The method of claim 1, wherein the cell includes a height defined at least partially by the spacing between the attachment lines.

16. The method of claim 1, wherein the cell includes a height defined at least partially by a rate of axial advancement of the elongated fabric along the axis of the drum while the elongated fabric is being wound about the drum.

17. The method of claim 16, wherein the rate of axial advancement comprises a constant rate.

18. The method of claim 1, wherein each cell includes a front surface and a rear surface, the rear surface of each cell being formed from a first layer of the overlapped layers of fabric, the front surface of each cell being formed by a later laid second layer of the overlapped layers of fabric, the later laid second layer being laid on top of the first layer.

19. The method of claim 1, further comprising:
attaching a second layer of the overlapped layers of fabric to a previously laid first layer of the overlapped layers of fabric, the second layer forming a front surface of a cell.

\* \* \* \* \*